United States Patent
Jahshan

(10) Patent No.: US 10,211,702 B2
(45) Date of Patent: *Feb. 19, 2019

(54) ELECTRIC MOTOR/GENERATOR WITH INTEGRATED DIFFERENTIAL

(71) Applicant: Axiflux Holdings Pty Ltd, Southbank, Victoria (AU)

(72) Inventor: David Elias Jahshan, Fawkner (AU)

(73) Assignee: Axiflux Holdings Pty Ltd, Southbank (AU)

(*) Notice: Subject to any disclaimer, the term of this patent is extended or adjusted under 35 U.S.C. 154(b) by 0 days.

This patent is subject to a terminal disclaimer.

(21) Appl. No.: 15/297,082

(22) Filed: Oct. 18, 2016

(65) Prior Publication Data
US 2017/0085153 A1    Mar. 23, 2017

Related U.S. Application Data

(63) Continuation of application No. 14/651,106, filed as application No. PCT/AU2013/001438 on Dec. 9, 2013, now Pat. No. 9,509,198.
(Continued)

(51) Int. Cl.
*H02P 25/00* (2006.01)
*H02K 7/116* (2006.01)
(Continued)

(52) U.S. Cl.
CPC .............. *H02K 7/116* (2013.01); *B60L 1/003* (2013.01); *B60L 3/0061* (2013.01);
(Continued)

(58) Field of Classification Search
CPC ......... B60K 2006/4825; B60L 2220/50; B60L 15/20; H02K 21/12
See application file for complete search history.

(56) References Cited

U.S. PATENT DOCUMENTS

| | | | |
|---|---|---|---|
| 5,419,406 A | 5/1995 | Kawamoto et al. | |
| 2003/0189388 A1 | 10/2003 | Hashimoto | |

(Continued)

FOREIGN PATENT DOCUMENTS

| | | |
|---|---|---|
| TW | 201107635 | 3/2001 |
| WO | WO 2012/167316 | 12/2012 |

OTHER PUBLICATIONS

International Search Report dated Feb. 18, 2014 for PCT/AU2013/001438.

*Primary Examiner* — Karen Masih
(74) *Attorney, Agent, or Firm* — Jones Day

(57) ABSTRACT

An electrical machine comprising: at least one stator, at least one module, the at least one module comprising at least one electromagnetic coil and at least one switch, the at least one module being attached to the at least one stator; at least one rotor with a plurality of magnets attached to the at least one rotor, an integrated electrical differential coupled to at least one of the rotors, the at least one integrated electrical differential permitting the at least one rotor to output at least two rotational outputs to corresponding shafts, wherein the at least two rotational outputs are able to move the shafts at different rotational velocities to one another. The electrical machine is configured to fit into a housing, and that can be retrofitted into a conventional vehicle by replacing the mechanical differential.

20 Claims, 29 Drawing Sheets

Related U.S. Application Data

(60) Provisional application No. 61/735,379, filed on Dec. 10, 2012.

(51) Int. Cl.

| | | |
|---|---|---|
| H02K 16/00 | (2006.01) | |
| H02P 6/14 | (2016.01) | |
| H02P 3/14 | (2006.01) | |
| H02P 3/12 | (2006.01) | |
| H02P 6/24 | (2006.01) | |
| H02P 23/00 | (2016.01) | |
| H02K 21/24 | (2006.01) | |
| H02K 1/12 | (2006.01) | |
| H02K 3/04 | (2006.01) | |
| B60L 1/00 | (2006.01) | |
| B60L 3/00 | (2006.01) | |
| B60L 7/14 | (2006.01) | |
| B60L 8/00 | (2006.01) | |
| B60L 11/00 | (2006.01) | |
| B60L 11/14 | (2006.01) | |
| B60L 11/18 | (2006.01) | |
| B60L 15/00 | (2006.01) | |
| B60L 15/02 | (2006.01) | |
| B60L 15/20 | (2006.01) | |
| H02K 11/21 | (2016.01) | |
| H02K 11/33 | (2016.01) | |
| H02P 3/22 | (2006.01) | |
| H02P 3/24 | (2006.01) | |
| B60K 6/405 | (2007.10) | |
| B60K 6/52 | (2007.10) | |
| B60K 6/48 | (2007.10) | |

(52) U.S. Cl.
CPC .............. *B60L 3/0084* (2013.01); *B60L 7/14* (2013.01); *B60L 8/003* (2013.01); *B60L 8/006* (2013.01); *B60L 11/005* (2013.01); *B60L 11/14* (2013.01); *B60L 11/1803* (2013.01); *B60L 11/1857* (2013.01); *B60L 11/1864* (2013.01); *B60L 11/1877* (2013.01); *B60L 11/1887* (2013.01); *B60L 15/007* (2013.01); *B60L 15/025* (2013.01); *B60L 15/2009* (2013.01); *B60L 15/2054* (2013.01); *H02K 1/12* (2013.01); *H02K 3/04* (2013.01); *H02K 11/21* (2016.01); *H02K 11/33* (2016.01); *H02K 16/00* (2013.01); *H02K 21/24* (2013.01); *H02P 3/12* (2013.01); *H02P 3/14* (2013.01); *H02P 3/22* (2013.01); *H02P 3/24* (2013.01); *H02P 6/14* (2013.01); *H02P 6/24* (2013.01); *H02P 23/00* (2013.01); *B60K 6/405* (2013.01); *B60K 6/52* (2013.01); *B60K 2006/4808* (2013.01); *B60L 2200/36* (2013.01); *B60L 2210/12* (2013.01); *B60L 2210/40* (2013.01); *B60L 2220/14* (2013.01); *B60L 2220/50* (2013.01); *B60L 2240/12* (2013.01); *B60L 2240/26* (2013.01); *B60L 2240/36* (2013.01); *B60L 2240/421* (2013.01); *B60L 2240/423* (2013.01); *B60L 2240/425* (2013.01); *B60L 2240/427* (2013.01); *B60L 2240/429* (2013.01); *B60L 2240/486* (2013.01); *B60L 2250/16* (2013.01); *B60L 2250/26* (2013.01); *B60L 2260/28* (2013.01); *B60L 2270/145* (2013.01); *B60Y 2304/076* (2013.01); *H02K 2213/06* (2013.01); *H02K 2213/09* (2013.01); *H02K 2213/12* (2013.01); *H02P 2207/03* (2013.01); *Y02T 10/626* (2013.01); *Y02T 10/6265* (2013.01); *Y02T 10/641* (2013.01); *Y02T 10/643* (2013.01); *Y02T 10/70* (2013.01); *Y02T 10/7022* (2013.01); *Y02T 10/7061* (2013.01); *Y02T 10/7077* (2013.01); *Y02T 10/7083* (2013.01); *Y02T 10/7233* (2013.01); *Y02T 10/7241* (2013.01); *Y02T 10/7275* (2013.01); *Y02T 90/34* (2013.01)

(56) References Cited

U.S. PATENT DOCUMENTS

| | | |
|---|---|---|
| 2004/0263112 A1 | 12/2004 | Morgante et al. |
| 2010/0012402 A1 | 1/2010 | Vargas |
| 2011/0218070 A1 | 9/2011 | Mack et al. |
| 2013/0274051 A1* | 10/2013 | Kalmbach ............. F16H 57/031 475/150 |
| 2015/0295455 A1 | 10/2015 | Nemoto |

* cited by examiner

ELECTRIC MOTOR/GENERATOR WITH INTEGRATED DIFFERENTIAL

CROSS REFERENCE

This application is a continuation of U.S. application Ser. No. 14/651,106, filed Jun. 10, 2015, which is the National Phase application of International Application No. PCT/AU2013/001438, filed Dec. 9, 2013, which designates the United States and was published in English, and claims priority to U.S. Provisional Application No. 61/735,379, filed Dec. 10, 2012. In addition, this application is related to Australian Provisional Application No. 2011902310, filed Jun. 10, 2011, and International Patent Application No. PCT/AU2012/000655, filed Jun. 8, 2012 Each of these applications, in their entirety, are incorporated herein by reference.

FIELD

This disclosure relates generally electric motors/generators adapted for various applications as well as to related methods and/or system. Certain embodiments of the present disclosure relate to electric motors/generators which are: 1) reversible, 2) able to efficiently produce high torque in portions of the power and/or RPM range, 3) able to efficiently produced power in portions of the power and/or RPM range, 4) able to efficiently produce high torque substantially throughout the whole of a defined extended power and/or RPM range, 5) able to efficiently produce power substantially throughout the whole of a defined extended power and/or RPM range, 6) are compact, 7) are modular, 8) have an integrated differential or 9) combinations thereof. Certain embodiments are able to be employed, for example, as direct-drive wheel motors, mills and/or regenerative braking.

BACKGROUND

The use of electric motors/generators in a number of application areas is known. For example, in electric vehicles and/or industrial equipment. Traditional electric motors/generators typically work reasonable well at particular speeds and power requirements. However, as the speed or power output is varied the efficiency of these traditional motors/generators drops. To ensure that the device keeps operating at high efficiency most devices are often run at higher speeds even when less would suffice, wasting energy, or are coupled to expensive and heavy transmission systems which require ongoing maintenance and greatly increase the number of moving parts increasing the risk of failure.

Modifying existing motor drive systems such that they are capable of Variable Speed Drive (VSD) can introduce energy savings depending on the application. However, adding VDS to traditional motors is an expensive exercise. The power supply's frequency has to be modified, requiring high current switching, which use large and expensive electronic switches. Further once the speed of the motor is adjusted the motor may no longer be operating at its peak efficiency therefore the energy savings of running the motor slower may be offset by running the motor in a region that is less efficient.

Various configurations of traction electric motors are known. However, for many applications such motors tend to have excessive weight and bulk. Also known is the use of disk-shaped wheel motors, located at or within a wheel, and driving directly. At present, the majority of traction motors used, for example, in hybrid electric vehicles (HEV) and electric vehicles (EV) are interior permanent magnet synchronous machines. In common with other synchronous designs, these may suffer from conduction and magnetic losses and heat generation during high power operation. Rotor cooling is more difficult than with brushless direct-current motors and peak point efficiency is generally lower. Generally speaking, induction machines are more difficult to control, the control laws being more complex and less amenable to modelling. Achieving stability over a suitable torque-speed range and controlling temperature is more difficult than with brushless direct-current motors. Induction machines and switched-reluctance machines have been used for many years, but require modification to provide suitable optimal performance in, for example, HEV and EV applications.

Current state of the art electric vehicle drive trains consist of an electric battery or generator connected to control electronics, the control electronics modulate the voltage to the required frequency to drive the electric motor, the output of the electric motor is coupled to the input of a gear set with an integrated differential and the output is connected to the vehicles half shaft. There is a need for designs that fit the same size envelope as the differential housing in an existing petrol powered vehicle and mounted in the existing location as the existing differential where the output can be directly coupled to the wheel using the vehicles existing half shafts. This would permit the use of electric drive trains inside existing vehicles frames without redesign and retooling of the existing vehicle subframe and half shafts.

There is a need for improved systems, devices and methods directed to electric motors/generators. The present disclosure is directed to overcome and/or ameliorate at least one of the disadvantages of the prior art as will become apparent from the discussion herein.

SUMMARY

This summary is meant to be exemplary of certain embodiments. Devices, methods of use, methods of manufacture and/or systems are disclosed in the specification. Some embodiments may not be disclosed in this summary but are disclosed in other examples or other portions of this disclosure.

Certain embodiments are directed to an electrical machine comprising at least one stator; at least one module, the at least one module comprising at least one electromagnetic coil and at least one switch, the at least one module being attached to the at least one stator; at least one rotor with a plurality of magnets attached to the at least one rotor, the at least one rotor has an integrated differential, the at least one differential permits the rotor to output at least two rotational outputs, wherein the at least two rotational outputs are able to move at different rotational velocities to each other and wherein the at least one module is in spaced relation to the plurality of the magnets; and the at least one rotor being in a rotational relationship with the at least one stator, wherein the quantity and configuration of the at least one module in the electrical machine is determined based in part on one or more operating parameters; wherein the at least one module is capable of being independently controlled; and wherein the at least one module is capable of being reconfigured based at least in part on one or more of the following: at least one operating parameter during operation, at least one performance parameter during operation, or combinations thereof.

Certain embodiments are directed to an electrical machine comprising: at least one stator; at least one module, the at least one module comprising at least one electromagnetic coil and at least one switch, the at least one module being attached to the at least one stator; at least one rotor with a plurality of magnets attached to the at least one rotor, the at least one rotor has an integrated differential, the at least one differential permits the rotor to output at least two rotational outputs, wherein the at least two rotational outputs are able to move at different rotational velocities to each other and wherein the at least one module is in spaced relation to the plurality of the magnets; and the at least one rotor being in a rotational relationship with the at least one stator.

Certain embodiments are directed to an electrical machine comprising: at least one stator, at least one module, the at least one module comprising at least one electromagnetic coil and at least one switch, the at least one module being attached to the at least one stator; at least one rotor with a plurality of magnets attached to the at least one rotor, wherein the at least one module is in spaced relation to the plurality of the magnets; an integrated differential coupled to at least one of the at least one rotors, the at least one integrated differential permitting the at least one rotor to output at least two rotational outputs to corresponding shafts, wherein the at least two rotational outputs are able to move the shafts at different rotational velocities relative to one another, and the at least one rotor being in a rotational relationship with the at least one stator; wherein the quantity and configuration of the at least one module in the electrical machine is determined based in part on one or more operating parameters; wherein the at least one module is capable of being independently controlled; and wherein the at least one module is capable of being reconfigured based at least in part on one or more of the following: at least one operating parameter during operation, at least one performance parameter during operation, and combinations thereof. Certain aspects are directed to the electric machine, wherein the electrical machine is configured to fit into a housing and that can be retrofitted into a conventional vehicle by replacing the differential. Certain aspects are directed to the electric machine, wherein the electrical machine is configured to fit into a housing and that can be located in substantially that same position where a differential would otherwise be located in a vehicle or other machine. Also disclosed are methods of using and manufacturing the embodiments disclosed herein.

Certain embodiments are directed to an electrical machine comprising: a plurality of stators; a plurality of modules comprising at least one electromagnetic coil and at least one switch and being attached to at least one of the plurality of stators; a plurality of rotors with a plurality of magnets attached to at least one of the plurality of rotors, the plurality of rotors are able to move independently to one another to produce a differential output that permits the electric machine to output at least two rotational outputs to corresponding shafts, wherein the at least two rotational outputs are able to move the shafts at different rotational velocity's relative to one another, and the plurality of modules are in spaced relation to the plurality of the magnets; and the plurality of rotors being in a rotational relationship with the plurality of stators; wherein the quantity and configuration of the plurality of modules in the electrical machine is determined based in part on one or more operating parameters; wherein the plurality of modules are capable of being independently controlled, and wherein the plurality of modules are capable of being reconfigured based at least in part on one or more of the following at least one operating parameter during operation, and at least one performance parameter during operation. Certain aspects are directed to the electric machine, wherein the electrical machine is configured to fit into a housing and that can be located in substantially that same position where a differential would otherwise be located in a vehicle or other machine. Certain aspects are directed to the electric machine, wherein the electrical machine is configured to fit into a housing and that can be retrofitted into a conventional vehicle by replacing the differential.

Certain embodiments are directed to an electrical machine comprising: a plurality of stators; a plurality of modules comprising at least one electromagnetic coil and at least one switch and being attached to at least one of the plurality of stators; a plurality of rotors with a plurality of magnets attached to at least one of the plurality of rotors, the plurality of rotors are able to move independently to one another to produce a differential output that permits the electric machine to output at least two rotational outputs to corresponding shafts, wherein the at least two rotational outputs are able to move the shafts at different rotational velocity's relative to one another, and the plurality of modules are in spaced relation to the plurality of the magnets; and the plurality of rotors being in a rotational relationship with the plurality of stators; wherein the quantity and configuration of the plurality of modules in the electrical machine is determined based in part on one or more operating parameters; wherein the plurality of modules are capable of being independently controlled, and wherein the plurality of modules are capable of being reconfigured based at least in part on one or more of the following: at least one operating parameter during operation, and at least one performance parameter during operation; and wherein the electrical machine is configured to fit into a housing and that can be located in substantially that same position where a differential would otherwise be located in a vehicle or other machine.

Certain embodiments are directed to an electrical machine comprising: at least one stator; at least one module, the at least one module comprising at least one electromagnetic coil and at least one switch, the at least one module being attached to the at least one stator; at least one platter or rotor with a plurality of magnets attached to the at least one platter or rotor, wherein the at least one module is in spaced relation to the plurality of the magnets; an integrated differential coupled to at least one of the at least one platters or rotors, the at least one integrated differential permitting the at least one platter or rotor to output at least two rotational outputs to corresponding shafts, wherein the at least two rotational outputs are able to move the shafts at different rotational velocities relative to one another, and the at least one platter or rotor being movement relationship with the at least one stator, wherein the quantity and configuration of the at least one module in the electrical machine is determined based in part on one or more operating parameters; wherein the at least one module is capable of being independently controlled; and wherein the at least one module is capable of being reconfigured based at least in part on one or more of the following: at least one operating parameter during operation, at least one performance parameter during operation, or combinations thereof.

Certain embodiments are directed to a modular, more flexible, more adaptable electric motor.

Certain embodiments are directed to an electric motor fitted to an electric car that increases the battery life 10%, 20%, 30%, 40%, 50%, 60%, 70% or more.

Certain embodiments are directed to electrical motors that are smaller and/or lighter than similar competing electric motors in the same class. Because of its small size and sufficient power to weight ratio it opens a plethora of options in terms of where to mount the motor. For example, in a vehicle an electric motor with the same, substantial the same, similar or sufficient power and wheel as a existing internal combustion motor and drive train could be designed, and yet the electric motor will fit the existing size envelope, or substantially the existing size envelope, as the differential housing in an existing petrol powered vehicle and can be mounted in the existing location, or substantial the same location, as the existing differential. In other words, certain disclosed embodiments permit the replacement or substitution of a combustion motor and drive train for powering the vehicle with a small light direct drive electric motor that has similar or improved power outputs to the combustion motor and yet can be placed where the existing differential is located. The output can be directly coupled to the wheel using the vehicles existing half shafts. This permits the use of electric drive trains inside existing vehicles frames without redesign and retooling of the existing vehicle subframe and half shafts.

Certain embodiments may be used to extend an existing internal combustion vehicle production line by adding an additional electric motor variant to the assembly line. For example at the junction point of the production line where different chassis are diverted to different engine size lines, an additional line could be added where instead of installing a differential the technology disclosed herein is installed in the existing location using the existing mounting points. A wire may then be run from the battery pack to the power supply.

To retrofit a vehicle the drive train consisting of the internal combustion engine, transmission, differential can be removed from the vehicle and replaced by the electric motor onto the existing mounting points as the existing differential. The half shafts may then be connected, and wires from a battery pack that could be fitted to the previous location of the internal combustion engine and transmission.

A comparison between certain embodiments of the present disclosure extending an existing internal combustion engine production line against other state of the art electric drive trains where the chassis' body would require modification could result in estimated savings of 100s of millions of US dollars.

A comparison between the certain embodiments of the present disclosure and other state of the art electric drive trains not including the batteries could reduce the weight of the drive train by 100%, 25%, 35%, 50%, 60%, 75% or more. For example, the GM Holden EV Commodore preproduction vehicle's drive train not including the battery weighs in close to 100 kg. Certain embodiments of the present disclosure would save approximately 60 kg. Certain embodiments would only introduce one directly swappable part to the drive train assembly line (the motor), while the exiting EV Commodore preproduction vehicle would introduce at least 9.

A comparison between the certain embodiments of the present disclosure and Tesla's current electric motor indicates that certain embodiments have double the power to weight ratio. Substantial further weight savings are made as there is no, or less requirement for the motor controller and gearbox. Certain embodiments have a power to weight ratio that is 25%, 50%, 100%, 125%, 150/o, 200%, 250%, or 300% greater than a brushless permanent magnet three phase electrical machine with a substantially similar size and weight.

In certain embodiments, existing internal combustion vehicles may be converted to hybrid drives by attaching the at least one rotor to at least one crown wheel that is driven by at least one drive shaft. The crown wheel could alternatively be machined as part of the magnetic rotor. During internal combustion operation the drive shaft turns the crown wheel. During electric drive the drive shaft is disengaged and the vehicle is propelled by the coils. The coils can also be driven at the same time, or substantially same time, as the drive shaft to increase acceleration performance.

In certain embodiments, a typical arrangement of brushless, axial-flux electric motor comprises one or more rotors in the form of circular plates (these may be substantial flat, disk-shaped) rotationally supported on a differential, which may consist of an epicyclic gear train, that permits two outputs to rotate at different speeds, the rotor having a circular array of high energy permanent magnets embedded around its periphery with alternating polarity, the axes of the magnets being parallel to the shaft; one or more stators in the form of circular plates fixed parallel to the rotors and separated by a small air gap, each the stator having a circular array of electromagnetic coils embedded around its periphery on the same centre diameter as the magnets; sensing ways (or means) to detect absolute position and rotational speed of the rotors; and a control system which, in response to inputs from the sensing ways (or means) and power and rotational direction commands, energises the magnetic coils to attract and repel the magnets for the purpose of generating rotary motion. One advantage of certain configurations are its high power and/or torque density, the magnitude of torque generated being proportional to the strength of the magnetic flux generated by the coils, the strength of the magnetic flux of the permanent magnets, the effective diameter of the coil and magnet arrays and the gap between them. At the same time, the use of electronic commutation to control the current flows to individual stator coils confers high energy efficiency over a wide power and RPM range, resulting in essentially flat efficiency curves.

Certain embodiments of the present disclosure are directed to configurations of brushless, axial-flux, direct-current electric motors which have one or more of the following characteristics: high power and/or torque densities; which combines rapid acceleration with an extended RPM range; which has low weight and/or compact form, making it suitable for a variety of applications; which employs complex control mechanisms (or means) to obtain high efficiency throughout the desired range of operational parameters; which has minimal cooling requirements; which is robust and mechanically and electrically reliable; which is capable of being manufactured through the assembly of standard components in a range of configurations suitable for employment in vehicles from automobiles to heavy trucks and machinery; able to optimise driving and regenerative efficiency throughout a range of highly variable driving and generating conditions and which may be manufactured at a competitive cost.

According to certain embodiments, a brushless, axial flux, direct-current electric motor comprises: one or more disc-shaped stators around the periphery of which a circular array of equally-spaced (or substantially equally spaced) electromagnetic coils may be embedded; one or more disc-shaped rotors around the periphery of which a circular array of equally-spaced (or substantially equally spaced) magnets may be embedded, the array having the same, or substantially the same centre diameter as that of the electromagnetic coils and the magnets having alternating pole orientation; the rotors being rotationally supported parallel (or substantially parallel) to the stators with an air gap between them. The central parts of the stators may be cut away to permit the passage therethrough of a differential, which may consist of an epicyclic gear train, that permits two outputs from the rotor to rotate at different speeds, supporting the rotors and the circuit boards are supported from the stators concentrically with the shaft, the circuit boards may incorporate solid-state switches which may be activated by command signals from a control system to power the electromagnetic coils to cause the rotors to rotate. In certain embodiments, one or more sensor may be provided to generate signals relating to the absolute and instantaneous positions of the rotors. In certain embodiments, one or more sensor may be provided to generate signals relating to the substantially absolute and/or substantially instantaneous positions of the rotors. In certain embodiments, the permanent magnets are sufficiently powerful and may be of the rare earth type and the electromagnetic coils are of a form generating high levels of magnetic flux, but having low magnetic reluctance permitting rapid switching or reversal of polarity. In certain embodiments, the permanent magnets may be sufficiently powerful and/or may be of the rare earth type wherein the one or more of the electromagnetic coils are of a form generating sufficiently high levels of magnetic flux. In certain embodiments, permanent magnets and/or electromagnetic coils of conventional form are optionally employed in electric motors for lower cost applications or those required to meet different operational parameters. Electrical current may be supplied to the solid-state switches via the structure of the stators, thereby permitting a heavy current flow to the solid-state switches with minimal losses, and the embedding of the electromagnetic coils in the stators permits efficient conductive cooling. In certain embodiments, electrical current may be supplied to the solid-state switches via the structure of the stators, thereby permitting a suitably heavy current flow to one or more of the solid-state switches with suitably minimal losses, and the embedding of the electromagnetic coils in the stators permits suitable efficient conductive cooling. The positioning of the switches immediately adjacent the electromagnetic coils provides conduction paths of low resistance with minimal losses. In certain embodiments, the positioning of the switches adjacent (or substantially adjacent) one or more of the electromagnetic coils provides conduction paths of suitably low resistance with suitably minimal losses. In certain embodiments, the positioning of the switches above the rotor reduces the external circumference of the motor to ensure a small packaging fit while maintaining a suitably low resistance with suitably minimal losses. In certain embodiments, the combination of one or more of the features provides an electric motor of high power density and/or one able to operate efficiently over an extended RPM range. In certain embodiments, the control system of the direct current electric motor may be made to be continuously adaptive, utilising complex logic to determine the most efficient mode of operation in relation to prevailing operational parameters. In certain embodiments, the control system of the direct current electrical machine may be sufficiently continuously (or substantially continuously) adaptive, utilising logic to determine or estimate the appropriately efficient mode of operation in relation to one or more prevailing operational parameters.

Certain embodiments are directed to an electrical machine, wherein the electrical machine is a compact direct drive electric motor that generates sufficient or improved propulsion in a wheeled vehicle and the electric motor and the differential can fit the size of envelope of existing differentials in a conventional combustion engine driven vehicle.

Certain embodiments are directed to an electrical machine, wherein the electrical machine is a compact direct drive electric motor that generate sufficient or improved propulsion of a wheeled vehicle and the electric motor and the differential can be installed in line with a drive axial while providing adequate clearance from a road without substantial modification to an existing suspension of the wheeled vehicle.

Certain embodiments are directed to an electrical machine, wherein the electrical machine is a compact direct drive electric motor that generate sufficient propulsion of a wheeled vehicle and the electric motor and the differential can be installed in line with one or more drive axels while providing adequate clearance from a road without substantial modification to an existing suspension of the wheeled vehicle.

Certain embodiments are directed to an electrical machine, wherein the electrical machine is a compact direct drive electric motor that generate sufficient propulsion of a wheeled vehicle and the electric motor and the differential can be installed in line with one or more drive axels without lower, or substantially lowering, the clearance from a road and without substantial modification to an existing suspension of the wheeled vehicle.

Certain embodiments are directed to an electrical machine, wherein the at least one stator is a substantial portion of the stators contained in the electrical machine. Certain embodiments are directed to an electrical machine, wherein the at least one stator is all of the stators contained in the electrical machine.

Certain embodiments are directed to an electrical machine, wherein the at least one module is a substantial portion of the modules contained in the electrical machine. Certain embodiments are directed to an electrical machine, wherein the at least one module is all of the modules contained in the electrical machine.

Certain embodiments are directed to an electrical machine, wherein the at least one electromagnetic coil is a substantial portion of the electromagnetic coils contained in the electrical machine. Certain embodiments are directed to an electrical machine, wherein the at least one electromagnetic coil is all of the electromagnetic coil contained in the electrical machine.

Certain embodiments are directed to an electrical machine, wherein the at least one switch is a substantial portion of the switches contained in the electrical machine. Certain embodiments are directed to an electrical machine, wherein the at least one switch is all of the switches contained in the electrical machine.

Certain embodiments are directed to an electrical machine, wherein the at least one rotor is a substantial portion of the rotors contained in the electrical machine. Certain embodiments are directed to an electrical machine, wherein the at least one rotor is all of the rotors contained in the electrical machine.

Certain embodiments are directed to an electrical machine, wherein the plurality of magnets is a substantial portion of the magnets contained in the electrical machine. Certain embodiments are directed to an electrical machine, wherein the plurality of magnets is all of the magnets contained in the electrical machine.

Certain embodiments are directed to an electrical machine, wherein the plurality of magnetic induction loops is a substantial portion of the magnetic induction loops contained in the electrical machine. Certain embodiments are directed to an electrical machine, wherein the plurality of magnetic induction loops is all of the magnetic induction loops contained in the electrical machine.

Certain embodiments are directed to an electrical machine, wherein the plurality of magnetic reluctance projections is a substantial portion of the magnetic reluctance projections contained in the electrical machine. Certain embodiments are directed to an electrical machine, wherein the plurality of magnetic induction loops is all of the magnetic induction loops contained in the electrical machine.

Certain embodiments are directed to an electrical machine, wherein the plurality of stators is a substantial portion of the stators contained in the electrical machine. Certain embodiments are directed to an electrical machine, wherein the plurality of stators is all of the stators contained in the electrical machine.

Certain embodiments are directed to an electrical machine, wherein the plurality of modules is a substantial portion of the modules contained in the electrical machine. Certain embodiments are directed to an electrical machine, wherein the plurality of modules is all of the modules contained in the electrical machine.

Certain embodiments are directed to an electrical machine, wherein the plurality of rotors is a substantial portion of the rotors contained in the electrical machine. Certain embodiments are directed to an electrical machine, wherein the plurality of rotors is all of the rotors contained in the electrical machine.

BRIEF DESCRIPTION OF THE FIGURES

These and other features, aspects, and advantages of the present disclosure will become better understood with regard to the following description, appended claims, and accompanying figures where:

DESCRIPTION

Figure 1:
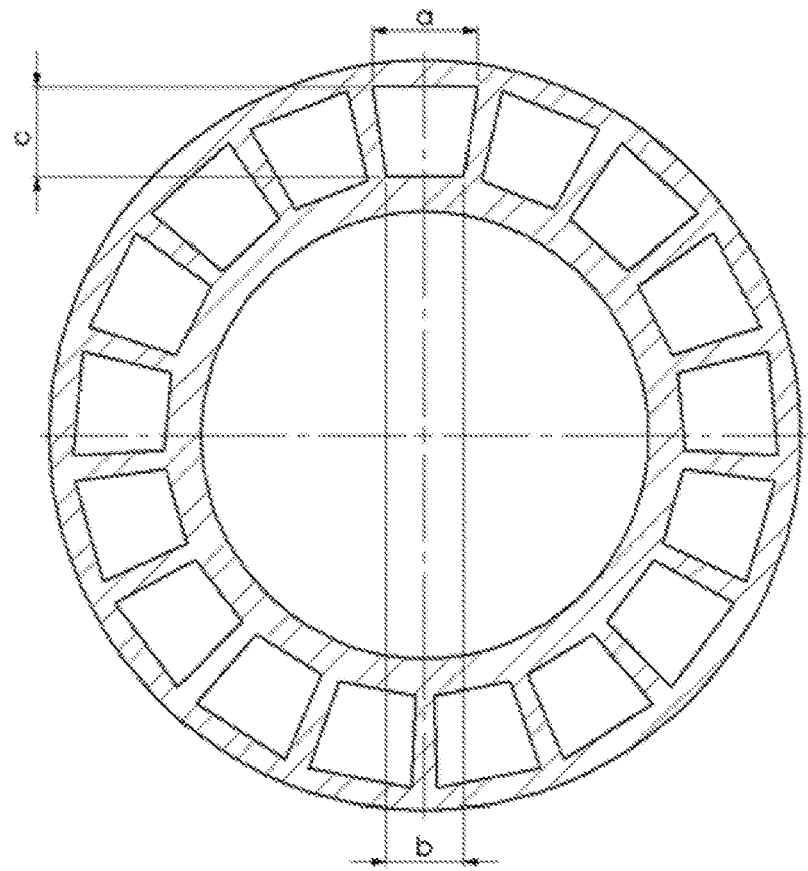
FIG. 1 is a schematic showing the geometric properties of a magnet shape placed in a circular array, according to certain embodiments.

The present disclosure will now be described in detail with reference to one or more embodiments, examples of which are illustrated in the accompanying drawings. The examples and embodiments are provided by way of explanation and are not to be taken as limiting to the scope of the disclosure. Furthermore, features illustrated or described as part of one embodiment may be used by themselves to provide other embodiments and features illustrated or described as part of one embodiment may be used with one or more other embodiments to provide a further embodiments. It will be understood that the present disclosure will cover these variations and embodiments as well as other variations and/or modifications. It is also to be understood that one or more features of one embodiment may be combinable with one or more features of the other embodiments. In addition, a single feature or combination of features in certain embodiments may constitute additional embodiments.

The features disclosed in this specification (including accompanying claims, abstract, and drawings) may be replaced by alternative features serving the same, equivalent or similar purpose, unless expressly stated otherwise. Thus, unless expressly stated otherwise, each feature disclosed is one example of a generic series of equivalent or similar features.

The subject headings used in the detailed description are included only for the ease of reference of the reader and should not be used to limit the subject matter found throughout the disclosure or the claims. The subject headings should not be used in construing the scope of the claims or the claim limitations.

Certain embodiments are directed to electrical motors that are smaller and/or lighter than similar competing electric motors in the same class and yet have sufficient power output to replace the combustion motor that would otherwise be used to power the machine or vehicle. Because of its small size and sufficient power to weight ratio, the electric motors disclosed herein allow the same or a similar machine or vehicle to be powered at the same, similar or substantial the same performance characteristics. For example, an electric motor with the same, substantial the same, similar or sufficient power and wheel torque as an existing internal combustion engine and drive train is disclosed in certain embodiments herein and yet the electric motor will fit the existing size envelope, or substantially the existing size envelope, as the differential housing in an existing petrol powered vehicle and mounted in the existing location, or substantial the same location, as the existing differential. In other words, certain disclosed embodiments permit the replacement or substitution of a combustion motor for powering the vehicle with an small light direct drive electric motor that has similar power outputs to the combustion motor and yet can be placed where the existing differential is located. The output can be directly coupled to the wheel using the vehicles existing half shafts. This permits the use of electric drive trains inside existing vehicles frames without redesign and retooling of the existing vehicle subframe and half shafts.

Certain embodiments are directed to compact direct drive electric motors that generate sufficient or improved propulsion of the wheeled vehicle wherein the electric motor and the differential can fit the size of envelope of existing differentials in a conventional combustion engine driven vehicle.

Certain embodiments are directed to compact direct drive electric motors that generate sufficient or improved propulsion of the wheeled vehicle wherein the electric motor and the differential can be installed in line with the drive axial while providing adequate clearance from the road without substantial modification to the existing suspension of the wheeled vehicle.

Certain embodiments are directed to a compact direct drive electric motor that generate sufficient propulsion of the wheeled vehicle, wherein the electric motor and a differential can be installed in line with one or more the drive axels while providing adequate clearance from the road without substantial modification to an existing suspension of the wheeled vehicle.

Certain embodiments are directed to a compact direct drive electric motor that generate sufficient propulsion of the wheeled vehicle, wherein the electric motor and a differential can be installed in line with one or more drive axels without lower, or substantially lowering, the clearance from the road and without substantial modification to an existing suspension of the wheeled vehicle.

Certain embodiments consist of a stator and a rotor which may be contained in an enclosure. The rotor creates a magnetic field in the vicinity of the stator, the stator creates a disturbance in the magnetic field forcing the rotor to move to a position that minimizes the disturbance in the magnetic field. The rotor may consist of a series of permanent magnets attached to a differential. The stator may consist of a series of coils, attached to an enclosure. The enclosure may house bearings to ensure that the rotor can rotate to minimize the disturbance in the magnetic field. Certain embodiments are directed to an electrical machine comprising: at least one rotor, a plurality of magnets used in, or in contact with, the rotor, at least one stator and a plurality of coils used in, or in contact with, the stator, wherein the configuration is contain, partially contained within and a enclosure; and a control electronics provides individual control over each coil and/or cluster of coils generating the disturbances. In certain embodiments, the control electronics provides individual control over one or more coils and/or one or more cluster of coils generating the disturbances. In certain embodiments, the control electronics provides individual control over at least 40%, 50%, 60%, 70% 80%, 90%, 95% or 100% of the coils or at least 40%, 50%, 60%, 70% 80%, 90%, 95% or 100% of the duster of coils generating the disturbances.

Certain embodiments are directed to an electrical machine that provides significant size, weight reduction, price reduction, or combinations thereof, while increasing the electrical machine's power output, efficiency, reliability, maintainability or combinations thereof. Also disclosed are methods of using the electrical machine, methods of manufacturing the electrical machine and/or systems that incorporate the electrical machine.

Certain embodiments are directed to adaptive magnetic flux arrays wherein the device, methods, and/or systems permit real time, or substantially real time, software reconfigurable electrical motor/generator. The disclosed devices, methods and/or systems may be used as both a motor and a generator may also be referred to as an electrical machine. One advantage of certain embodiments is the ability of those embodiments to reconfigure itself in real time, or substantially real time, this permits the machine, method and/or system to find its optimal settings across very wide operating speeds and/or loads. Such flexibility results in energy savings across a plethora of industries. Other advantages of certain embodiments disclosed herein are: reduce cost by reducing the amount of copper in the windings; the amount of electrical steel; the size of the package required to house it or combinations thereof.

For example, the weight of the copper windings in an electrical machine is proportional to the size of current, greater the current the heavier the wire. This relationship is quadratic, not linear. Certain embodiments effectively divide and conquer this relationship. In certain embodiments each (or one or more) independent coil handles relatively small amounts of current. By using numerous small coils, the overall current through each coil (or one or more) remains low, but the total current for the whole system scales linearly, along with the quantity of material and/or the cost of the electrical machine. By overcoming this quadratic relationship much larger electrical machines may be built at more affordable prices.

For example, a traditional 3 phase 300 kw electrical machine operating off a 415 v supply requires a current through each phase of the coil of 240 amps. In one exemplary embodiment, the windings are distributed across 34 coils, the current per coils is 21 amps. To have the same, substantially the same, or similar, resistive power loss through the two configurations, the traditional electrical machine requires about 10 times the weight of wire. Certain embodiments are directed to an electrical machine wherein the resistive power loss is substantially the same as the resistive power loss of a traditional electrical machine but the electrical machine requires at least 500, 400, 300, 250, 200, 150, 100, 75, 50, 25, 20, 10, 5 or 2 times less weight of wire. Certain embodiments are directed to an electrical machine that uses substantially less copper wherein the resistive power loss is substantially the same as the resistive power loss of a similar machine with fewer coils. The copper saved is proportional to the number of coils cn the embodiment contains compared to the number of coils contained in a comparable machine dn. The potential savings are up to dn divided by cn times the copper. In certain embodiments, the electrical machine requires between 500 to 100, 100 to 300, 50 to 100, 150 to 250, 300 to 250, 225 to 175, 150 to 75, 75 to 50, 50 to 25, 20 to 10, 15 to 5, 2 to 5 times less the weight heavier of wire as compared with a brushless permanent magnet three phase electrical machine with similar power.

In the example, above as there is 10 times less wire, the volume of iron core required to wrap the wire around is decreased. Subsequently the entire unit can fit into a substantially smaller enclosure further reducing the mass of materials. High currents still need to be transferred from the devices power input to the coils. If the body of the electrical machine is constructed from a good conductor such as aluminium, the body can be used as the conductor, further reducing the mass of materials used. In this example, the exemplary electrical machine disclosed herein reduces the weight of a 300 kw electrical machine from many hundreds of kilograms to about 34 kilograms. Certain embodiments disclosed herein provide an electrical machine that may produce substantially the same power output of a traditional electrical machine but with a weight that is reduced by at least 95%, 90%, 85%, 80%, 70%, 60%, 50%, 40%, 30%, or 20%. Certain embodiments disclosed herein provide an electrical machine that may produce substantially the same power output of a traditional electrical machine but with a weight that is reduced by between 95% to 20%, 90% to 70%, 85% to 60%, 90% to 50%, 80% to 40%, 70% to 50%, 60% to 30%, 50% to 20%, 40% to 20% or 30% to 20%.

Another advantage of certain embodiments is the ability to independently control each coil, when less torque is required or available, sections of the electrical machine may be powered down. In certain embodiments the ability to independently control one or more coils, when less torque is required or available, then sections of the electrical machine may be powered down. Certain embodiments are directed to an electrical machine with the ability to independently control one or more coils. Certain embodiments are directed to an electrical machine with the ability to independently control one or more coils. Certain embodiment are directed to an electrical machine with the ability to independently control at least 70%, 80%, 90%, 95%, 98% or 100% of one or more coils in a plurality of coils. Certain embodiment are directed to an electrical machine with between 10 to 100, 20 to 50, 50 to 200, 20 to 60, 30 to 80, or 30 to 60 coils wherein the electrical machine is configured to independently control at least 70%, 80%, 90%, 95%, 98% or 100% of the coils. Because certain disclosed embodiments have numerous coils, substantially finer control over optimising the efficiency of the machine is available.

Traditional electrical machines control their peak efficiency by varying the timing of the switching between phases of their coils. As the timing is traditionally set at assembly or installation either by the brushes or the frequency of the drive circuit, variations of velocity and power reduces the peak efficiency of the electrical machine. Another advantage of certain embodiments is that they may be configured to continuously optimize the timing of the coils, this can provide efficiency savings of up to, for example, 40% when summed over the entire operating region of a comparatively powered electrical machine. Certain embodiments may be configured to optimize the timing of a plurality of coils substantially continuously, sufficiently continuously, continuously, non-continuously, or intermediately. In certain embodiments the ability to optimize the timing of a plurality of coils substantially continuously, sufficiently continuously, continuously, non-continuously, or intermediately provides an efficiency savings of up to 10%, 15%, 20%, 25%, 30%, 35%, 40%, 45%, 50% or 60% when summed over the entire operating region of a comparatively powered electrical machine.

In an axial configuration, certain embodiments of the present disclosure may reduce the total number of permanent magnets by a minimum of 25%. The total saving percentage increases with the number of rotors required. This may be achieved by the sharing of common rotors, making use of both sides of a rotors magnetic fields rather than one. For example, in a two stator, 4 rotor motor, one rotor is eliminated for a saving of 25%. For 6 stator, 12 rotor motor, 5 rotors are eliminated for a saving of 41%. In certain embodiments, the total number of permanent magnets may be reduced by a minimum of 10%, 15%, 20%, 25%, 30%, 35%, 40%, 45%, 50%, 55%, 60% or 70% and still provide comparable power output.

Certain embodiments of the present disclosure may accommodate magnets of various shapes. For example, the shape may be a cylinder, cuboid, segmented, trapezoidal or other suitable shapes.

For smooth torque a sinusoidal application of force may be suitable. Through the use of the interleaved coil design of certain disclosed embodiments it is possible to create a smooth sinusoidal output using cylindrical magnets. A further consequence of the interleaved coil design is reduced magnet volume. Most axial flux motors use trapezoidal magnets, which for a given diameter, or trapezoidal height, occupy and require more magnetic volume. For a trapezoidal with long edge length 40, short 15 and height 25, vs. a circular magnet of diameter 25, a volumetric saving of 29.24% is achieved. Minimal saving occurs when the trapezoidal shape approaches a square, giving a minimum reduction of approximately 21%. Certain embodiments may be configured in a circular array, or substantially circular array, such that the electrical machine has one more set of magnets than coils, the coils can be powered in such a sequence that the torque generated by the electrical machine is sufficiently smooth. Ensuring that there is little variation in torque during start up ensures smooth acceleration at low speeds. For example, an embodiment that comprises a 17 coil circular array has about 30 times less variation in torque through a rotation than a 3 phase equivalent. Certain embodiments comprising a plurality of coils in at least one circular array has 50, 40, 35, 30 25, 20, 15, 10 or 5, times less variation in torque through a rotation than a 3 phase equivalent.

Magnet Volume Reduction

In regards to efficiency the ideal switching waveform inside a coil is a sine wave. The sine wave has only one frequency component, the fundamental frequency, ensuring that higher frequency harmonics may not be contained in the signal. An ideal square wave may be made up of the fundamental frequency (the frequency of the square wave) plus an infinite sequence of higher frequency harmonics contained in its Fourier series. There are a number of drawbacks in terms of high frequency harmonics. High frequency signals tend to travel along the outer edge of the conductor known as the skin effect. The higher the frequency the closer to the skin the signal travels. The resistance of a wire is proportional to the cross sectional area where the electrons are travelling. The resistance of the wire is therefore proportional to the frequency through that wire. Further high frequency signals tend to radiate away from the device causing interference to other devices. These radiated effects need to be contained and filtered to pass CE, FCC, C-tick and other compliance standards. Circular magnets coupled with the interleaved coil design create a nice sine wave output. A consequence of cylindrical magnets is reduced total magnet volume, now referring to FIG. 1 we have: Volume of trapezoidal magnet:

$$V_{trap} = \left(\frac{a+b}{2}\right)cd; \, d = \text{magnet thickenss}$$

Volume of circular magnet $V_{circ} = \pi r^2 d$; Noting: $2r=C$ and given the ratio of a:b is sufficient such that the trapezoidal perimeter does not Intersect the circular perimeter.

Figure 2:
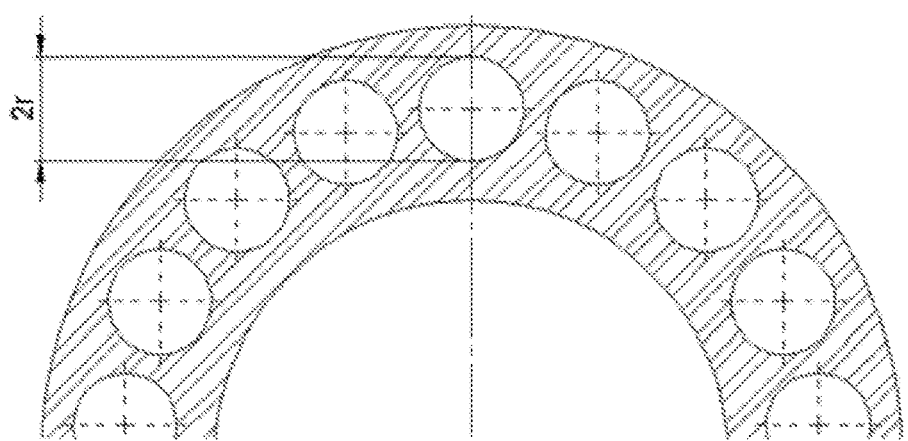
FIG. 2 is a schematic showing the geometric properties of a circular magnet shape placed in a circular array, according to certain embodiments.

Now referring to FIG. 2 we have: Volume saving per coil:

$$V_{saving} = V_{trap} - V_{circ}$$

$$V_{saving} = \left(\frac{a+b}{2}\right)cd - \pi\left(\frac{c}{2}\right)^2 d$$

Alternatively:

$$V_{saving\%} = \left(1 - \frac{Vcirc}{Vtrap}\right) \times 100 = \left(1 - \frac{\pi c}{2(a+b)}\right) \times 100$$

In certain embodiments, this saving can be substantial, for example if we compare two 25 mm thick rotors, one containing a cylindrical magnet of a diameter of 25 mm and once containing a trapezoidal magnet with a=30, b=20, c=25 the material savings in the cylindrical magnet would be 21.46%. In certain embodiments, the material savings in the magnets would be at least 10%, 15%, 20%, 30%, 40%, 50%, or 60%. In certain embodiments, the material savings in the magnets would be between 10% to 60%, 15% to 25%, 15% to 40%, 20% to 60%, 20% to 35%, 30% to 60% or 35% to 55% In certain embodiments, the savings may be calculated as follows:

$$V_{saving\%} = \left(1 - \frac{\pi 25}{2(30+20)}\right) \times 100 = \left(1 - \frac{\pi 25}{100}\right) \times 100$$

$$\therefore V_{saving\%} = 21.46(\%)$$

In regards to peak power, more power may be transferred in a square wave than in a sine wave. The effective power that may be imparted into the coil by a sine wave is 1 divide by a square root of 2 (approximately ⅔) while the effective power of a square wave is 1. In terms of the effectiveness of the mechanical energy that can be converted by a square wave vs. a sine wave is dependent at least in part on the design of the coils and the magnets.

Magnets Saving Through Shared Platter Stacks

Figure 3:
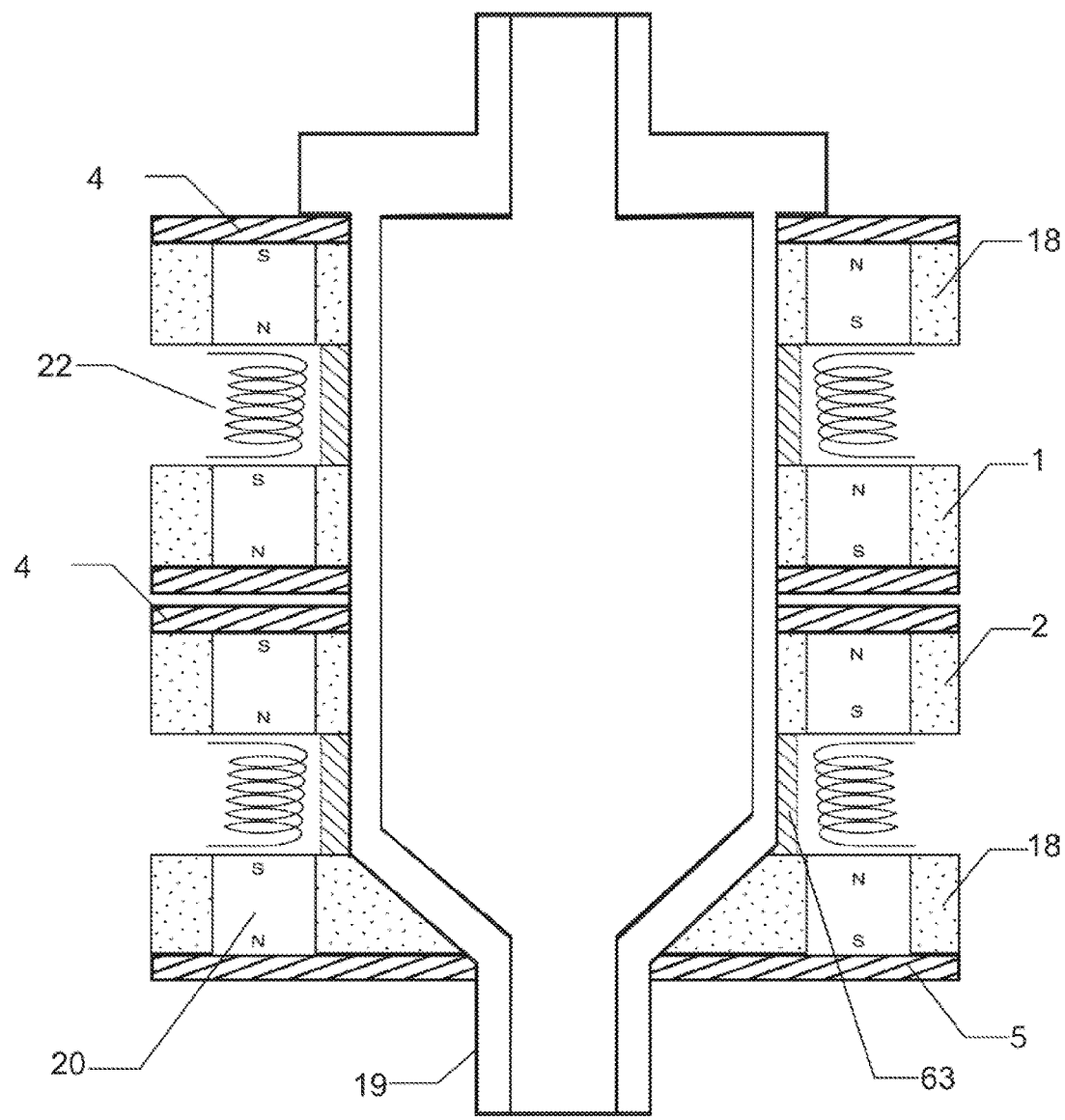
FIG. 3 is a side view of an electrical machine that is made up of two electrical machines that are back to back and share a common rotor shaft, according to certain embodiments.
Figure 4:
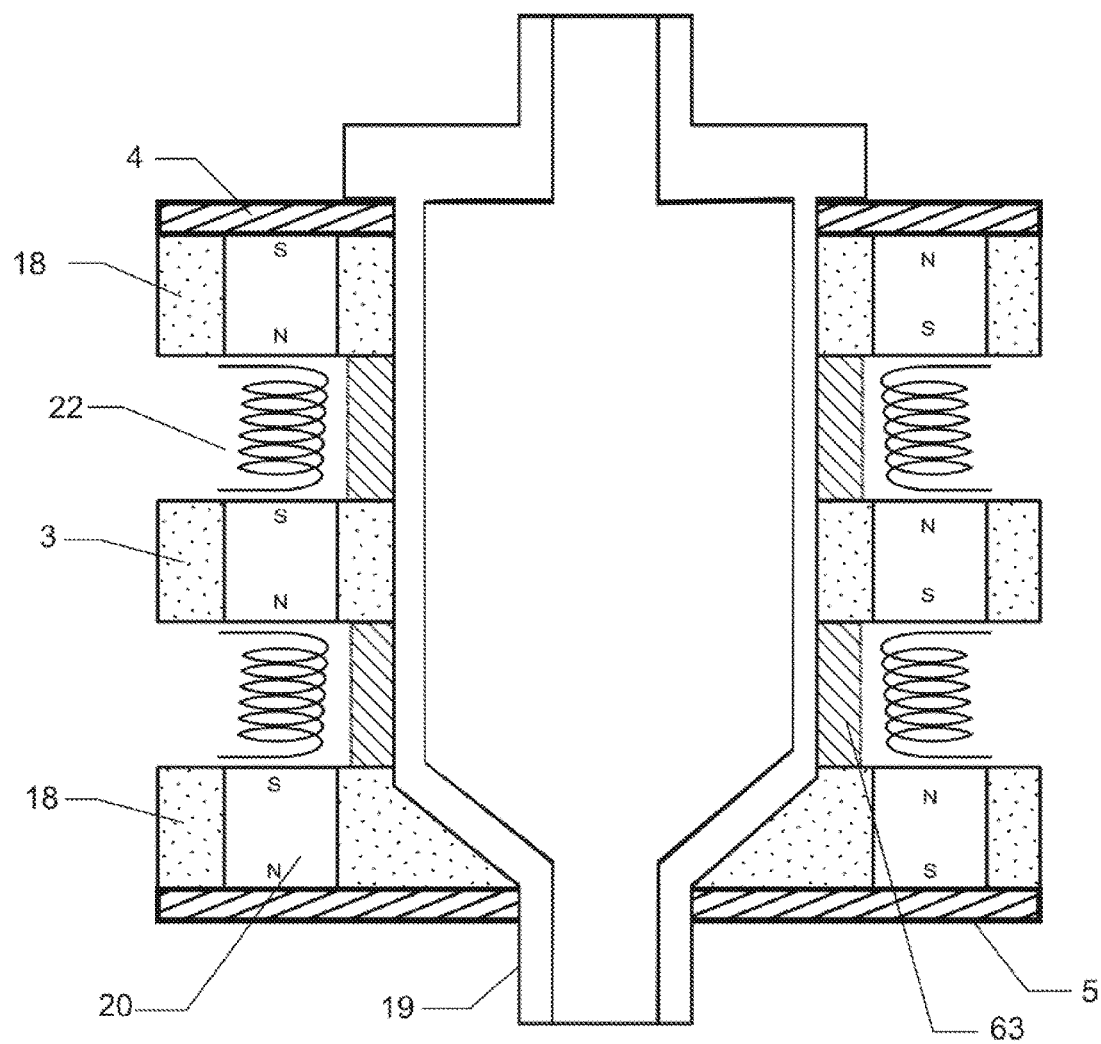
FIG. 4 is a side view of the electrical machine illustrated in FIG. 3 but these embodiments share a common magnet rotor.

In certain embodiments, the device may be extended to provide more power by connecting two motors back to back as illustrated in FIG. 3. A weight and/or cost saving may be achieved by sharing of rotors as illustrated in FIG. 4. In this example, the total number of magnets is reduced by sharing the inner rotors, segments 1 and 2, combining them into one rotor, segment 3. Further, only the outer platters, segments 4 and 5 require back irons to contain the magnetic field inside the device, as opposed to the unshared configuration which requires all rotors to be shielded (a total of 4 plates). Typically, the back irons are heavy and thus there is a substantial weight saving through sharing inner rotors. Further the device is more compact, saving the mass of the associated materials. In other words: Total number of magnets (unshared):

$$n_{total_{unshared}} = n_{platters} \times m; \quad m = \text{number of magnets per platter}$$

Total number of magnets (shared centre rotor platter):

$$n_{total_{shared}} = \left(n_{unshared} - \left(\frac{n_{unshared}}{2} - 1\right)\right) \times m$$

Left Figure:

$$n_{total_{unshared}} = 4 \times 17; \text{ Assuming 17 magnets per platter}$$

$$n_{total_{unshared}} = 68$$

Right Figure:

$$n_{total_{shared}} = \left(4 - \left(\frac{4}{2} - 1\right)\right) \times 17$$

$$n_{total_{shared}} = 51$$

Figure 5:
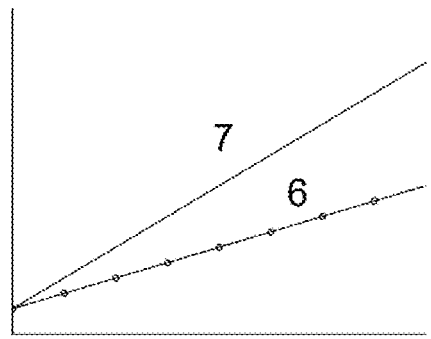
FIG. 5 is a graph that shows how the total magnet count decreases as the number of coil stages increases, according to certain embodiments.

FIG. 5 is a graph that illustrates the reduction in the number of magnets when common magnetic rotors are shared between multiple stators. This example is based on rotors with 18 magnets, but the general trends hold true for a range of embodiments. The x axis illustrates the number of stators, and the Y axis indicates the number of magnets. A comparison is made between a configuration sharing common internal rotor platters 6, to a configuration without shared rotor platters 7. It illustrates that there are significant saving in the number of magnets required, and thus cost, space and weight savings, when the platters are shared. This saving tends linearly towards almost 50° % or more platters are used.

Torque Smoothing

A traditional motor with only a single phase supply is only able to apply peak power to the shaft twice per rotation. A basic comparison between motor configurations may be used by assuming the resulting rotational torque is proportional to the sine of the angular difference of the coils to the permanent magnets ($\tau\alpha \sin(F)$)

In this exemplary embodiment it is assume that for the number of phases in a motor, the power applied is constant. As the numbers of phases in the motor are increased, the power is distributed and applied more evenly. For a three phase motor, it provides maximum power and torque to the shaft 6 times per rotation. Its maximum instantaneous power is less than the single phase motor. Since certain embodiments of the present disclosure may have at least 17 to 1024 independently controllable phases. Certain embodiments may have between 17 to 1021, 19 to 1181, 29 to 109, 53 to 127, 89 to 257, 211 to 331, 199, to 577, 433 to 751, 577 to 1051, 613 to 757, 619 to 919, 773 to 857, 787 1021 or 811 to 1283 independently controllable phases. Certain embodiments may have between 10 to 1050, 20 to 40, 30 to 50, 50 to 1200, 75 to 150, 200 to 500, 400 to 1200, 600 to 900 or 700 to 1100. This distributes power more evenly throughout a single rotation and results in smooth torque being applied to a load.

Figure 6:
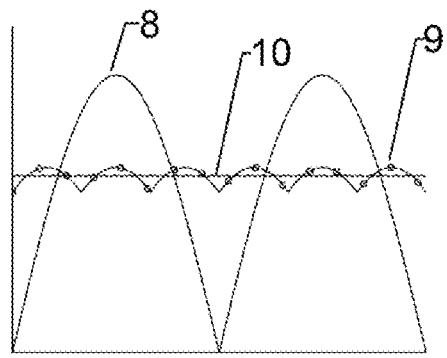
FIG. 6 is a graph torque comparison, according to certain embodiments.

A simple comparison of maximum producible instantaneous torque throughout a motors rotation is presented in FIG. 6. This graph demonstrates the relative torque on the y axis a similarly rated single phase 8, three phase 9 and 17 phase electrical machine 10. The x axis indicates the motors angular position over a range of 0 to 360 degrees. Because the 17 phase electrical machine configuration effectively has more phases than the other electrical machine configurations it has a more constant producible torque and a much smoother torque without any smart software control or otherwise controlling the electrical machine. In certain applications the achievable torque may be even smoother with the aid of software algorithms and feedback control. Although the peak instantaneous torque producible of the other motor configurations is larger than that of the 17 phase electrical machine, the power being delivered is approximately the same, the power from the other motor types is applied largely in short bursts making it harder to control.

One of the features of certain disclosed embodiments is that there may be an offset between a coil and a pair of magnets, i.e.: if there is n coils and n+1 magnets, then the magnets may not perfectly align with the coils. This ensures that the electrical machine of these embodiments will be able to turn on at least one coil to turn the machine, while also having the effect of smoothing the torque applied to the machine. Because there is an offset between coils and magnets, it has the effect of making the motor into an n phase motor. In a traditional electric motor, when less power is required, the amount of power applied in each rotation to the motor is reduced. This reduces the produced torque non-linearly. In certain disclosed embodiments as one or more coils (or each coil) are able to be digitally controlled, coils that produce less optimal instantaneous torque onto their corresponding magnet may be turned off. This causes a non-linear reduction in torque with respect to reduction in power.

Figure 7:
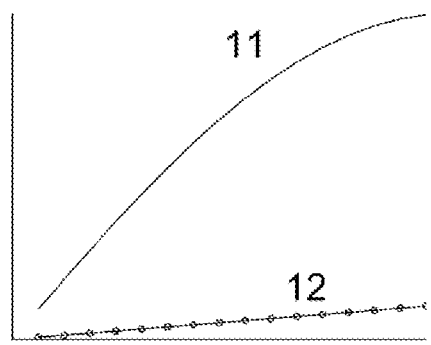
FIG. 7 is a graph comparing the power losses due to electrical resistance of certain embodiments.

FIG. 7 illustrates the non-linear increase in heat generated due to resistive losses as power is increased in different electrical machines with different number of phases, with comparative power between the electrical machines Certain embodiments of a 17 phase machine 11 are compared to a three phase 12 machines with substantially identical input power. The x axis is a comparative axis of the percentage of power and the y axis is the power loss through resistive heating. This demonstrates the superior power handling capability of the certain embodiments disclosed herein, if the power to the coils is linearly adjusted from 0 to 100% which is possible due to direct microprocessor control. Having more phases for power divides the current supplied between each of the phases substantially equally and as such the power loss due to resistive heating is non-linearly reduced by the factor of the number of phases, as power loss is typically equal to the current squared times the resistance of its conductor. This means that to deliver the same power as other motor types certain embodiments may be much smaller and/or lighter than existing motor types and/or be capable of handling higher power requirements and outputs.

Torque Smoothing Vs. Operating Frequency

Because torque applied at any instantaneous moment is a function of the angle of the motor platter, the apparent torque smoothing will vary with frequency, i.e.: as the motor speeds up, the variations in torque will become less obvious. Since certain embodiments may be operated with n phases, one or more coils (or each coil) may operate n times faster than it would on a single phase motor. The torque may be further smoothed by using digital algorithms to limit the maximum power applied to a coil in the optimal position. This may have the effect of slightly reducing the maximum torque, but would substantial smooth the torque output FIG. 6 shows a graph that demonstrates the superior torque smoothing of certain digital axial flux motor embodiment compared to some standard motor types. One of the advantages of the motors in these embodiments is that it can individually control power to each coil (or one or more coils), allowing it to maintain suitably high output powers and/or torques while keeping its n phase torque smoothing characteristics. These embodiments have the ability to change on the fly, for lower rpm's where torque smoothing is more important, the motor may intelligently apply a smoothing profile, or a profile for suitable maximum torque and/or output power as it is required, or at higher rpm's.

Rotor

Exemplary embodiments of the present disclosure may consist of one or more rotors. One of their purposes is to create a magnetic field in the vicinity of the electromagnets, such that the stator coils induce torque in the rotor. Magnets may be secured within the rotor via multiple methods. For example by gluing; clamping (between two or more rotor layers) and/or interference fit (with the surrounding hole); mechanically fixing (for example, bolted, threaded or other suitable ways); welding (when applicable to chosen magnet and/or rotor material); sintering; other effective means or combinations thereof.

The rotor may be constructed from a number of materials. Construction materials chosen for the rotor may vary depending on the application of the motor, as well as the chosen magnetic field strength between the rotors. In certain embodiments, the chosen material will typically be of sufficient Young's Modulus (stiffness) to prevent unacceptable deformation or substantial deformation due to the axial magnetic forces between two separate rotor platters. Materials used may include (but are not limited to): aluminium; polymers, such as HDPE (High density polyethylene); fibre reinforced polymers, such as carbon fibre or fibreglass; other suitable materials or combinations thereof.

Magnetic Rotors: In certain embodiments, the need for separate magnets (which are then attached to the rotors) may be eliminated (or reduced) through the use of sintering to bond separate magnets and the mechanical casing into substantially one structure. A finishing surface may then be applied (for example, nickel, epoxy) to increase mechanical strength and/or durability.

Reluctance configuration: In certain embodiments, it is possible for the magnets to be replaced in whole or in part with a ferrous annular ring or disk and/or with a series of partial depth radial slots creating a series of protruding fins. When a fin is within the vicinity of the magnetic field of the stator that fin may rotate and align itself with that field, resulting in a reluctance motor configuration. Inductance configuration: In certain embodiments, by replacing one or more, a substantial portion of, or all of the magnets in the rotors with coils, the stator coils magnetic fields will induce magnetic fields in the rotor coils. In certain embodiments by wiring the rotor coils to their symmetric or offset equivalent coils (with respect to the rotor), opposing magnetic fields may be induced, resulting in rotational forces. Material Reduction: for certain applications it may be advantageous to reduce the rotational inertia of the rotor and/or shaft assembly. To this end the rotor discs may have their shape changed to remove excess material which is not necessary to the mechanical structure of the disk.

Shaft and Spacers: In certain embodiments, the rotor assembly may be located within or partial within the motor enclosure through the use of a shaft. This shaft may have a non-uniform diameter such that translational movement of the rotor magnet platters in the rotational axis of the shaft is reduced, substantially prevented or prevented. The translational forces may be absorbed from the shaft into the casing. Methods include (but are not limited to): axial thrust bearings or other ball, pin or conical bearings; interference between shaft and assembly with low friction surface; the shaft may be of sufficient diameter and/or stiffness such that bending due to magnetic forces between rotor platters does not occur or is sufficiently reduced. In certain embodiments, the materials that may be used for shafts and/or spacers include metals (such as steel, aluminum), polymers or other suitable materials. Torque transmission: In certain embodiments, once torque is induced in the rotor it may be transmitted either mechanically through direct fixture to a shaft, via magnetic couple to an external magnetic platter, mechanical coupling to a shaft (egg. via a clutch), other suitable means or combinations thereof. In certain embodiments, it is possible for the shaft to be removed entirely (or partially) and replaced with a spacer, or multiple spacers, to separate two or more rotor platters. In these configurations the assembly may be located within the enclosure through the use of magnetic suspension. Alternatively, in certain embodiments, an annular bearing supporting the inner or outer radial edge of the rotors (or a substantially portion of the rotors) may be used. These configurations may or may not use a centre spacer to separate rotors axially, depending on the number of bearings used.

Magnets

Certain embodiments of the electrical machine disclosed herein may incorporate different types and/or shapes of magnets. One of the purposes of the magnets is to induce a magnetic field, through which suspended electromagnetic coils can pass (thus inducing kinetic forces on the coils/rotors). Applicable types of magnets include, for example: rare earth magnets including but not limited to Neodymium, Neodymium-boron, Samarium-cobalt alloys or combinations thereof; various types of superconducting magnets; standard and/or permanent magnets made of materials such as but not limited to Alnico, Bismano, Cunife, Ferico, Heusler, Metglas, and other magnetic alloys or combinations thereof electromagnets, such as wire coils, that may induce an electromagnetic field, magnetic fields resulting from materials with encoded quantum spin effects; induction magnets, in which ferrous material exposed to a perpendicular, or substantially perpendicular, electromagnetic field may be subject to a force pulling it towards the center of the electromagnetic field, other suitable magnets; or combinations thereof.

In certain embodiments, magnet shapes that could be used but not limited to are: cylinders; cuboids (suitable 3D shapes); segmented, where the magnet is made up of in whole or in part a cluster of smaller magnets; Trapezoidal; solid or hollow (e.g. toroidal shape or hollow cylinder); Groups, either of the substantial the same polarity or opposing; angular and/or radially offset repetition of above arrangements; other suitable shapes for a particular application; or combinations thereof. The thickness of magnets may be either equal to or not be equal to the stator mount/platter thickness. The thickness of coils may be variable to suit the application. In certain embodiments, the number of magnets and coils may or may not be set such that: the number of coils never is the same as the number of magnets, to ensure one or more, a substantially plurality or all the magnets and coils never completely align; if number of coils is equal to number of magnets, the magnet or coil position is geometrically offset to substantially prevent, prevent, or reduce their concentric alignment or combinations thereof. In certain embodiments, the magnets and/or coils may be aligned such that: magnets may suitably axially aligned with coils or vice-versa, such as in an axial flux configuration; magnets are suitably axially misaligned with coils or vice-versa up to 20, 25, 30, 35, 40, 45, 50, 55, 60, or 65 degrees; aligned, or substantially aligned, with the platter; substantially perpendicular, or perpendicular, to platter other suitable configurations perpendicular or combinations thereof.

Stator

Figure 8:
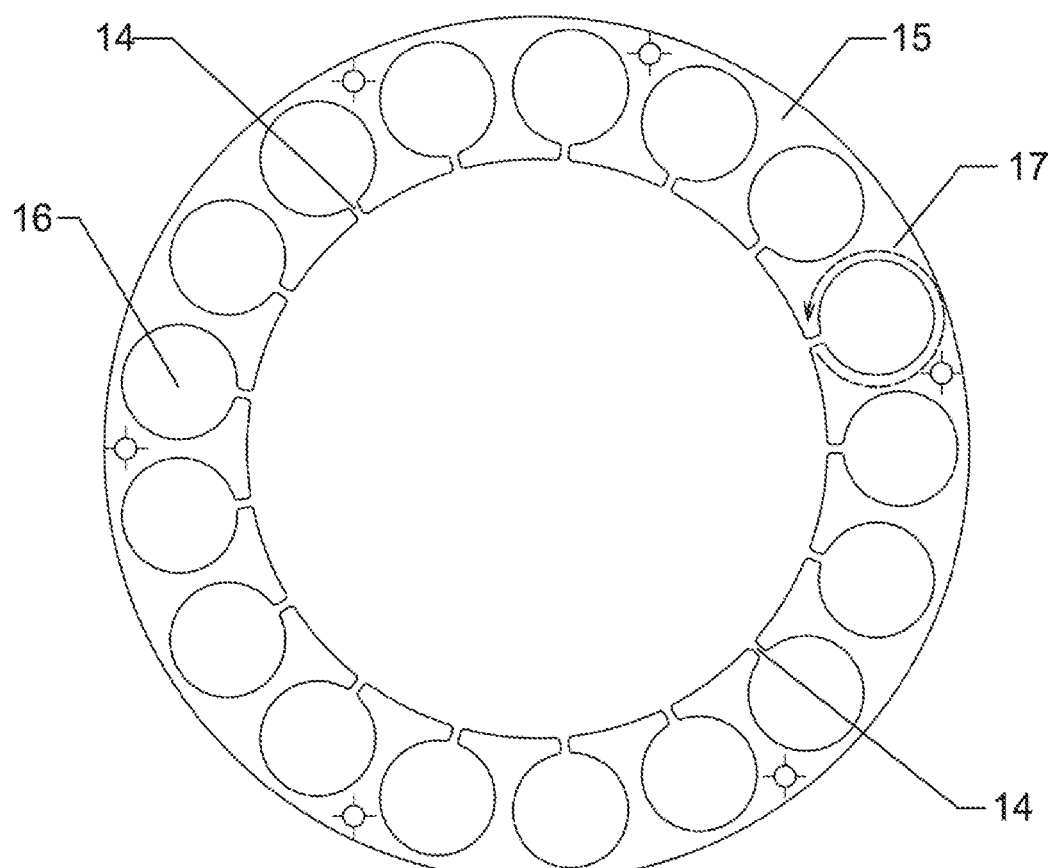
FIG. 8 illustrates a gap in the conductive region of the stator, according to certain embodiments.

Certain embodiments of the disclosed electrical machines may incorporate one or more stators which may be used to locate the electric coils. The stator may be incorporated directly into the casing, independent or a combination thereof. As such the materials chosen for the stator follow the same convention outlined in the 'Material' section of the casing description or disclosed elsewhere herein. The chosen material may be highly (or suitably) conductive both electrically and/or thermally. In certain embodiments, the one or more stators may be used as electrical conductor (power delivery), as heat sinks (from the electronics and coils to casing), as well as mechanically supporting the coils and electronics or combinations thereof. In certain embodiments, the one or more stators may allow transmission of communication signals, either digital or analog, superimposed on the power layer, on its own layer, or combinations thereof. Thus, layers in the stator may be electrically insulated from each other, if they are used for electrical conduction purposes. In certain embodiments, methods of insulation may include: oxide layers on metallic surfaces; using insulating materials between layers such as plastics or other appropriate materials, or combinations thereof. In certain embodiments, gaps may be included in the one or more stators to reduce material required and/or the weight. When the stator is constructed out of conductive material gaps may be added to eliminate eddy currents from forming around the coil. For example as shown in FIG. 8 a gap 14 in the conductive stator 15 is introduced in the stator near the location of the mounting hole for the magnetic coil 16 breaking the conduction path of the eddy current 17 induced when a current flows through the magnetic coil. In certain embodiments, the gaps are located such that two concentric annular rings are not formed radially on either side of the ring formed by the coils.

Coils

Figure 9:
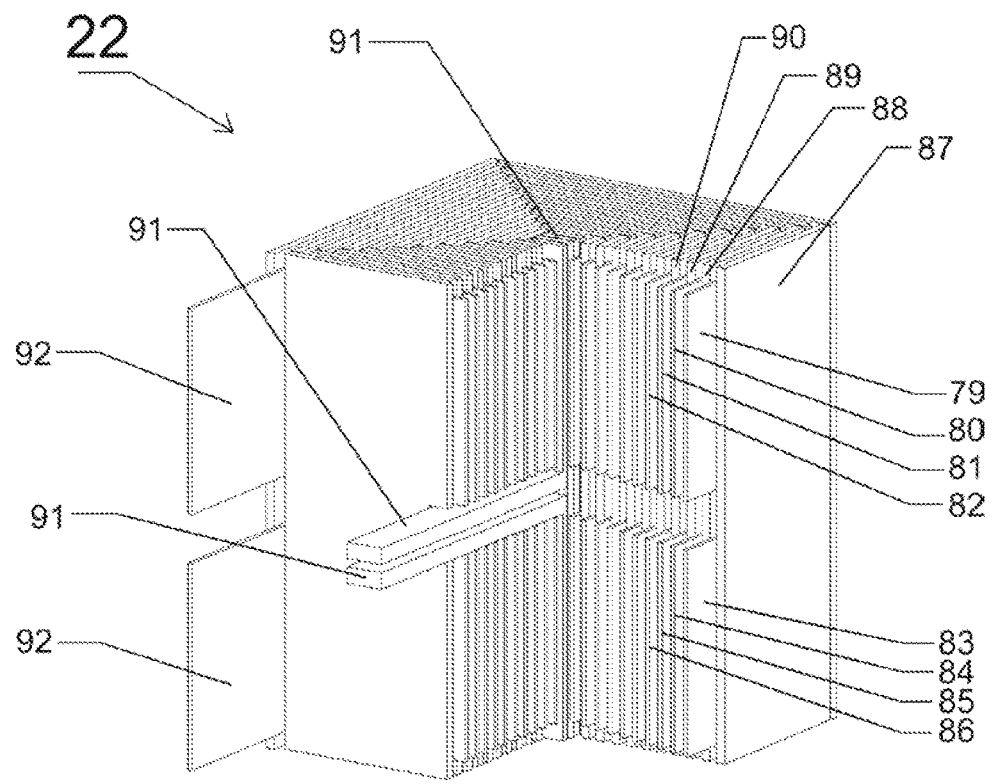
FIG. 9 is a partially cut-away view of the electromagnetic coils, according to certain embodiments of the present disclosure.

Certain embodiments of the disclosed electrical machines may incorporate different types and/or shapes of inductive coils, the purpose of which is to by use of electric current, induce and/or alter an existing electromagnetic field, creating a force which causes the rotor of the motor to turn. In certain embodiments, the coils may be constructed of sufficient materials to handle both the heat and the electric current requirements of the motor, the coils may be constructed so as to lower the electrical resistance to ensure there is minimal power loss due to resistive heating; the coil may be constructed such that they produce a magnetic field sufficiently large enough to create sufficient force or combinations thereof. One exemplary coil is shown in FIG. 9.

In certain embodiments, coils may be constructed as an air core, the conductive material is wrapped or rolled in such a way that there is an air gap in the middle of the coil; solid core, there is no (or suitably little) air gap in the middle of the coil. In certain embodiments, the core may either be made of the conductive material used or be a non-conductive material, either ferrous or nonferrous. Ferrous materials with a high magnetic permeability increase the magnitude of the magnetic field for a given current before the magnetic material saturates. In certain embodiments, the coil may be interleaved, the coil is made from conductive ribbon and/or sheet. The ribbon is coiled from the centre core to the outside while interleaving layers of insulated ferrous materials. The ferrous material acts as an insulator and as a core material to enhance magnetic field proportional to the number of loops of the ribbon. The magnetic field may reach its maximum magnitude at the centre of the coil with a sine distribution on either side. Combinations of the various constructions disclosed herein are also contemplated. The coils may be constructed in one or more of the following shapes: round/cylindrical, square/cuboid, trapezoidal, solid or hollow (air gap)/annular, and other suitable shapes.

In certain embodiments, the electromagnetic coils may be wound, bent and/or otherwise constructed from one or more pieces of a conducting material, or a sufficiently conducting material. The coils may be 3D printed or otherwise made. The conductor may be 3D printed along with a core (if 2 material (or more) 3D printing is used). The conductor may be 3D printed and the core added in a separate process. 3D printing refers to selective laser sintering, selective electron beam melting and/or other selective deposition techniques.

In certain embodiments, coils may be affixed to the stator by: a glue/bonding agent, clamping, mechanically, welded, 3D printed directly with the stator plate, or combinations thereof.

In certain embodiments, the conductor of the coil may be composed of copper, aluminum, carbon structures such as graphene or other suitable conductive material.

In certain embodiments, the ferrous material may be constructed out of electrical steel, amorphous metal or other high magnetic permeability material.

Coils and/or Magnet Positions

In certain embodiments, coils and/or magnets may be arranged/varied in many different physical configurations. In certain embodiments, an axial flux configuration may be used comprising: at least one, two or multiple rotor platters of magnets creating an alternating magnetic field parallel, or substantially parallel, to the axel; and a plurality of coils between magnetic fields.

Figure 10:
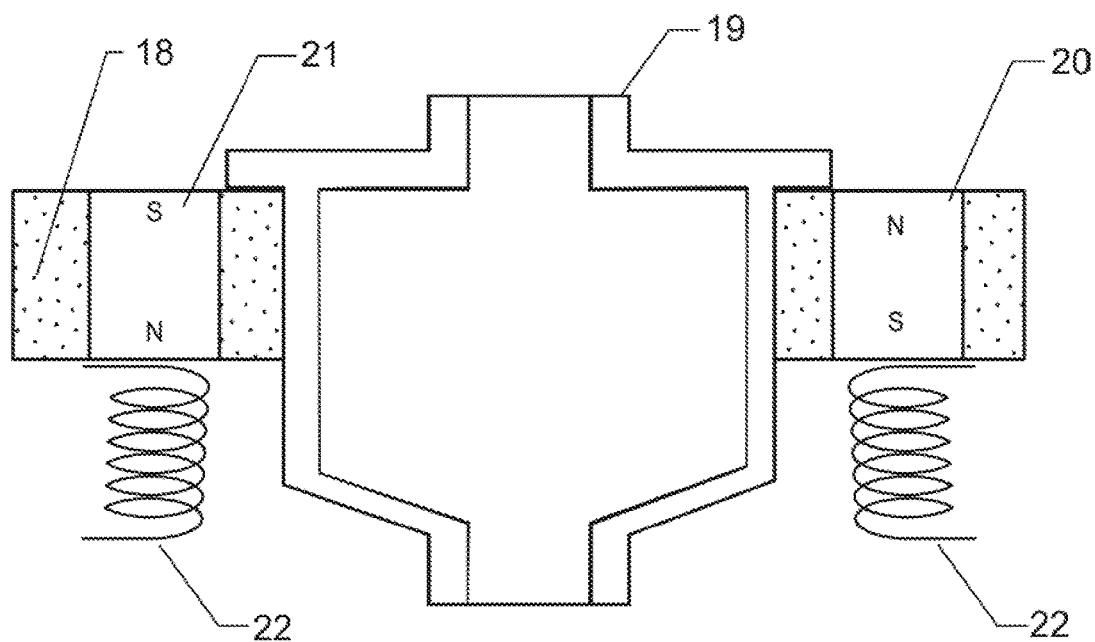
FIG. 10 illustrates a cross section view of a rotor platter configuration according to certain embodiments.
Figure 11:
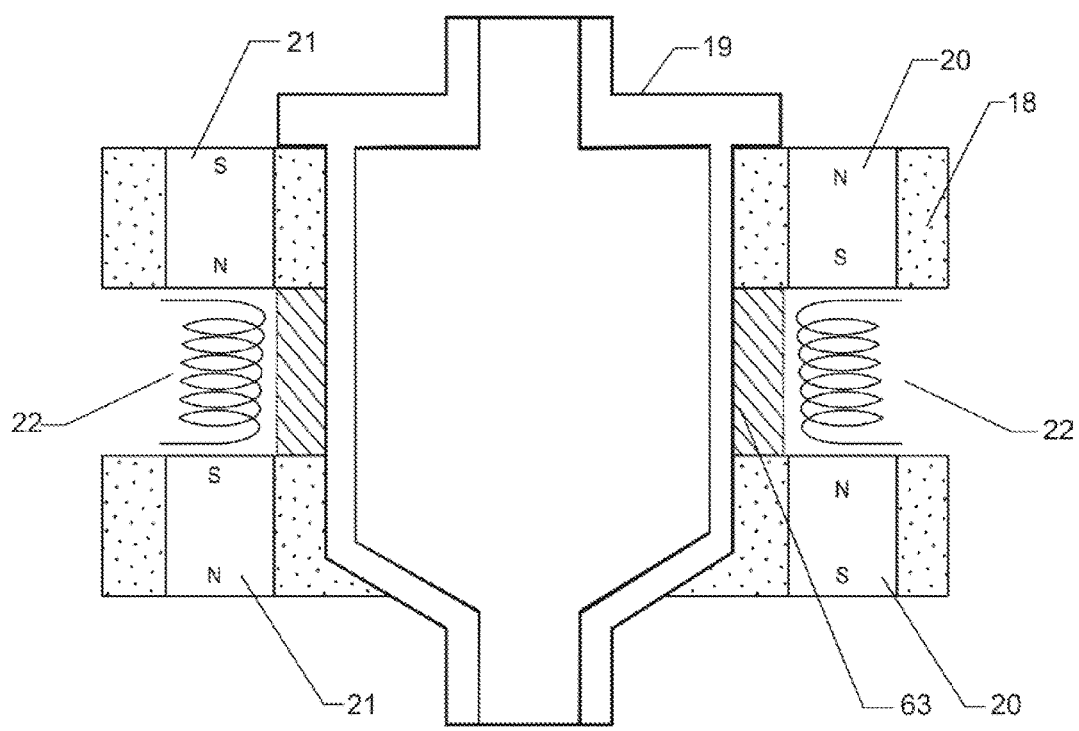
FIG. 11 illustrates a cross section view of two rotor platters configuration according to certain embodiments.
Figure 12:
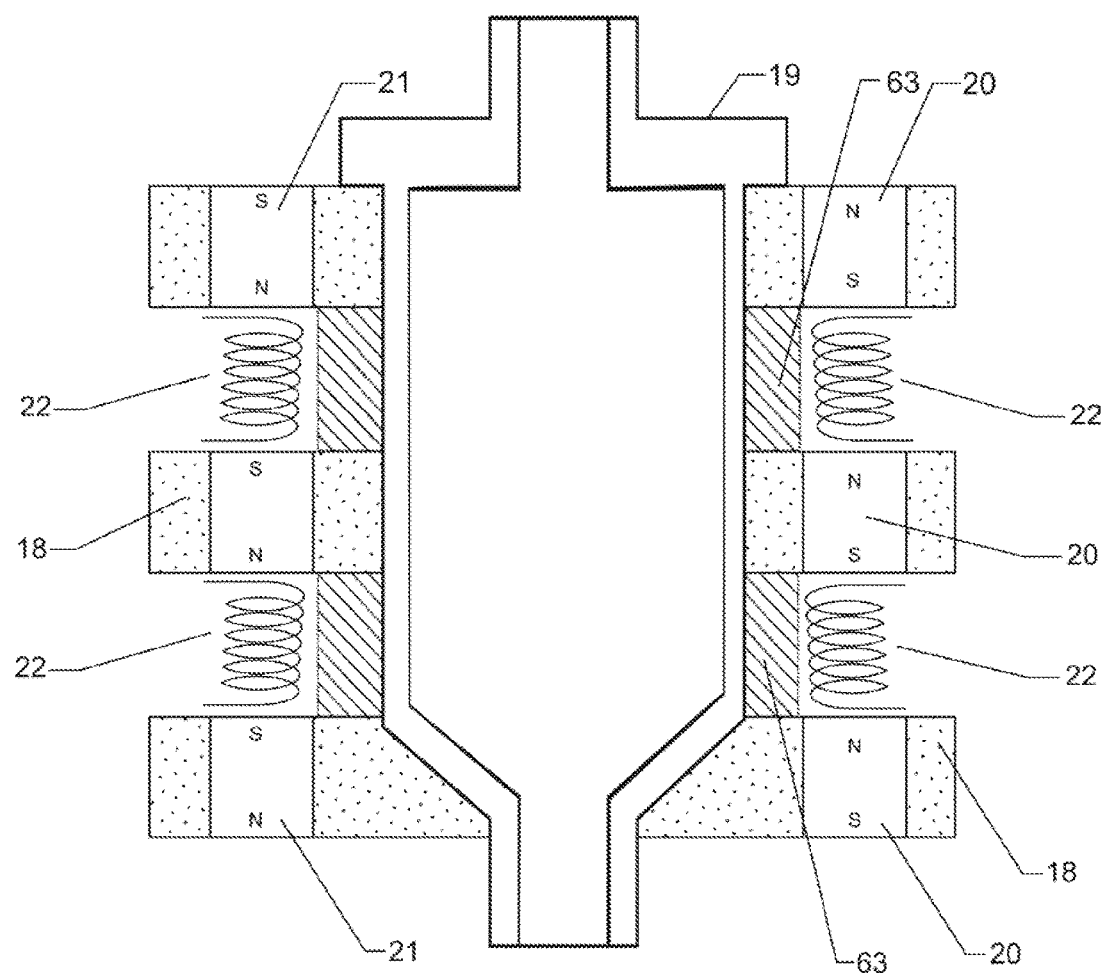
FIG. 12 illustrates a cross section view of a three rotor platters configuration according to certain embodiments.

FIGS. 10, 11 and 12 exemplify a number of different configurations of the electrical machine. FIG. 10 illustrates a cross section view of a rotor platter configuration according to certain embodiments. The platter 18 has a differential carrier 19 and a plurality of alternating pole orientation magnets 20 and 21 (in this exemplary embodiment 18 magnets are present) and coils 22 (in this exemplary embodiment 23 coils are present). The magnets are arranged in a substantial concentric configuration arrangement near the outer edge of the platter. FIG. 11 is similar to FIG. 10, but has two rotor, element 8 which create a more concentrated magnetic field across the coils, 22. Also shown is a spacer 63 between the two platters. FIG. 12 is similar to FIG. 10 in a triple rotor platter configuration. This configuration permits more power to be added by adding appending extra coil platters.

Figure 13:
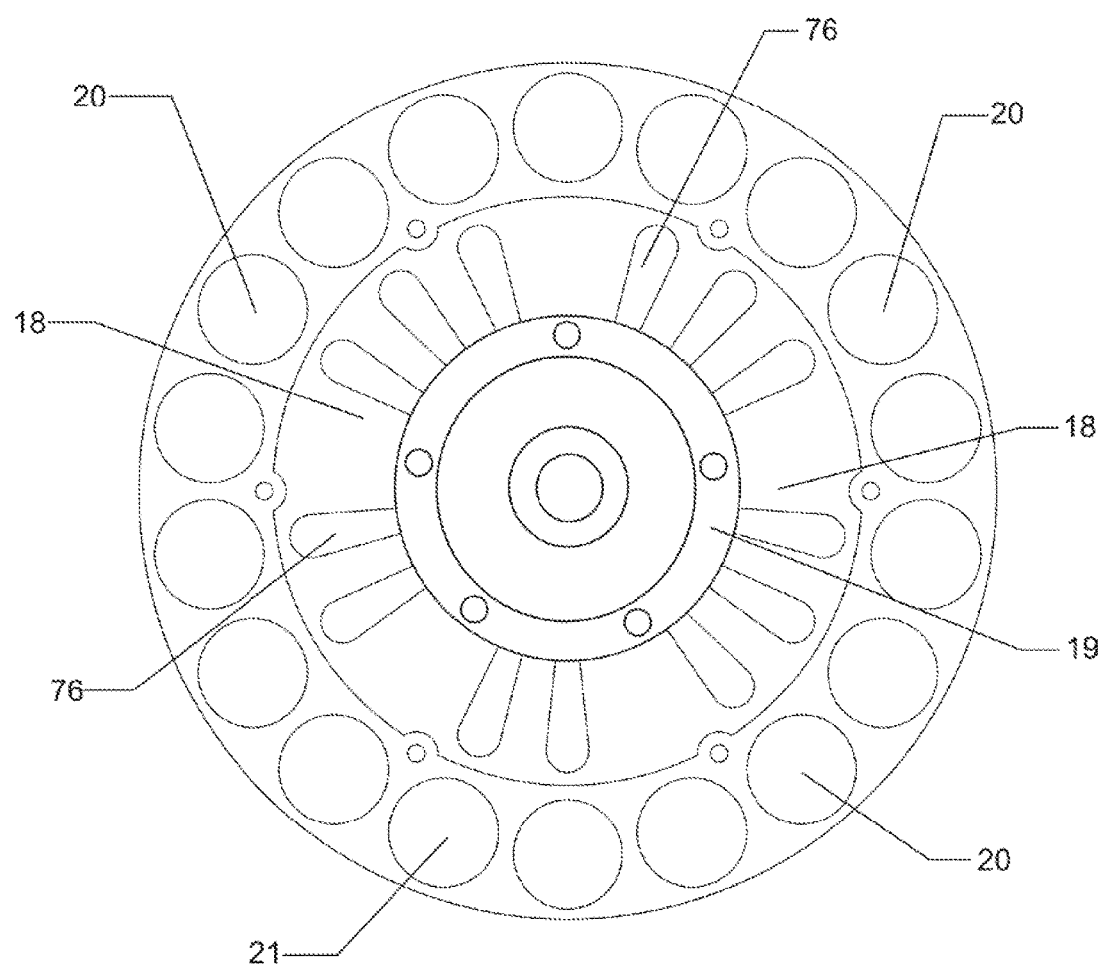
FIG. 13 is a face view of a rotor of the electric motor of FIG. 10, according to certain embodiments.

FIG. 13 shows a top down view of the rotor platter 18 in the configurations illustrated in FIGS. 10 to 12. Shown are the 18 alternating polarity cylindrical magnets 20 and 21, distributed radially on the rotor platter 18. Also shown is the location of the differential carrier 19.

Figure 14:
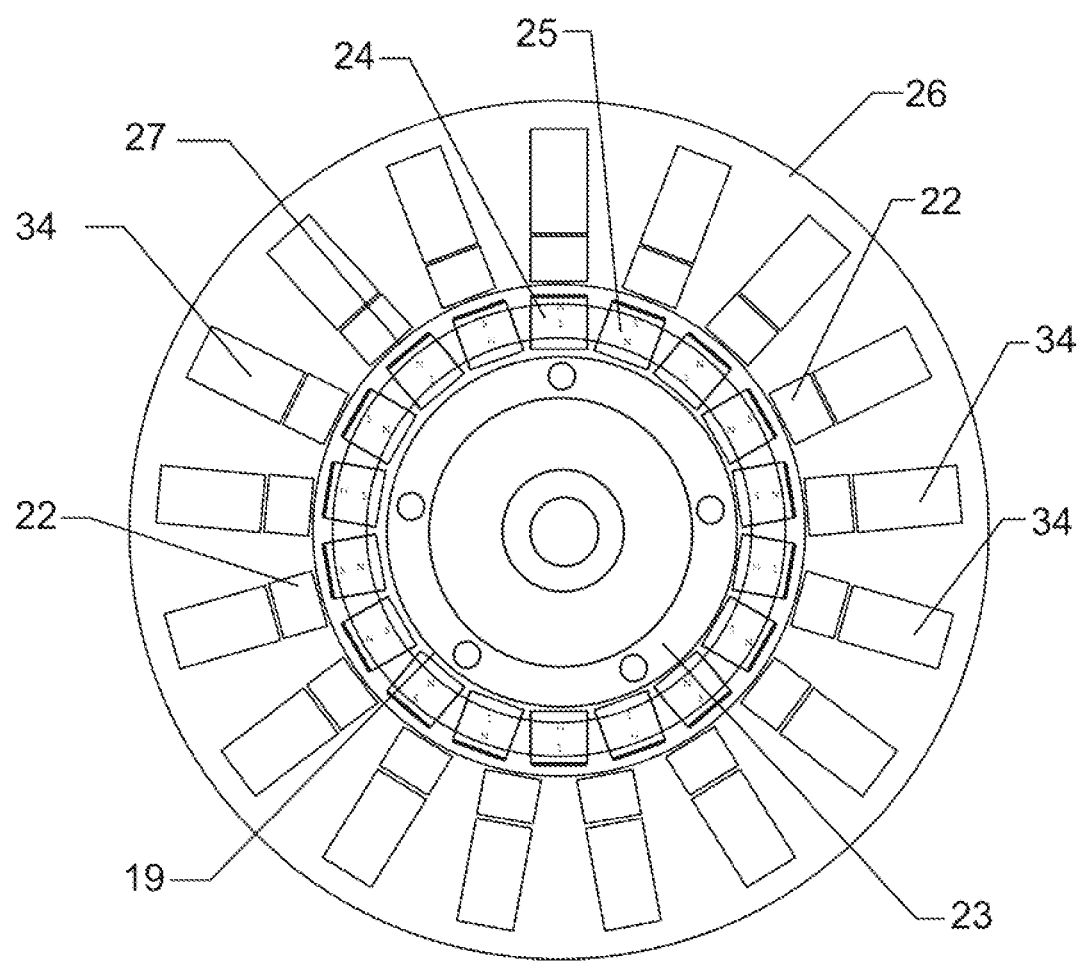
FIG. 14 shows a schematic top view of a rotor platter and coil configuration, according to certain embodiments.
Figure 15:
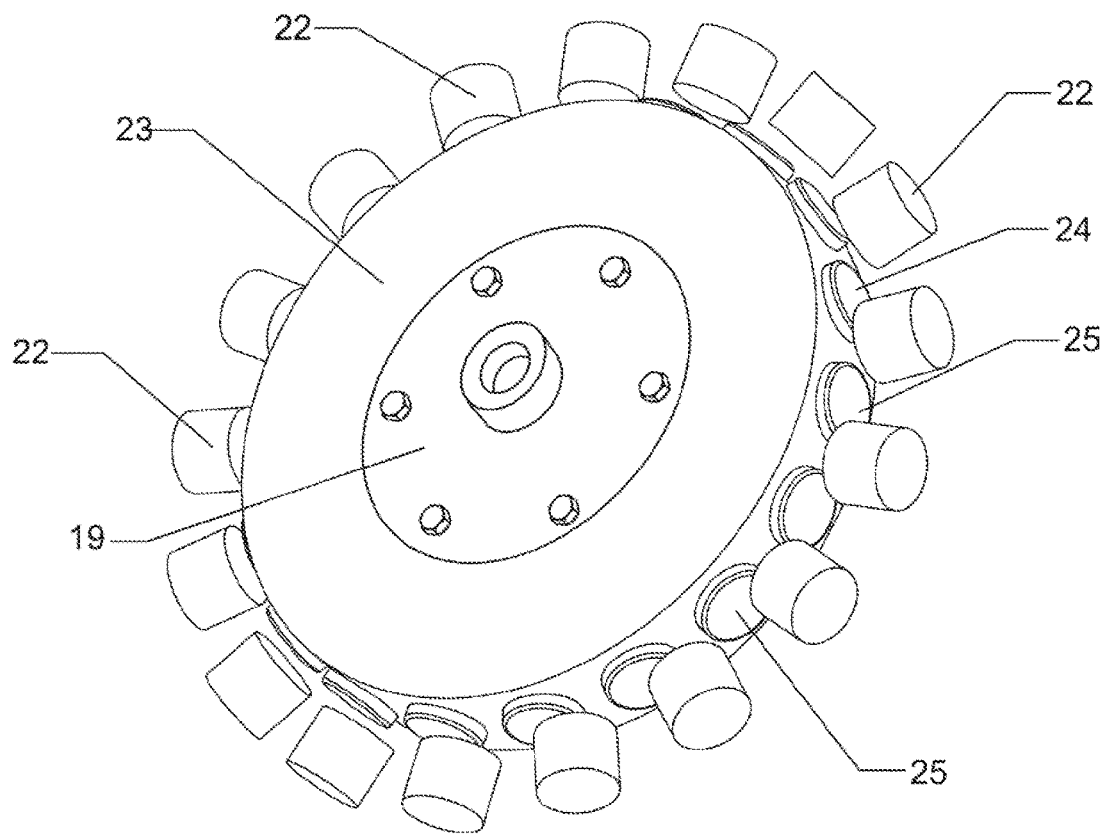
FIG. 15 shows a perspective view of the configuration of FIG. 14.

Certain embodiments of the disclosed electrical machines may be configured in a substantially circular array (radially aligned) wherein: a plurality magnets and a plurality of coils may be axially perpendicular (or substantially perpendicular) to at least one rotor shaft's primary axis. In these embodiments, the magnetic properties of a normal axially aligned stator motor are present with the added benefits of fine grained adaptive magnetic flux control. FIG. 14 shows a schematic top view of a rotor platter 23 wherein the magnets 24 and 25 are axially perpendicular (or substantially perpendicular) to the rotor's differential carrier 10 and are at least partially within the platter, according to certain embodiments. Also shown are a plurality of coils 22 that are also axially perpendicular (or substantially perpendicular) to the rotor's differential carrier 10 and are configured concentrically around the outer radius of the platter embodiments. The stator 26 can be seen holding coils 22 radially around the magnets. A clearance gap 27 can be seen between the magnets and the coils. FIG. 15 shows a perspective view of the configuration of FIG. 14.

Certain embodiments of the disclosed electrical machines may be configured in a substantially circular array (radially aligned) wherein: a plurality magnets and a plurality of coils may axially perpendicular (or substantially perpendicular) to at least one rotor shaft's primary axis. Such embodiments have the magnetic properties of a normal axially aligned stator motor, with the added benefits of fine grained adaptive magnetic flux control.

End Caps

Figure 16:
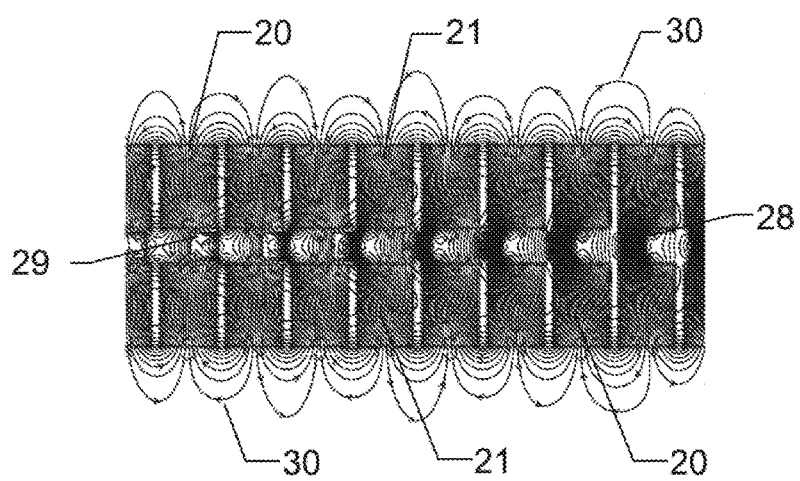
FIG. 16 shows in side view an example of the magnetic field lines between two magnetic rotors and one coil platter, without end caps, according to certain embodiments.
Figure 17:
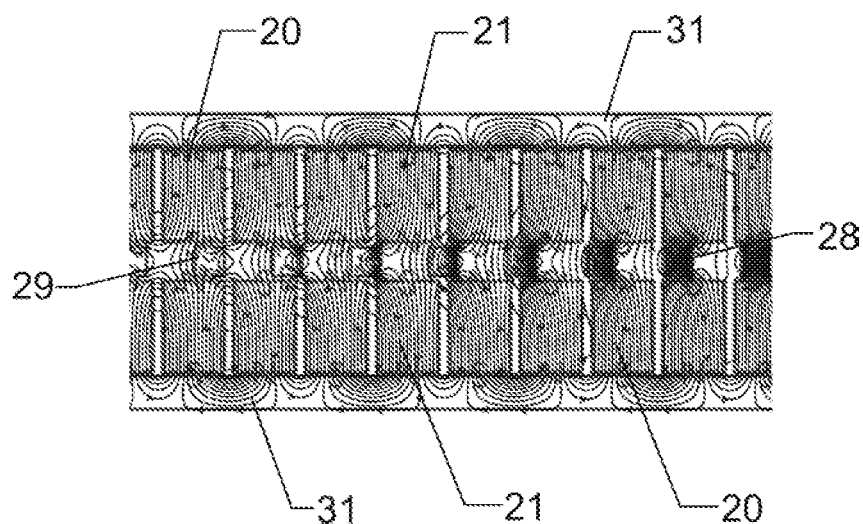
FIG. 17 shows in side view an example of the magnetic field lines between two magnetic rotors and one coil platter, with ferrous steel end caps, according to certain embodiments.
Figure 18:
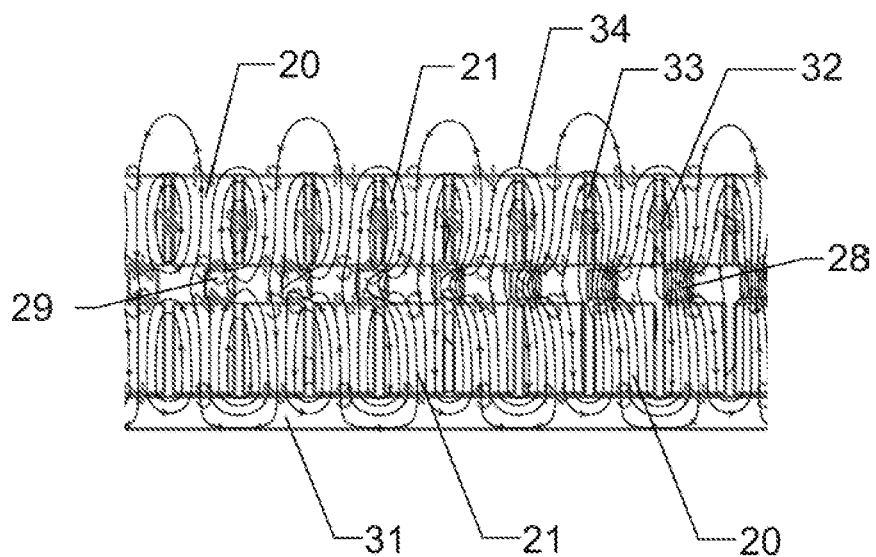
FIG. 18 shows an example of the magnetic field lines between two magnetic rotors and one coil platter, with the top rotor consisting of magnets aligned in a Halbach array, according to certain embodiments.

Magnetic fields that are not constrained may couple onto conductive surfaces and induce eddy currents which may create magnetic fields opposing the motion of the magnets. For example, FIG. 16 is a side cross-sectional magnetic field diagram of a linear array of evenly distributed magnets, where consecutive magnets 20 have their north pole facing up, and the rest of the magnets 21 have their north pole facing down, with electromagnetic coils in the middle inducing a magnetic field north 28 and south 29. FIG. 16 illustrates the external radiating magnetic field 30 without any shielding. FIG. 17 illustrates the reduction in radiated electromagnetic energy in the scenario described in FIG. 16 with ferrous shielding plates 31 added. In certain embodiments, a Halbach array arrangement may be used instead of the ferrous shielding FIG. 18 illustrates the reduction in radiated electromagnetic energy in the application described in FIG. 16 with a Halbach array arrangement of magnets used on the top platter. The Halbach array arrangement may use smaller magnets 32, and opposite polarity magnets 33. The smaller magnet is positioned between the two larger magnets with a magnetic field substantially perpendicular to those of the bigger magnets. The smaller magnet bends the magnetic field lines from the first large magnet to the next large magnet and reduces the distance to which the flux loops past the end of the plate 33. This has close to the same effect of adding a ferrous shield to the system, and may dramatically reduce the external electromagnetic energy; this has the effect of saving the weight of the ferrous shielding plates that would otherwise be used in this application. Ferrous shielding 31 is used on the bottom layer of magnets for comparison.

Enclosure

The enclosures discussed herein serve numerous purposes. In certain embodiments, it may be designed to cover or enclose (partially, substantially or fully) the moving parts and circuit boards, it can also hold one or more coils in place, the electronics in place, provides a source of heat sinking away from the coils and/or electronics, it can support the bearings and/or absorb axial forces on the shaft, it may be used as a conductor to shunt electrical power to and/or from the electronics, or combinations thereof. The enclosure may be constructed from materials (or combinations of materials) which are sufficiently strong to resist (or substantially resist) deformation due to loads applied from the half shafts. Additionally, in certain embodiments, it is desirable for the casing to sufficiently resist thermal fluctuations resulting in part from the electronics current draw. Example materials that match these properties include, but are not limited to: aluminium, polymers or other suitable materials.

In certain embodiments, the enclosure may or may not be electrically conductive. In certain embodiments, power and signal lines may route placements but the casing itself is not used as a conductor. In certain embodiments, the casing itself may be used as a conductor. In certain embodiments, portions of the enclosure may be electrically conductive, typically with conductive parts separated by insulating layers. Such configurations allow power to be supplied directly (or indirectly) to the electronics through the casing. In certain embodiments, conductive mount points may be attached directly (or indirectly) to the outside and/or inside of the casing. In certain embodiments, portions of the casing may be used as conductors, for example, signal transmission. Nonconductive sections may be used to isolate conductive sections to allow multiple signal 'lines' through the casing. In certain embodiments, power configuration and/or electronic communication and/or other signals may be multiplexed onto the power lines at a higher frequency by means of a suitable technology such as Direct Sequence Spread Spectrum (DSSS). The present disclosure also contemplated combinations the enclosure configurations discussed herein. In certain embodiments, one or more circuit boards may be replaced with conductive/tracks/pads routed and/or etched directly into the device casing. In certain embodiments, at least a substantial portion of the circuit boards may be replaced with conductive/tracks/pads routed and/or etched directly into the device casing.

In certain embodiments, one of the purposes of the casing may be to extract heat from the electronics (for example, the coils). It is useful if this heat is transferred to the environment surrounding the casing as efficiently as possible. In certain embodiments, methods of cooling that may be implemented include one or more of the following active cooling (forced air flow); active cooling (force liquid flow); active cooling (refrigeration); passive cooling (heat pipe/pump transfer); passive cooling (convective heat fins, ribs); passive cooling (convection holes); active or passive cooling (convection channels); chambered (sealed static fluid with high thermal conductivity to concentrate and/or direct heat flow); and entire enclosure sealed with non-electrically conductive fluid.

In certain embodiments, circuit boards (and their attached electronics) may be mounted such that they do not move when subject to external or internal forces (linear or angular accelerations of the motor) or vibrations. In certain embodiments, circuit boards (and their attached electronics) may be mounted such that they do not substantially move when subject to external and/or internal forces (linear or angular accelerations of the motor) or vibrations. In certain embodiments, circuit boards (and their attached electronics) may be mounted such that they are sufficiently stable when subject to external and/or internal forces (linear or angular accelerations of the motor) or vibrations. In certain embodiments, circuit boards (and their attached electronics) may be mounted using one or more of the following methods: specifically shaped cavities in the casing such that circuit boards can slot in with a transition or interference fit; modular inserts; circuit boards sandwiched between two casing components; mechanically fastened or clipped; glued, or otherwise permanently joined.

For applications that are not as mechanically constrained this represents a more flexible electrical and mechanical solution. In certain embodiments, electronic components (and/or circuit boards) may be attached to modular inserts that may be slot/snap/or be otherwise attached to the primary casing externally, without the need to disassemble other inserts and/or the primary casing. In certain embodiments, electronic components (and/or circuit boards) may be configured as a modular insert that may be attached to the primary casing externally, without the need to disassemble other inserts and/or the primary casing.

In certain embodiments, the electrical machine may include one or more of the following: at least one electrical bus, at least one optical bus, at least one radio frequency channel and a bus consisting of one or more digital and/or analogue communication channels. For example, when multiple microcontrollers are used, inter communication between microprocessors typically may occur over a bus. This bus may be mounted and constructed in one or more of the following ways: for electrical conductor (groove cut for circuit board, or other form of conductor to mount); for optical conductor (cut directly into casing, with reflective coatings applied to cut surfaces, and/or inserted into groove in casing); other suitable methods for mounting the conductor. In certain embodiments, when an optical bus is in use, optical transceivers on one or more microcontroller may be mounted to interface with the bus. Thus the microcontroller positions may be tangentially arrayed around the optical bus. In certain embodiments, where optical or radio frequency transceivers are used, the bus may be the voids within the enclosure.

In certain embodiments, another function of the casing may be to protect one or more internal components from external damage. It may be desirable that the seams of the casing be waterproof. It may also be desirable that the casing be covered in, and/or made partially of, vibration/impact absorbing coating (e.g. elastomer polymers). In certain applications, the casing may be an optional mounting point for master power cutoff switch.

In certain embodiments, one or more power and/or control signals may pass through the enclosure. In certain embodiments, at least a substantial portion of the power and/or control signals may pass through the enclosure. Mounts can be provided for these connections using one or more of the following: lugs/clips, bolts, rings/sockets/clamps, weld points, and other suitable ways for mounting. Also for external control and/or information mounts one or more of the following may be used: switch mounts, calibration mounts (variable, quasi fixed controls), and embedded displays (LCD, or other). For Microcontroller Bus Interfaces one or more of the following may be used: galvanically isolated connections (optical, radio, magnetic), USB, Serial, other digital and analogue connections, and other suitable ways or structures. In certain embodiments, for mechanical outputs when applicable, the differential carrier may pass through the casing via one or more of the following ways: optionally, a bearing seal, variable diameters, unsealed pass through hole (exposed inner assembly) and other ways of sealing shaft passthrough point. In certain embodiments, the enclosure may also have mounting points for magnetic coupling platters.

Switch Architecture

In certain embodiments, one or more electronically controlled switches may be used to control the size and direction of the current through the coils. These switches may be made up of discrete components (e.g., transistors and/or other silicon switch technology) including one or more of the following: IGBT's or other similar technology; FET's or other Channel/Field effect transistor based device (MOSFETS etc); BJT's or other hi-polar transistor based device; ECP or other emitter coupled transistor device; digital switches such as transistors; silicon carbide transistors; diamond switches; Triacs; Diodes; SCRs; other suitable electronically controlled switching technology; and electro-mechanical relays. In certain embodiments, the one or more switches may be used to drive the electromagnetic coils and may be implemented in different ways and may be comprised totally or partially from one or more of the following configurations/devices: single switch; an H-bridge (full bridge); a Half bridge; a Half bridge with a high and a low side switching; bilateral switch configurations, single phase voltage source inverter, half bridge voltage source inverter, AC chopper regulation and other various one, two, three phase and multiphase configurations.

Figure 19:
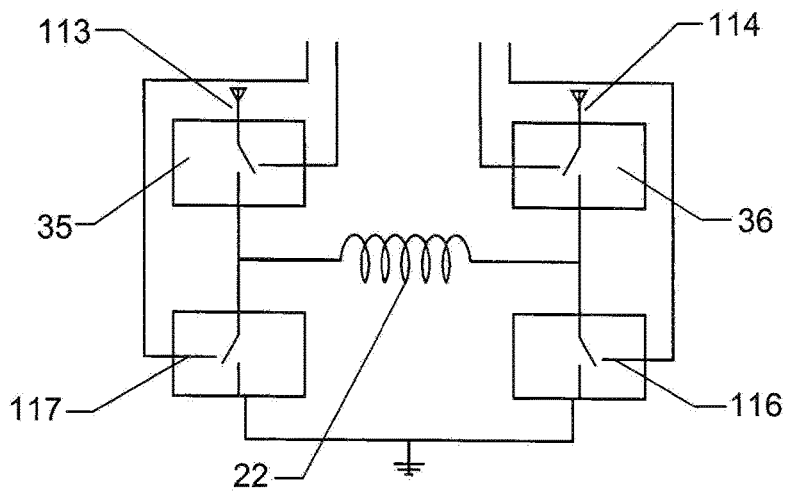
FIG. 19 shows an example of a H-bridge switch topology that may be used with certain embodiments.

The switches may be obtained without their plastic packaging and embedded directly into the one or more coils. Switches may be integrated into the body of the one or more coils, either after or during the construction process of the one or more coils. In certain embodiments referencing FIG. 19 where the high side switches 35 and 36, the transistors may be biased to the high side of the coils. When using Positive Field Effect Transistor (PFET) or Positive Negative Positive (PNP) Bi Junction Transistors (BJTs), a negative voltage is applied in reference to their positive input and the control pin may turn on the gates. PNP BJTs and PFETs are generally more expensive than Negative Positive Negative (NPN) BJTs, Negative FETs and IGBTs. These devices would turn on if the voltage at their controlling terminal is greater than the voltage at their negative terminal by a few volts. In certain embodiments, to achieve this one or more of the following may be used: a charge pump; an isolated DC-DC converter, a separate power supply; and other voltage boost methods may be used. It is possible to vary the current flowing through the coil by use of pulse width modulation. In certain embodiments, the switches may be turned on and off at a high frequency, and by controlling the duty cycle (the time the switch is on compared to the time the switch is off) the amount of current flowing through the coil is controlled by this duty cycle. If the switches are just on (100% duty cycle), then the maximum current flows through the coil. If the switches are off (0% duty cycle), then no current will flow through the coil. If the switches are on half the time and off half the time the current could be 50% of the full current but may depend if the inductance of the coil at the switching frequency is too high or too low. In certain embodiments, when the direction of current through the coil does not need to be reversed, a single switch can be used between the voltage source, the coil and the ground. This reduced the component count by three switches. In a single phase AC configuration the voltage can be half rectified to create a positive rail and a negative rail. The two rails can then be switched through the coil to ground effectively changing the direction of the current. This reduces the number of switches required by two. In certain three phase star configurations, the phase with the nearest ideal voltage may be switched so that power can flow from that phase to ground. In certain delta three phase configurations, two switches may be required on either end of the coil to each phase, in this configuration current can be selected to flow from one or more phases to one or more other phases.

Control

In certain embodiments, one or more control mechanics may be used with respect to the driving operation of one or more electronic components. The one or more control mechanics may be implemented either at a hardware or software level, or both. In certain embodiments, the number of coils activated at a particular instance may be varied from 0 to the total number of coils. The choice of this number may be based at least in part upon the currently active control scheme. This decision may be made at the Main Control Unit (MCU), Coil Control Unit (CCU) and/or an external level. In certain embodiments, motors may be configured to operate in the clockwise, counter clockwise, or both directions. In certain embodiments, in order to produce motion, coils may be switched on and off at specific instants. These instances may be determined by one or more of the following:

A. Stored sequences including: observed (obtained via sensor feedback); streamed (obtained via external devices); precomputed (stored within the motor electronics);

B. Computed sequences including: sequential based activation (coils are toggled sequentially in a rotary fashion with alternating polarity); Optimal force activation (coils are activated when their individual feedback data indicates an optimal force will be applied to the rotor); optimal efficiency activation (coils are activated in a manner to maintain target operating motor dynamics whilst minimizing power consumption); and random based activation (coils are activated randomly); pattern based sequence (coils are sequenced in a predetermined pattern); feedback frequency based (Coils are activated based on a driving analogue frequency signal); and C. Other suitable driving sequence which achieves desirable motor performance.

In certain embodiments, feedback may be used to generate and/or choose optimal driver routines/patterns to adapt the device to changing conditions such as but not limited to: changing temperature or other temporary forces/stress' that may alter motor operational performance; a depleted battery/ changing voltage supply; an increase in demand on a generator or for mechanical output in an application; change in parameters of the device caused by damage and/or general wear and tear; or combinations thereof.

In certain embodiments, certain electrical machine parameters may be calibrated using sensor feedback or other ways of tuning. For example, the use of machine learning techniques, and/or other automated tuning, operating internally, externally or combinations thereof may be used.

In certain embodiments, the active control scheme can utilize several techniques to reduce power consumption and/or better optimize power consumptions. For example, one or more of the following may be used: dynamic reduction of active coil count (lower power per torque); dynamic reduction of active coil power percentage (smoother torque); back EMF reproduction/elimination optimization; and pulse width modulation of the coil driving signal to allow precision control on power applied to coils.

In certain embodiments, feedback monitoring may be used to detect faults and automatically power off faulting devices. For example, one or more of the following coil current overflow protection/detection; over-voltage/Over power protection; overheating protection; and velocity overspin protection. In certain embodiments, arbitrated master mechanisms may be used such as master controllers may be nonsingular, with the resulting control signal arbitrated using a 3 way voting mechanism to ensure redundancy of the master controller. In certain embodiments, an external signal may be applied to bypass one or more single controllers with the purpose of shutting down, restarting, or reconfiguring the one or more controllers.

Feedback

In certain embodiments, feedback may be useful for optimal operation under one or more conditions, but may be only cost effective for incorporation into certain devices. When feedback is not required, a standard open loop control may be used. Feedback may be utilized by the controllers, either by CCUs or MCUs or both. In certain embodiments, feedback may be collected local to each device or remotely and used in either hardware and/or software as outlined in the control sections. In certain embodiments, feedback may be collected local to one or more devices or remotely and used in either hardware and/or software as discussed herein. In certain embodiments, feedback may be measured and/or obtained in one or more of the following ways: instantaneous voltage across a coil via an ADC, or otherwise, at any time or substantially any time; current through a coil or power supply, by either contactless (hall effect) or contact current measurement; back EMF measurement, may be done while coil is not in a powered state; angular position, obtained by a sensor as discussed herein; magnetic field strength or angle; temperature; and vibrations via accelerometers or otherwise. In certain embodiments, angular positions of the rotor may be obtained by measuring one or more of the following: absolute angle or position; relative angle or position; and velocity. In certain embodiments, readings may be achieved through the use of sensors such as one or more of the following: Hall effect and/or other magnetic sense technology, such as GMR, AMR; rotary and/or quadrature encoder, optical or otherwise; position/velocity detection sensors such as laser/optical trackers currently used in computer mice; and cameras in combination with software processing.

Controller Architecture

Figure 20:
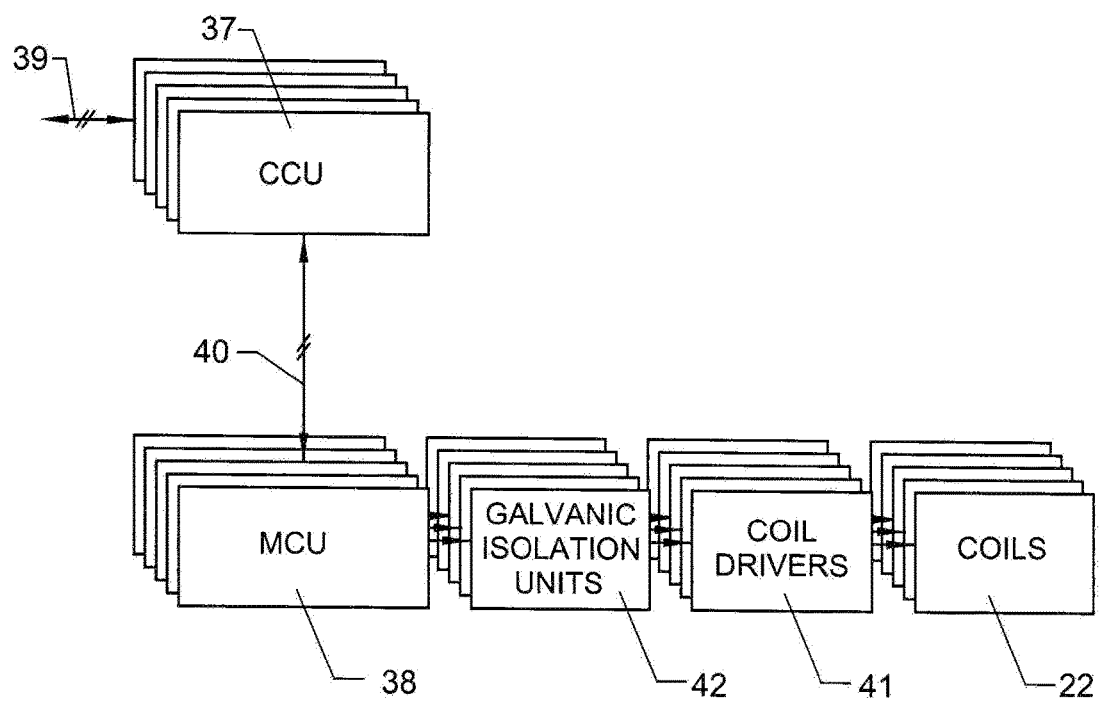
FIG. 20 illustrates an exemplary Motor Control Unit (MCU), Coil Control Unit (CCU), coil driver controller architecture, according to certain embodiments.
Figure 21:
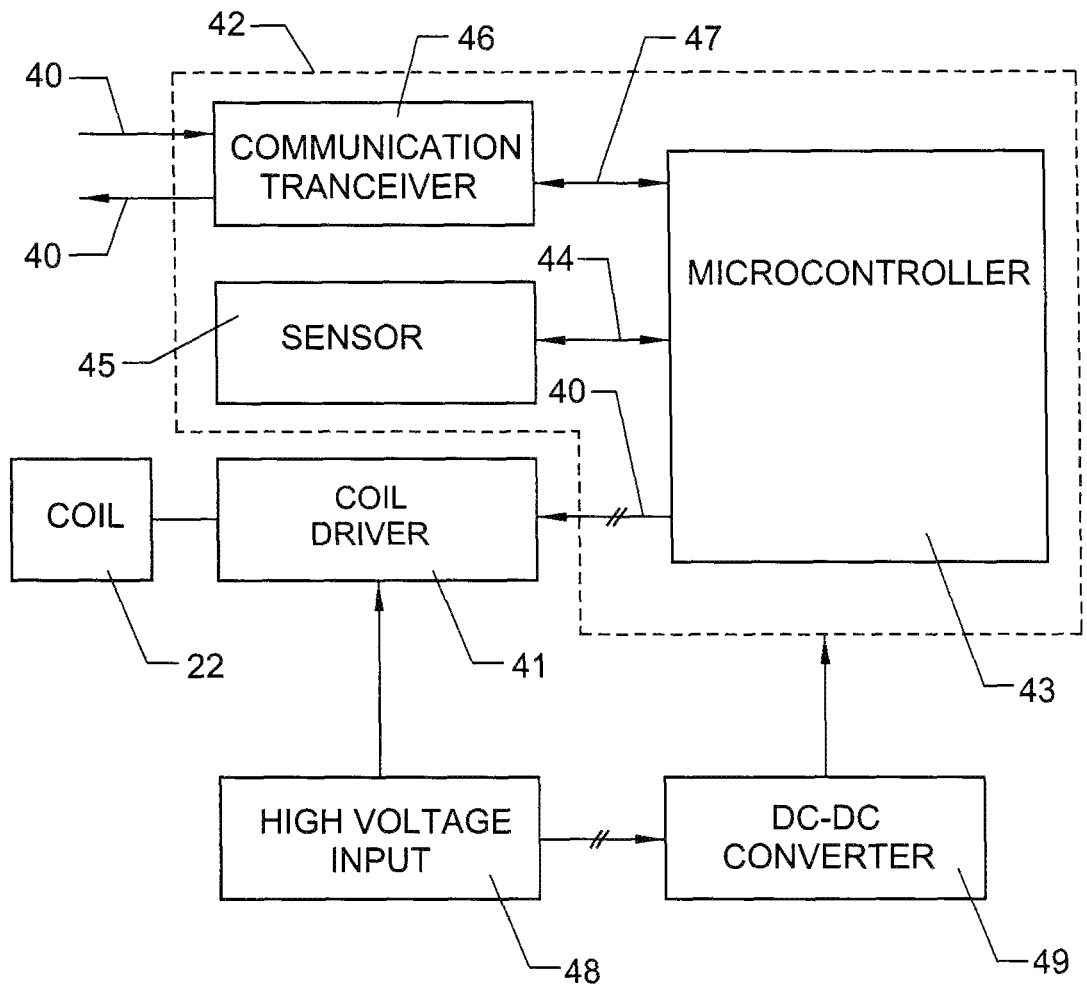
FIG. 21 illustrates a CCU's architecture, according to certain embodiments.

In certain embodiments, axial flux electrical machines may comprise: coil driving controllers, coil control units (CCU's) and/or motor control units (MCU's). In certain embodiments, the layout of the controllers may be varied, while maintaining control of each coil individually.). In certain embodiments, the layout of the controllers may be varied, while maintaining control of one or more coils individually. In certain embodiments, the layout of the controllers may be varied, while maintaining control of at least a substantial number of the coils individually. In certain embodiments, the layout of the controllers may be varied, while maintaining control of at least 50%, 60%, 70%, 800%, 900%, 95%, 98%, 99% or 100% individually. The controllers drive 'switches' as described in this disclosure, allowing control of the coils, as described in this disclosure. FIG. 20 illustrates one exemplary relationship between an exemplary Motor Control Unit (MCU) 37, Coil Control Unit (CCU) 38 the communications buses 39, 40 that are available to them. One or more MCU's may be communicating with one of more CCU's. Also illustrated is the coil driver architecture, according to certain embodiments, which includes a one or more coil drivers 41 for one or more coils 22. The signalling between CCU's, MCU's 47 and coil drivers 42 may be galvanically isolated. FIG. 21 illustrates a CCU architecture, according to certain embodiments.

Figure 22:
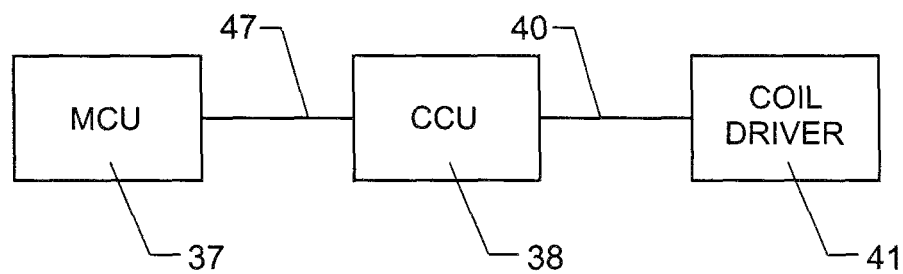
FIG. 22 shows one or more individual MCUs and CCUs in a 1:1:1 configuration, according to certain embodiments.
Figure 23:
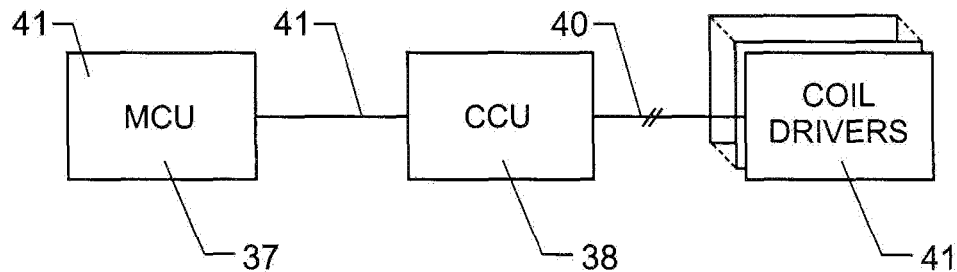
FIG. 23 shows switches controlled by one CCU, with the one CCU being controlled by one or more MCU in a 1:1:n configuration, according to certain embodiments.
Figure 24:
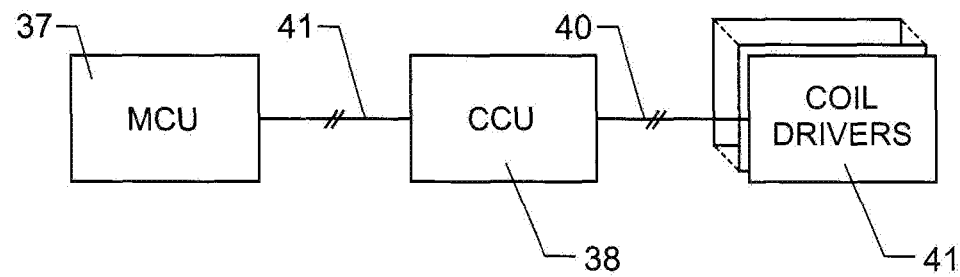
FIG. 24 shows switches controlled by CCUs, with the CCUs being controlled by one or more MCU in a 1:m:n configuration, according to certain embodiments.
Figure 25:
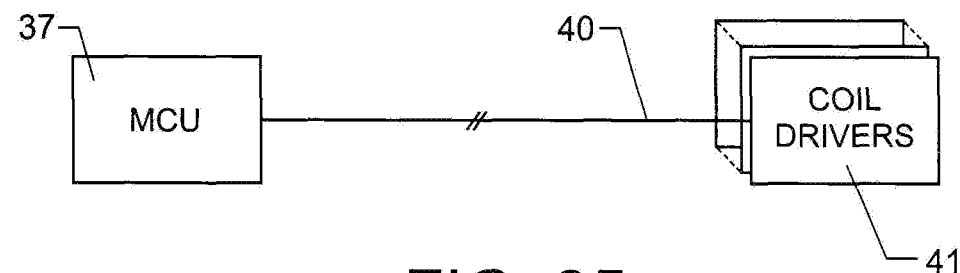
FIG. 25 shows an exemplary controller configurations, whereby switches are controlled directly by one or more MCUs in a 1:n configuration

A Microcontroller 43 may be used to control the device; it incorporates an Analogue to digital converter (ADC) with an external interface 44 for collecting data from sensors 45. A Communications transceiver 46 is connected to the microcontrollers serial bus 47 allowing it to receive commands and exchange data with a MCU. The microcontroller controls a coil driver 41 by use of a digital bus and/or PWM signals. The coil driver takes a high voltage input 48 and controls the supply of that to the coil 22. The microcontroller and other peripheral low power devices may be supplied by a high efficiency DC to DC converter 49. Galvanic isolation is optional at several points 42. In certain embodiments, the number of controllers used may be varied depending on specific needs of the application. FIG. 22 shows a 1:1:1 configuration such that one individual Motor Control Unit (MCU) 37 communicates with one Coil Control Units (CCU) 38, which in turn controls for each switch and or switch driver 41 in a 1:1:1 configuration. (for example as shown in FIG. 22); many switches controlled by one or more CCU's, in a 1:n (for example as shown in FIG. 23) or m:n configuration (for example as shown in FIGS. 24 and 25); motor Control Unit (MCU) may control CCU's, giving velocity and/or other commands; and MCU's may directly control one or more coils, bypassing the need for CCU's.

In certain embodiments, the controllers may be implemented through multiple ways, examples include one or more of the following: utilization of software and/or hardware features in an embedded system such as a microcontroller or microprocessor, the use of an FPGA, CPLD, ASIC or other VLSI or programmable logic device; an analog system, such as the use of classical electrical feedback topologies to create basic control loops; and combinations thereof.

Figure 26:
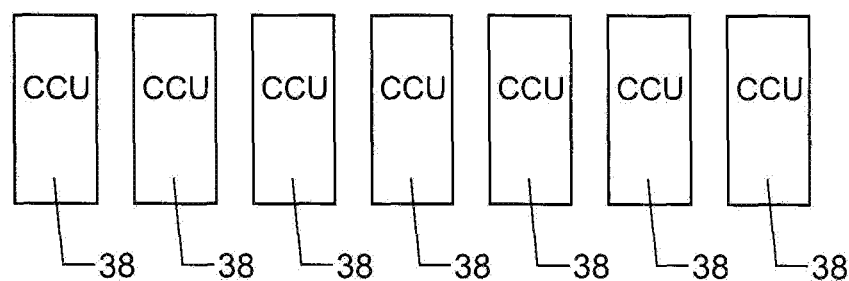
FIG. 26 illustrates a CCU without the need for a master controller, according to certain embodiments.

FIG. 26 illustrates a certain embodiment, in which there is multiple microprocessor configurations, the master controlling processor may be, for example, a CCU 38. In certain embodiments, CCU's may act independently, without the need for a master controller. In certain embodiments, CCU's may act independently, without the need for a master controller wherein synchronous behavior may be achieved through the use of common sensors, or sensors with predictable and consistent readings related to the electrical machines behavior. In certain embodiments, where the motors speed and/or power is uniform (or substantially uniform), and the only input to the system is that the power is on or off, a common communication bus may not be required.

Figure 27:
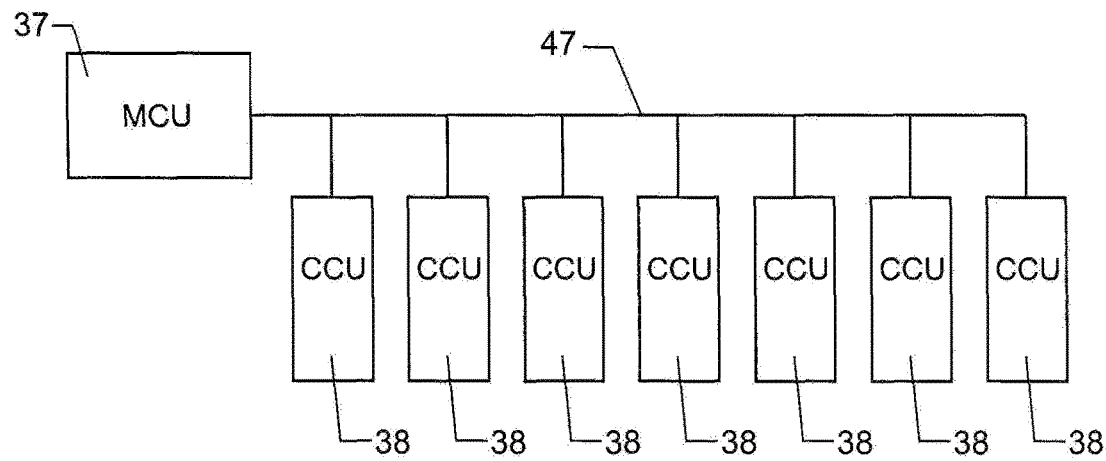
FIG. 27 shows a configuration where a single motor control unit is connected to a common communication bus, which is connected to one or more of the coil control units, according to certain embodiments.
Figure 28:
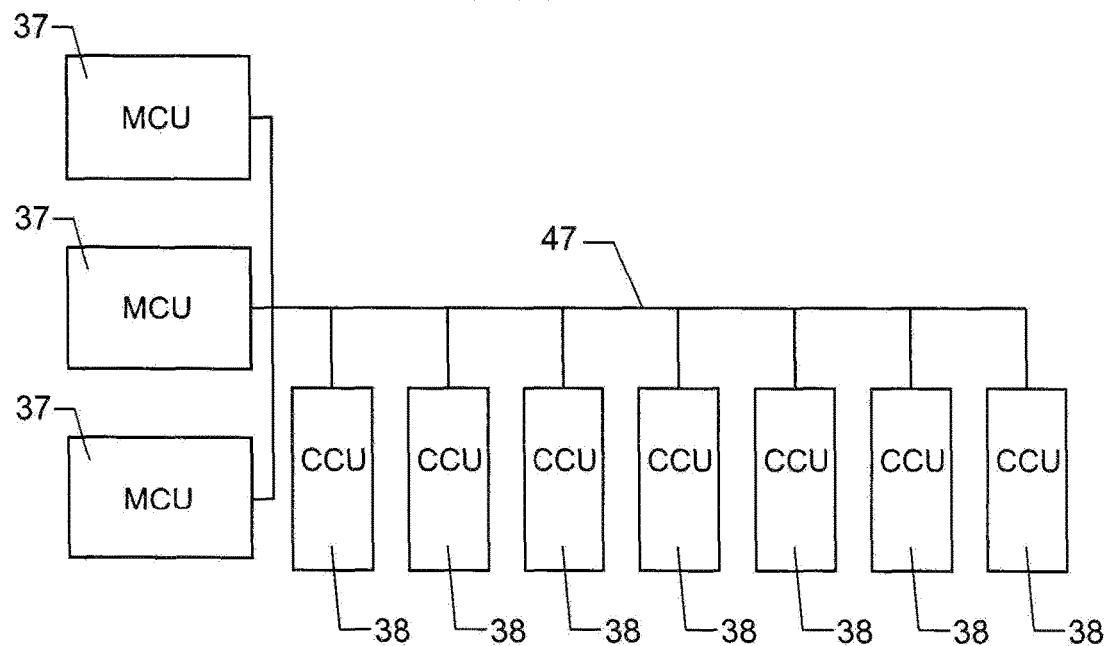
FIG. 28 shows a configuration where multiple motor control units are connected to a common communication bus, which is connected to one more of the coil control units, according to certain embodiments.
Figure 29:
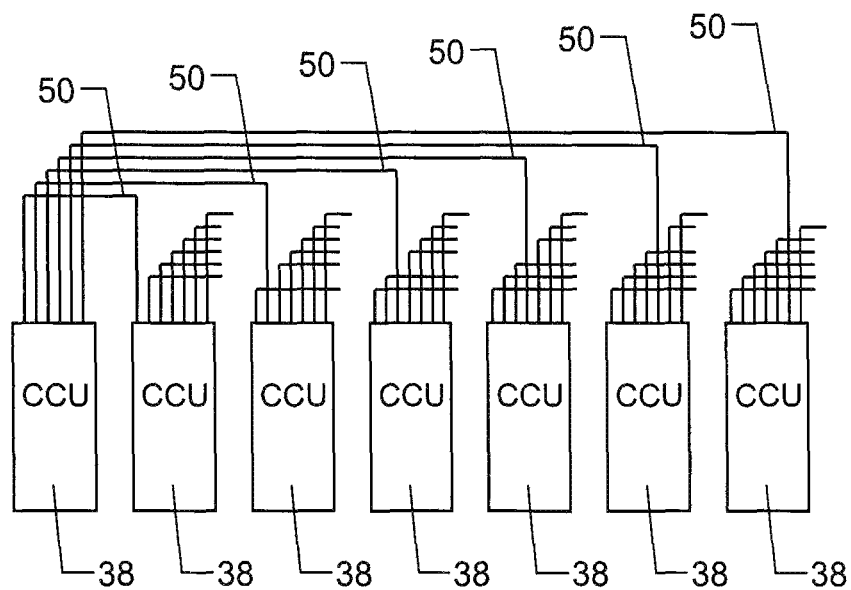
FIG. 29 illustrates a configuration wherein each coil control unit is connected directly to some or all other coil control units, according to certain embodiments.
Figure 30:
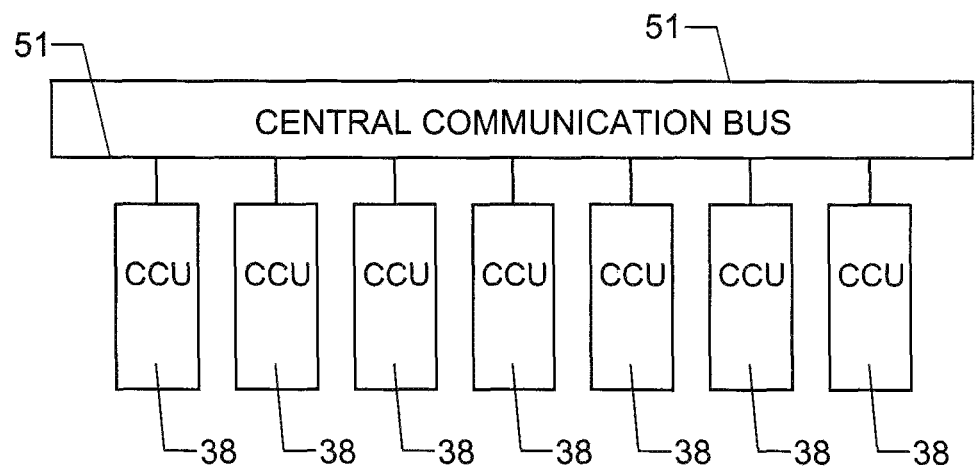
FIG. 30 illustrates a configuration wherein a central communication bus (token ring) is used, according to certain embodiments.

Certain embodiments are directed to an MCU's (Motor control unit) in a standard master slave configuration where a single motor control unit is connected to a common communication bus, which is connected to one or more coil control units. Certain embodiments are directed to an MCU's (Motor control unit) in a standard master slave configuration where a single motor control unit is connected to a common communication bus, which is connected to at least 70%, 80%, 90%, 95%, 98%, 99% or 100% of the coil control units. FIG. 27 shows a configuration where a single motor control unit (MCU) 37 is connected to a common communication bus 47, which is connected to each of the coil control units (CCU) 38. Certain embodiments are directed to redundant master slave configuration where multiple masters arbitrate to come to an accepted value. For example 2, 3, 4, 5, 6, 7, 8, 9, or 10 MCU's may calculate commands to the CCU's, but only one MCU's commands are used by means of an arbitration method. In this way in the event of failure the failed MCU will be 'outvoted' and their commands discarded, possibly even being powered off by the other MCU's. Other embodiments may include redundant MCU's in case of failure, which only actively send commands when another MCU has failed FIG. 28 shows a configuration where 3 motor control units (MCU) 37 are connected to a common communication bus 47, which is connected to each of the coil control units (CCU) 38. In certain embodiments, it is possible to have configurations wherein one or more of the coil control units are not in communication with the plurality of motor control units. In certain embodiment, one or more of the CCU's may act together as a group, sharing sensor data and/or providing common output. In such embodiments, communication may occur via a common bus or direct peer to peer. In such embodiments, a motor control unit may not be required. FIG. 29 illustrates a configuration wherein no central communication bus is present and communication from each CCU 38 is point to point 50. FIG. 30 illustrates a configuration wherein a central communication bus (token ring) 51 is used for communication between CCUs 38. In both FIGS. 29 and 30 a MCU is not required.

In certain embodiments, power systems for supplying the digital logic and/or other devices in the CCU's and/or the MCU's may need to convert a higher or lower voltage to the operating voltage of the devices used, and can take one or more of the following the topologies: DC-DC converters, switching such as buck or boost; linear regulation or otherwise; transformers; resistive supply (by division); and optical power transfer. In certain embodiments, power may be supplied to the control units, CCU's, MCU's, an overall motor and/or another device. Such implementations may include one or more of the following: using the same (or substantially the same) supply the switches use, such as when switches are mounted to a motor casing; from RF/EM 'waste' or 'background' energy harvesting; via BM induction/generation, such as in the application of a generator, batteries, either per CCU/MCU device and/or otherwise, rechargeable or non-rechargeable; solar, wind, hydro, fuel cell and/or other forms of renewable energy sources; and mains supply, single phase, three phase at a variety of different voltages.

In certain embodiments, power supplies for switches and/or CCU's/MMU's may also have power control overrides, as a safety feature, allowing power to be turned off to one or more CCUs or coils. This can be implemented via suitable switching topology, for example, as discussed herein.

In certain embodiments, communications between a MMU and an external controller, MMU and internal CCU and/or other devices may be galvanically isolated by using one or more of the following methods: optical (IR or other spectrums) over a physical medium as a light guide like fiber or shaped plastic, through space/air or otherwise; radio Frequency of suitable spectrums, physical layer technology, and/or encoding method, such as Direct Sequence Spread Spectrum (DSSS), O-QPSK or otherwise; conductive, via wires and/or other electrically conductive material, and isolated via the use of a galvanically isolating technology such as: RF isolation IC's, transformers, capacitive, optical isolation IC's, or combinations thereof.

Figure 31:
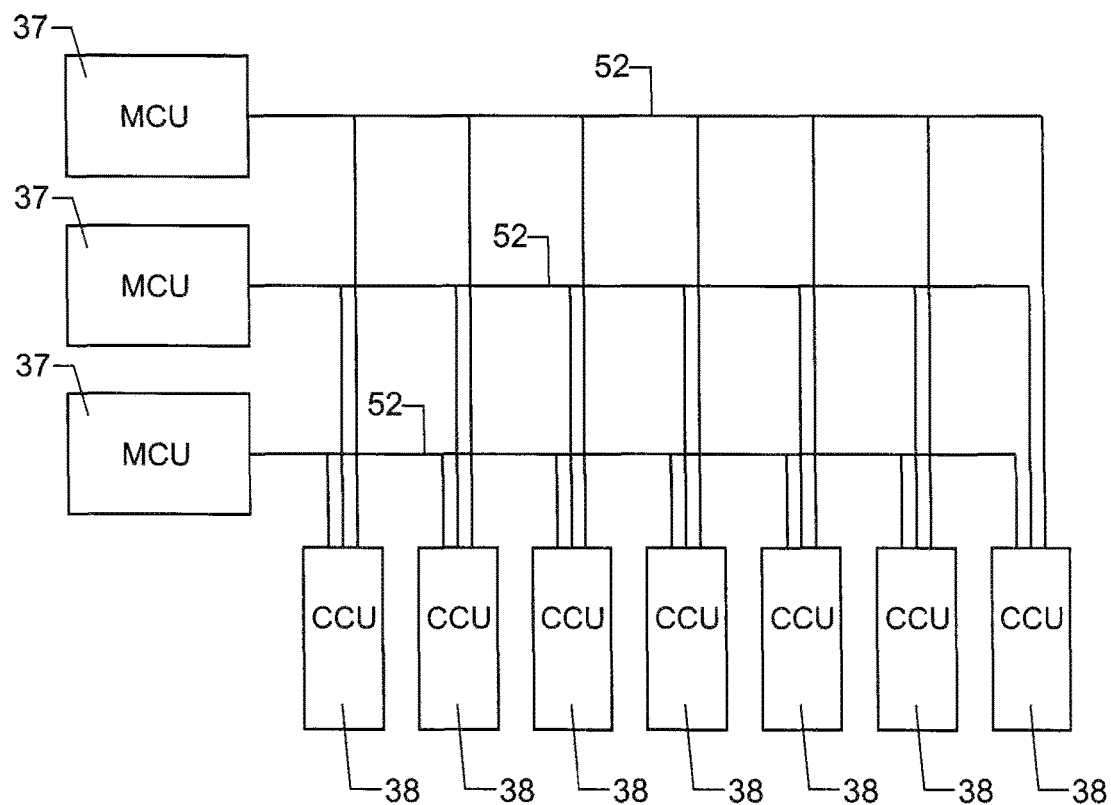
FIG. 31 illustrates a configuration with three redundant communication buses, according to certain embodiments.

FIG. 31 illustrates a configuration with three redundant communication buses 52. In certain embodiments, the communication layers may have 2, 3, 4, 5, 6, 7, 8, 9, 10 or more redundant layers.

In certain embodiments, communications inside the devices between controllers/drivers/MCU's 37 and/or CCU's 38 and/or to external devices, (e.g. vehicle control unit to MCU) may involve one or more of the following technologies and/or communications protocols in combination with one or more of the physical layer implementations disclosed herein: single ended, serial and/or parallel (for example UART, SPI, or I2C), differential signalling. (for example CAN bus or RS485 protocols), optical point to point and/or optical bus and RF communications.

Figure 32:
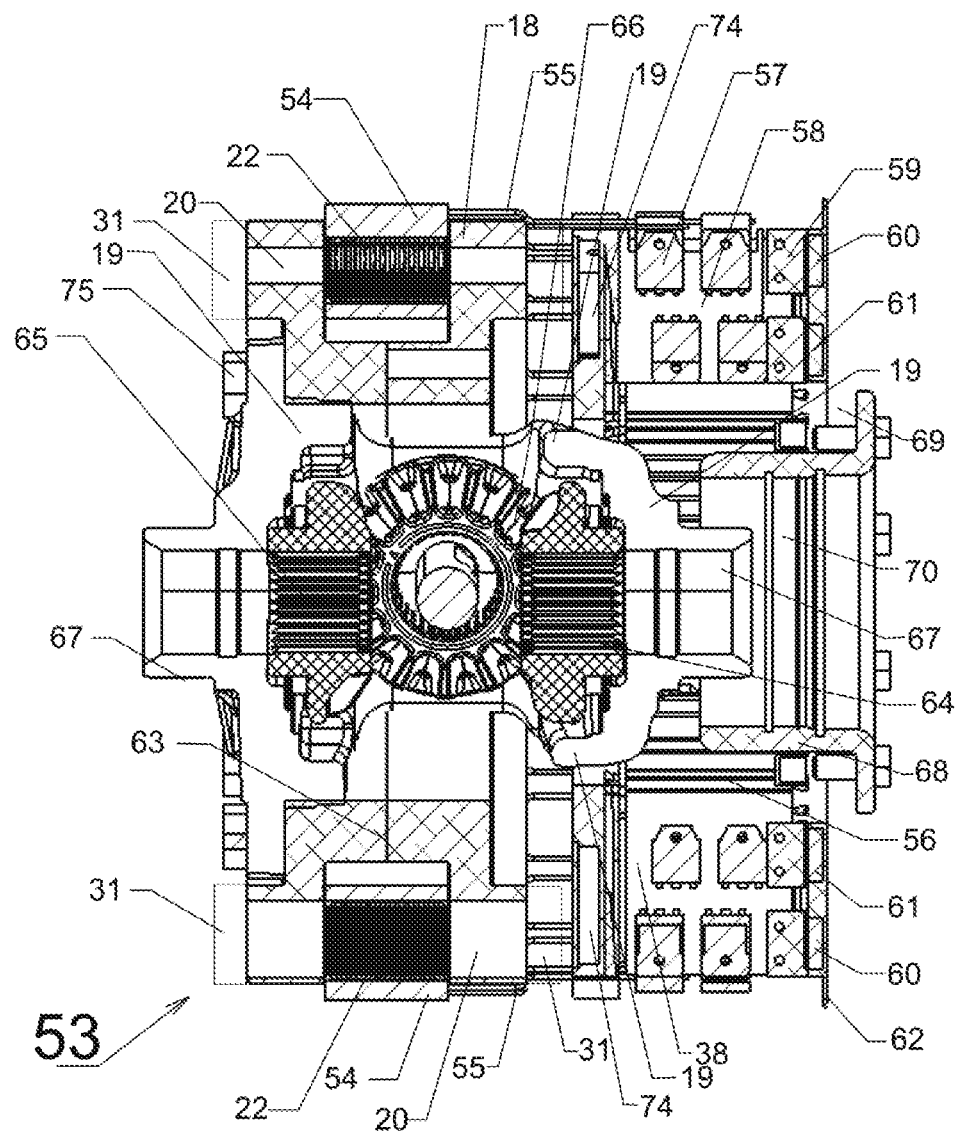
FIG. 32 is a longitudinal cross-sectional view through an electric motor made in accordance with certain embodiments.
Figure 33:
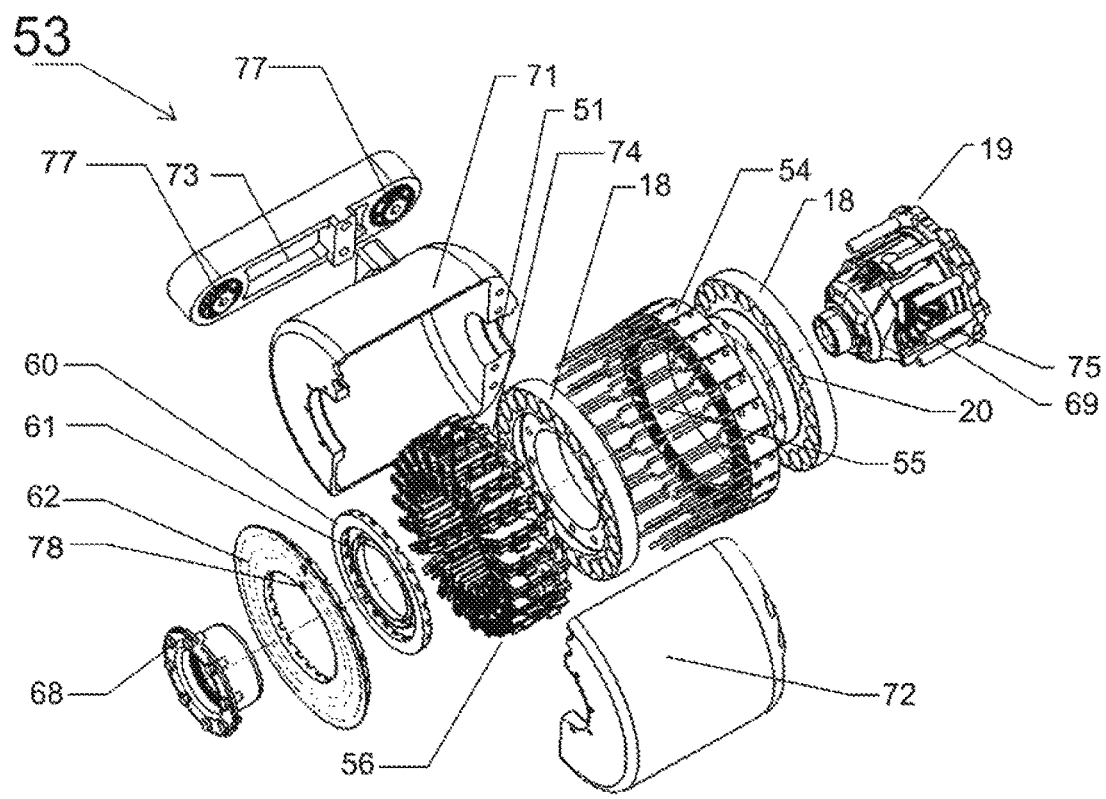
FIG. 33 is an exploded view of the electric motor in FIG. 32.
Figure 42:
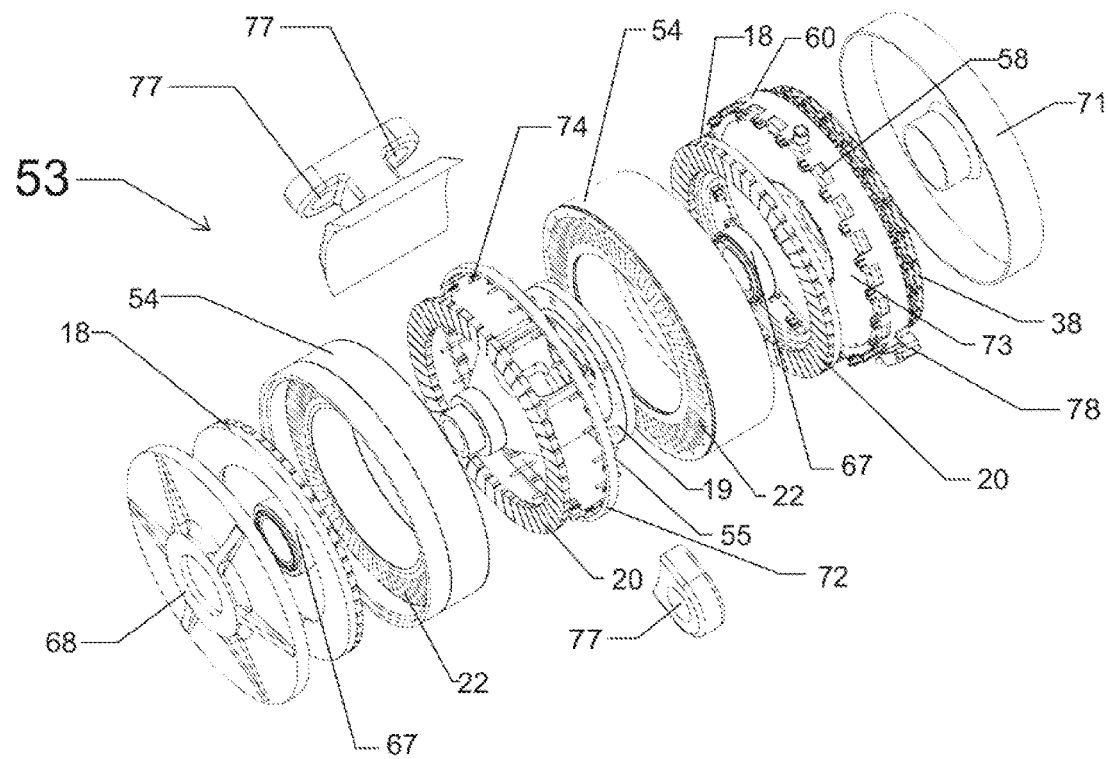
FIG. 42 is an exploded view of an electric machine, according to certain embodiments.

With reference to FIG. 32, FIG. 33 and FIG. 42, two embodiments are illustrated of a brushless, axial flux, direct-current electric motor with integrated differential 53 comprises one or more disc-shaped stators 54. The stator may be constructed out of a non conductive material, for example, nylon 12, fibreglass composite, Kevlar composite, other suitable materials, or combinations thereof may also be used to prevent (substantially prevent, sufficiently prevent or reduce) the generation of an electrical eddy current around one or more of the electromagnetic coils. An alternative embodiment is (illustrated in FIG. 8) may be constructed from a conductive material such as aluminium with slots 14 extending more or less radially inwards from each aperture accommodating a the electromagnetic coil. In certain embodiments, the elements may be made from a light material of suitable mechanical strength and/or conductivity, such as an aluminium or magnesium alloy, and the external surfaces may be finned or ribbed to provide greater heat dissipation surface area. Alternatively in certain embodiments the ring may have a cavity or other suitable passage for coolant in or around the stator and/or in close proximity to the stator. In certain embodiments, the ring may accommodate the distribution of coolant directly onto the coils and/or cores Other suitable heat dissipation mechanisms or methods may be used.

Around the periphery of the stators is embedded a circular array of equally-spaced, or substantially equally-spaced, electromagnetic coils 22, heat from the coils may be conducted out to the exterior surface of the annular conductive elements by means of a channel inside the coil. Conductive elements 55 connect to Coil Control Units 38. The Coil Control Units consist of one or more stacked circuit boards 56. These stacked circuit boards may be parallel, substantially parallel and/or other suitable configurations. In certain embodiments, (not shown), the circuit boards may be partially, or wholly, replaced by a system of internal conductors. In certain embodiments, the circuit boards may be supported by the solder tags of solid-state switches 57 being soldered to them, the switches, in turn, being fixed (as described elsewhere herein) to a heat sink elements 58. In certain embodiments, (not shown) the circuit boards are supported from the stators by a suitable structure, including conductive brackets, insulating brackets, pillars, struts or combinations thereof. On the PCB there can be four solid state switches such as IGBTs in a H-Bridge configuration. The IGBTs, in certain embodiments, may be connected to a heat sink with an electrically insulating, thermally conductive layer such as Mica, aluminium oxide, aluminium nitride or other suitable insulation to isolate the various voltages (not shown) which then slides into a cooling ring. The heat sink 58 can be retained in the cooling ring by screws or a springs or cam locks (not shown.) The cooling ring contains one or more cooling channels 74; the coolant enters the cooling ring through an inlet and exists through an outlet. A set of connectors made out of a conductive material such as copper that permits the connector 59 to connect to the power rails. The power rails comprising of a first annular conductive element 60 and second annular conductive element 61, the conductive elements may be separated by an electrically insulating layer 62. In certain embodiments, the insulating layer may be made from a mechanically tough material having a high dielectric value, such as Acetal. Other suitable materials may also be used. In certain embodiments, (not shown) the stators may be electrically separated by hard anodising of their surfaces with care taken to ensure that the anodising extends substantially, or sufficiently, to their edges, the anodising being employed alternatively and/or in addition to the insulating layer.

Figure 34:
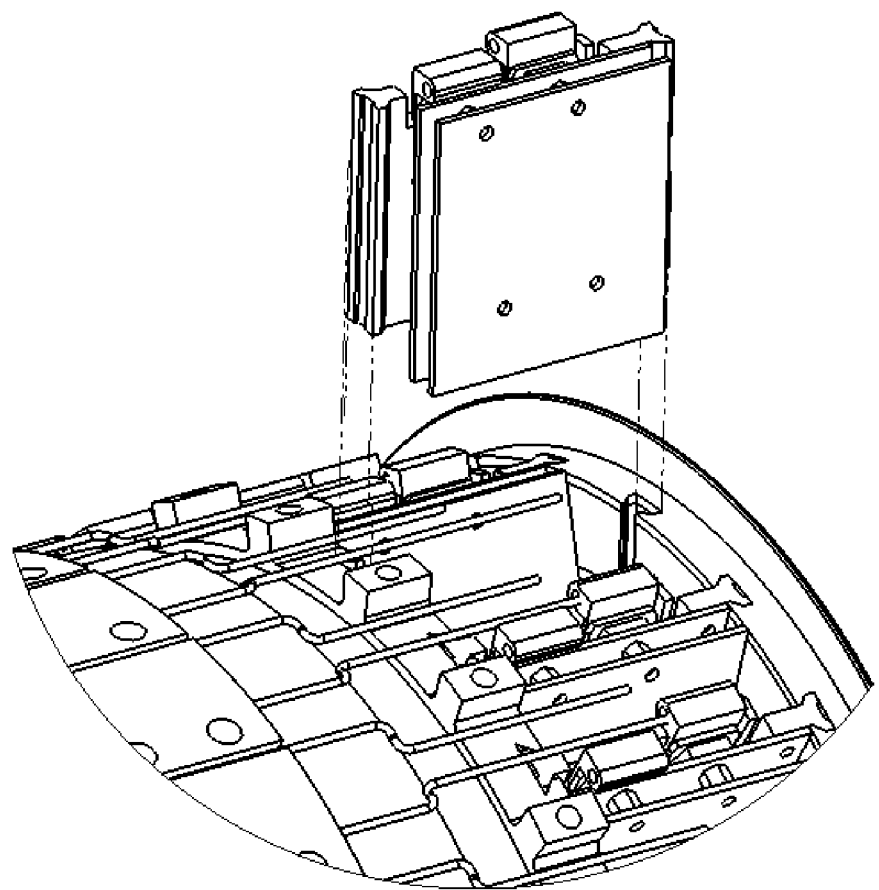
FIG. 34 illustrates an isometric view of the circuit boards illustrated in FIG. 32 mounted in an electrical machine, according to certain embodiments.
Figure 43:
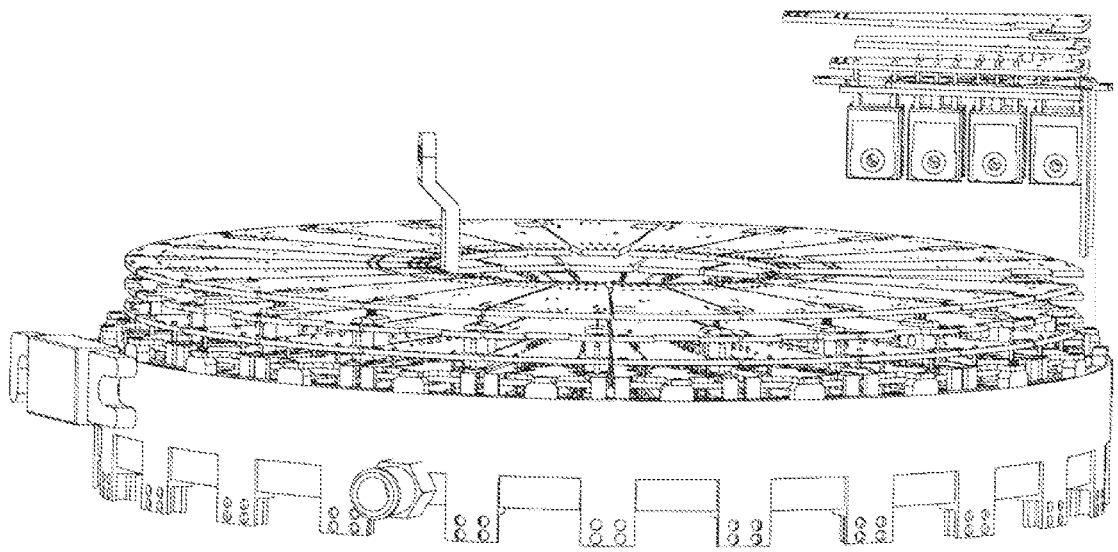
FIG. 43 illustrates an isometric view of the circuit boards illustrated in FIG. 42.

During assembly and/or maintenance a single Coil Control Unit can be removed by detaching the conductors from the coils, disengaging the retaining mechanisms and sliding the Coil Control Unit in or out thereby removing or installing the CCU from the device, two examples are depicted in FIGS. 34 and 43.

With reference to FIG. 32, FIG. 33 and FIG. 42 again, the electric motor may further comprise one or more disc-shaped rotors 18 around the periphery of which may be embedded in a circular array of equally-spaced (or substantially equally-spaced), powerful permanent magnets 20, the array may have the same, or substantially the same, centre diameter as that of the electromagnetic coils and the magnets may have alternating pole orientation. In certain embodiments, (not shown), the centre diameters of the arrays of permanent magnets and electromagnetic coils may be made unequal but such that the magnetic fields of the magnets and coils intersect. In certain embodiments (not shown), the poles of the permanent magnets in the array may have like orientation. In certain embodiments, (not shown), the permanent magnets in the array may be made in groups, the polar orientation of the magnets being common in each group while the polar orientation of adjacent groups may be opposed. In certain embodiments, (not shown), the permanent magnets in the array may be made in groups, the polar orientation of the magnets being common in one or more of the groups while the polar orientation of adjacent groups may be opposed. In certain embodiments, (not shown), the permanent magnets may be arranged in groups of unequal numbers, the polar orientation of the magnets in a group being common. In certain embodiments, (not shown), the permanent magnets pass through the whole of the axial depth of the rotors and may be orientated parallel, or substantially parallel, to the rotational axis, but with their centre distances randomly displaced (displaced inwardly or outwardly in a radial sense) up to half their radial depth. In certain embodiments, the displaced (displaced inwardly or outwardly in a radial sense) may be up to 0.1, 0.2, 0.3, 0.4, 0.5, 0.6, 0.7, 0.8 or 0.9 of their radial depth. In certain embodiments, (not shown), the permanent magnets in an array pass through the whole of the axial depth of the rotor and may be displaced in common from being parallel (or substantially parallel) with the rotational axis by a deflection in various senses of between zero and 30 degrees. In certain embodiments, the deflection in various senses of may be between zero and 30 degrees, zero to 20 degrees, zero to 40 degrees, 5 to 40 degrees, 5 to 30 degrees, 5 to 10 degrees, 10 to 30 degrees, 20 to 35 degrees or other suitable ranges. In certain embodiments, (not shown), the permanent magnets in an array pass only partly through the axial depth of a rotor, their inner ends optionally abutting a back iron of suitable magnetically permeable material embedded in the rotor. In certain embodiments, (not shown), the permanent magnets and the electromagnetic coils may be arranged in possible combination of the embodiments disclosed herein.

The rotors are bolted 75, splined or otherwise fixed to a differential carrier 19 parallel (or substantially parallel) to the stators with an air gap between the electromagnetic coils and the permanent magnets, suitable spacers 63 being positioned on the differential carrier to maintain (or partially maintain) the rotors in correct (or suitable) axial separation. In certain embodiments, the differential carrier is coupled to three or more bevelled gears. Two of the bevelled gears 64, 65, that are axially aligned with the rotor are splined to accommodate complementary splining of two half shafts. The remaining bevelled gears 66 are mounted perpendicular, or near perpendicular, to the axially aligned gears transfer the rotational energy to or from the rotors to two or more shafts, while permitting the two shafts to rotate at different angular velocities. The outer ends of the differential carrier is rotationally supported in suitable bearing 67 carried in the bearing support 68 or the casing 69 of the electric motor. The position of the bearing can be adjusted through the use of a screw collar 70 or by the use of spacers to ensure correct alignment. The casing may comprise of a clamshell or a radial enclosure 71, 72. The enclosure is sealingly closed by a bearing housing 68 which accommodates suitable thrust or deep groove bearing 67 and a suitable sealant (or sealing means) (not shown) which rotationally support the differential carrier, substantially prevent or sufficiently prevent the egress of lubricant or the ingress of contaminants. To provide a flux return path, annular back irons 31 of a suitable magnetically permeable material may be provided on one or more faces (or each face) of a the rotor not facing a the stator, the back irons covering the annular zone occupied by the magnets. In alternative embodiments (not shown) in the rotors having a face not immediately adjacent the stator, the back irons may be deleted and the magnets take the form of suitable Halbach arrays. Electronics housing 73 is formed on or fixed to a suitably located part of the housing and contains control circuit board 37. The solid-state switches are activated by command signals from a control system (not shown) to power the electromagnetic coils and thereby cause the rotors to rotate. Suitable sensors (not shown) are provided to generate signals that are transmitted to the control system to provide data as to the absolute and instantaneous positions of the rotors. In certain embodiments, one or more suitable sensors (not shown) may be provided to generate signals that may be transmitted to the control system to provide data as to the absolute, substantially absolute, or sufficiently absolute and/or instantaneous, substantially instantaneous, suitably instantaneous, relative, or substantially relative positions of one or more of the rotors, or any combination thereof. In certain embodiments, the sensors take the form of one or more optical sensors and/or one or more Hall-effect sensors. In certain embodiments, (not shown), rotor position may be determined by reference to the back EMF generated in undriven coils. In certain embodiments, the permanent magnets may take the form of powerful, or sufficiently powerful, rare earth-type magnets and may be secure in position within the axial depth of the rotors by, for example, bonding, by suitable mechanical fastenings or, as depicted in the Figure in the central the rotor, by imprisonment between two parts clamped together. In certain embodiments, (not shown) which may be employed in lower cost applications and/or those required to meet different operational parameters, the magnets take a conventional form. The body parts of the rotors are made sufficiently strong and/or rigid to suitably resist magnetic forces generated during operation and/or when the rotors are at rest. The rotor body parts are optionally made solid and/or partially hollow with radial ribbing 76 to reduce rotating mass and/or confer stiffness.

In certain embodiments, the electromagnetic coils can be made in the form described in relation to FIG. 9 and generate suitably higher magnetic flux levels while having suitably lower magnetic reluctance permitting rapid switching and/or reversal of magnetic polarity. In certain embodiments, (not shown), coils of conventional, wire-wound or ribbon-wound, bobbin construction may be employed, with an air core and/or core made from a suitable magnetically permeable material. In certain aspects, the coil configuration may necessarily be a compromise between maximisation of current flow and minimisation of inductance effects and/or losses due to at least in part hysteresis. Electrical current may be supplied to the solid-state switches via the annular conductive elements 60 and 61, thereby permitting a heavy current flow to the solid-state switches. A plurality of suitable lugs (depicted as 78 in FIGS. 33 and 42) may be provided around the peripheries of the annular conductive elements for the attachment of electrical conductors. A high power fuse may be attached at this point to protect the machine from short circuits. The electromagnetic coils may be embedded within the axial depth of the stators and may be bonded into place and/or potted with, for example, a high-strength, high-temperature epoxy resin, the arrangement permitting efficient (or suitably efficient) conductive cooling. The stators may be made sufficiently strong and/or rigid to resist magnetic forces generated during operation and/or when the rotors are at rest. In certain applications, where the electric motor may be employed as a direct-drive automotive wheel motor, it may be mounted to the existing mounting points of a differential of a vehicle by suitable fastenings engaging attachment bolt apertures 77.

In certain applications, where the electric motor may be employed as a direct-drive automotive wheel motor, the centre diameters of the arrays of permanent magnets and arrays of electromagnetic coils fall in the range 15 to 60 centimeters, the number of the coils being odd and the number of the magnets being one more than the number of coils. Other suitable ranges may also be used. In certain embodiments, 24 magnets may be employed. In certain embodiments, 48 magnets may be employed. In certain other embodiments employing similar operating principles, the numbers of the permanent magnets and the electromagnetic coils may optionally be doubled, tripled or quadrupled and the coils powered as required to generate a desired torque and RPM. In certain applications, the number of the permanent magnets and the number of electromagnetic coils may 1, 2, 3, 4, 5, 6, 8, 10, 12, 14, 20 or more and the coils powered as required to generate a desired torque and RPM. Similarly, in other alternative embodiments, the permanent magnets and the electromagnetic coils may optionally be made in equal numbers. Similarly, in other alternative embodiments, the permanent magnets and the electromagnetic coils may optionally be made in equal numbers, but with locational asymmetry to prevent magnetic stasis at start-up. In certain applications, the greater centre diameter of the arrays of permanent magnets and electromagnetic coils, the greater the torque able to be generated. The arrangement of the electric motor permits many combinations to be created from specially designed components, standard components, or combinations thereof—from a single rotor and stator combination to combinations employing at least 10 rotors. In certain applications the number of rotors may be at least 5, 10, 15, 20 or 25. The combinations employing larger numbers of rotors and stators may be used in large devices or machines, such as heavy trucks and earthmoving equipment.

In certain embodiments, the solid state switches employed to provide electronic commutation may be insulated-gate bipolar transistors (IGBT) which may be capable of handling the supply voltages required by the electric motor. Although both p-type (P-FET) and n-type (N-FET) field-effect transistors may be suitable for the application, in the certain embodiments, IGBTs may be employed in an H-bridge arrangement with powering of the high side of each (or one or more) of the IGBT by an integrated circuit incorporating a charge pump. In the certain embodiments, IGBTs may be employed in an H-bridge arrangement with powering of the high side of one or more of the IGBT by, for example, an integrated circuit incorporating a charge pump. The positioning of the IGBTs within close proximity to the electromagnetic coils may provide short, efficient conduction paths of low resistance. Other positioning may also be used such as substantially adjacent, suitably adjacent or in communication with. The type of the IGBTs employed may provide large tabs intended as heat sinks, but which may be also electrically conductive. The tabs may be therefore fixed directly, or indirectly, to the fingers of annular conductive elements 4, thereby providing the IGBTs with an efficient electrical current supply path with low resistance, making efficient use of space and/or providing an efficient thermal conduction path out to the finned or ribbed exterior surfaces of the annular conductive elements.

DC to DC isolated converters and high voltage step-down regulator circuit boards may be mounted to the circuit boards. Independent power supplies may be employed to prevent, or substantially prevent, the existence of a closed conductive loop, thereby preventing (substantially preventing or sufficiently preventing) induced current from adversely affecting electronic functions. Similarly, to prevent, substantially prevent, or sufficiently prevent induced current from interfering with command and feedback signals, inner and/or outer circuits may be galvanically isolated. In some embodiments, the galvanic isolation is achieved through the use of infra-red transmitting circuit and receiving circuit, with one such pair provided for each Coil Control Unit. In the certain embodiments, control signals from microcontrollers on the Coil Control Unit on the insides of the stators may be galvanically isolated using electromagnetic (RF) isolation structures or techniques. In alternative embodiments (not shown), the galvanic isolation may be achieved through the use of optical, capacitance, induction, electromagnetic, acoustic, mechanical structures or techniques or combinations thereof adapted for the purpose.

With additional reference to FIG. 9, in the certain embodiments, a current of 40 Amperes at between 300 and 450 Volts may be required to be supplied to the electromagnetic coils to achieve maximum power output from the electric motor. In the certain embodiments, electromagnetic coils 22 may be wound up from two separate strips of copper foil 79-82, etc and 83-86, etc around a suitable magnetically permeable core of square cross-sectional shape. The turn of the copper foil windings may be interleaved with rectangles of grain-oriented silicon steel 87-90, etc specially cut to shape. The steel is often supplied coated with an insulating compound but, when cut, uninsulated edges are exposed to the copper foil windings. In practice, in certain applications, this has only a minimal effect upon coil function as, because of the lower resistance of the copper foil, the proportion of total current passing through the steel plates is also minimal. The inner ends of the copper foil windings are connected to insulated conductors 91 which are led out via the gap between the two the copper foil windings and via suitably located apertures in the appropriate the steel plates and, together with the outer ends 92 of the copper foil windings, are extended as required to make the necessary connections between the coils and the IGBTs. The electromagnetic coils may be bonded into place in the stators with, and potted with, for example, a high strength, and high temperature epoxy resin adhesive. The electromagnetic coils may be wound with copper foil to reduce inductance effects and, thereby, to increase the maximum rate of polarity switching. In certain embodiments, a maximum switching rate of 400 Hz being achieved. In certain embodiments, a maximum switching rate of 100 Hz, 200 Hz, 400 H, 500 HZ, 600 Hz or 800 Hz may be achieved. In certain embodiments (not shown) to meet different operational parameters, higher or lower switching rates may be achieved. By also reducing back EMF, the voltage required to operate the electric motor at a given speed may be reduced. In certain embodiments (not shown), the electromagnetic coils may be made by computer-controlled deposition of copper and a suitable ferromagnetic material to create a facsimile of these embodiments of the coils, the built-up assembly then being given permanent form by sintering. In certain embodiments (not shown) the copper foil part of the electromagnetic coils may be made by computer-controlled deposition and electron beam welding or sintering following which, pre-cut pieces of the grain-oriented silicon steel may be slid into the apertures between the turns of copper foil. For example, copper foil having a thickness of 0.2 millimeters and a maximum effective width of 25 millimeters is able to carry the desired maximum current of 90 Amperes. Other suitable foil configurations may also be used. With a thickness of 0.23 millimeters, the volume of the grain-oriented silicon steel within the electromagnetic coil is sufficient to allow generation of the necessary magnetic flux strength. The thicknesses of the copper foil and the grain-oriented silicon steel may be intended as substantially only indicative and, in alternative embodiments, thicker or thinner materials are optionally employed. In certain embodiments electromagnetic coils of conventional wire-wound or ribbon-wound, bobbin construction may be employed, with an air core or core made from a suitable magnetically permeable material. In alternative embodiments, the core may be wound with interleaved layers of graphene and amorphous metals. In another alternative embodiment, the electromagnetic coils may be made with high-temperature superconducting windings. The coils may be made with an air core and/or liquid nitrogen cooling techniques or means may be employed to maintain a suitable operating temperature. In alternative embodiments, the core may be edge wound from thin foil maximising packing density.

Figure 35:
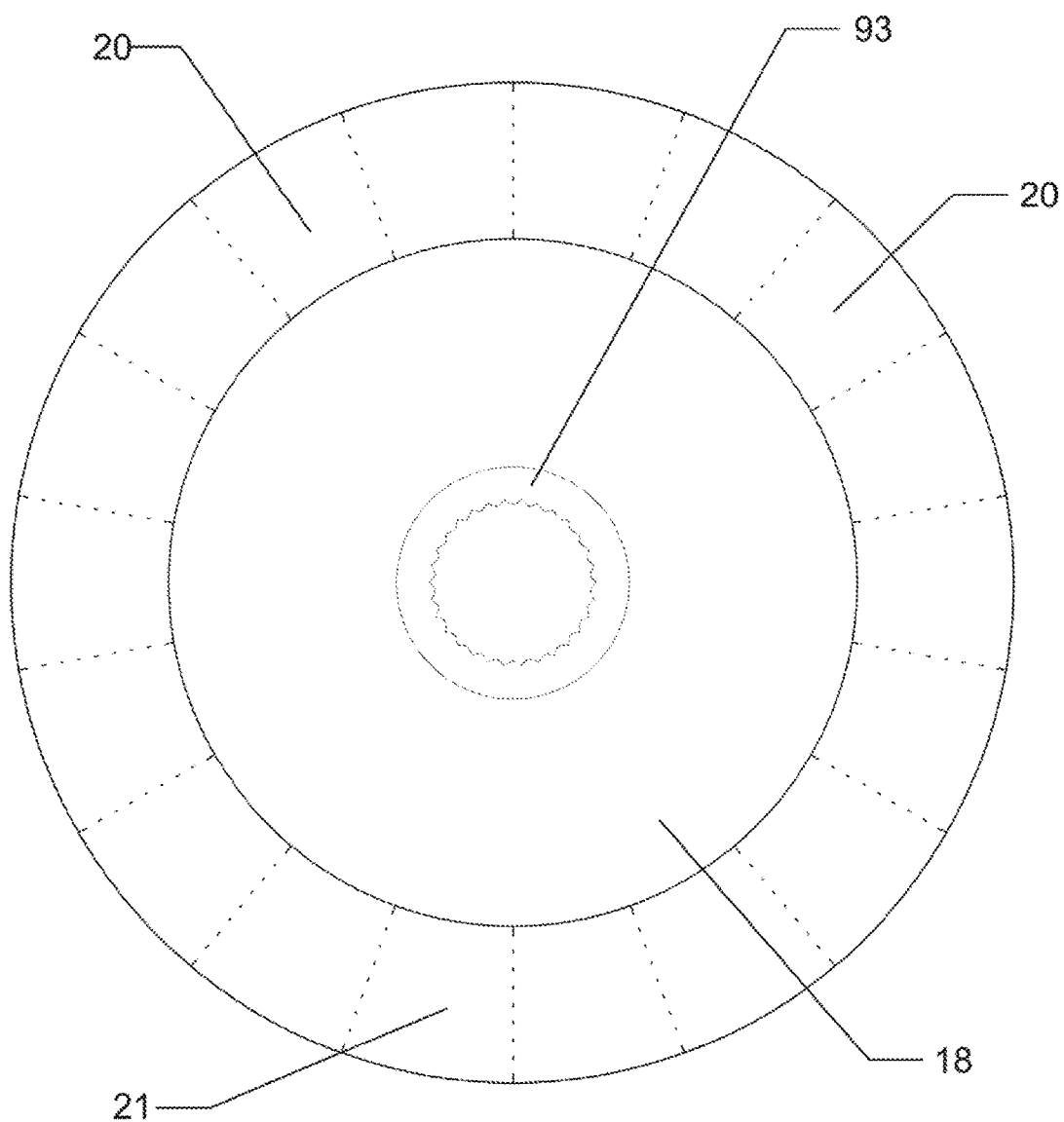
FIG. 35 is a face view of a rotor of the electric motor of FIG. 32.

With additional reference to FIG. 13, in certain embodiments, powerful (or sufficiently powerful) permanent magnets 20, 21 of circular cross-sectional shape may be embedded in the thickness of rotor disc 8 as described herein. Suitable slots 76 may be provided in the rotor disc to reduce the rotating mass and thereby the angular momentum of the rotors and to permit an axial flow of air within the electric motor casing. With additional reference to FIG. 35, in certain embodiments, powerful permanent magnets 20, 21 may be made more or less trapezoidal in shape and abutting each other with alternating pole orientation. In certain implementations, one or more of the magnets may be abutting. In certain applications, the magnets may be made more or less trapezoidal in shape and abutting, substantially abutting, each other with alternating pole orientation. In these embodiments, the radially inner edges of the permanent magnets may be shaped to engage (or communicate with) a complementary shape formed in the outer edge of the rotor disc, the side edges of the magnets may be shaped to engage (or communicate with) complementary shaping of adjacent the magnets in an array and the magnets may be retained in place on the rotor disc by a circumferential restraining band (not shown) of a high-strength metal material. The central bore 93 of the rotor disc is splined to accommodate complementary splining of the differential carrier. In certain embodiments (not shown), the powerful permanent magnets may be shaped approximately trapezoidal, but with the axis of one or more inclined to a radial passing through it by an angle of between 2.5 and 20 degrees. Other ranges of angles may also be used, for example, an angle of between 2.5 to 5 degrees, 5 to 25 degrees, 5 to 10 degrees or 15 to 20 degrees.

In certain embodiments (not shown), individual small circuit boards containing power electronics, including the H-bridge, microcontroller and galvanic isolation means may be placed on the stator disc adjacent one or more of the electromagnetic coils. The circuit boards are positioned radially outside of the coils, but occupy minimal space and do not substantially inhibit conductive cooling of the coils.

The reduced conductor length between the power electronics and the power input reduces losses due to resistive heating. A ring of clear polymer material serves as a light tube to relay control signals to the microcontrollers. In certain embodiments (not shown), the IGBTs may be made integrally with the copper of the electromagnetic coils.

Figure 36:
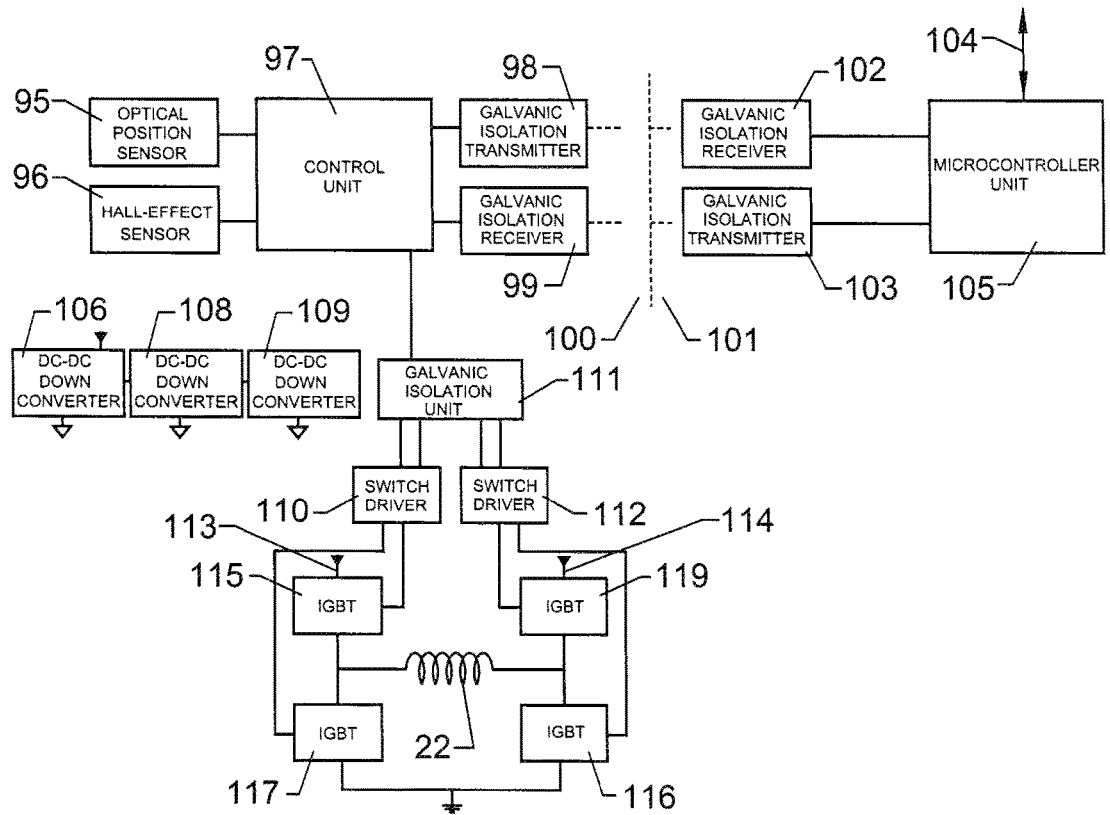
FIG. 36 is a schematic diagram of the electrical and electronic systems of the electric motor of FIG. 32.

With reference to FIG. 36, reflective optical position sensor 95 and Hall-effect sensor 96 provide rotor position-related signals to microprocessor-based control unit 97. The control unit optionally takes the form of a microcontroller and/or programmable logic device and/or programmable gate array and/or other custom-built unit. From the interior 100 of the electric motor, the control unit transmits data via galvanic isolation transmitter 98 to galvanic isolation receiver 102 on the exterior 101 of the electric motor and thence to microcontroller unit 105. Similarly, microcontroller unit 105 transmits data to control unit 97 via galvanic isolation transmitter 103 and galvanic isolation receiver 99. Separate bi-directional galvanic isolation means may be required for each the stator. From microcontroller unit 95, data is transmitted to and from a master control unit via conductors 94. Microcontroller unit 95 optionally takes the form of a microcontroller and/or programmable logic device and/or other purpose-built logic device. Control unit 97 communicates with switch drivers 110, 112 via galvanic isolation unit 111. The galvanic isolation units optionally employ one or more of the operating principles described herein and one the galvanic isolation unit is provided for one or more of the stators. Electrical current is supplied to H-bridge arrangement of IGBTs via conductors 113, 114 and IGBTs 115, 116, 117, 119 are controlled by the switch drivers. Electromagnetic coil 118 is connected to the H-bridge such that current flow reversal via switching reverses the magnetic polarity of the coil. Electrical current is supplied to DC to DC down-converter 107 via conductors 106 and the down-converter supplies current to isolated DC to DC down-converter (switching) 108 and isolated DC to DC down-converter (logic) 109. The down-converter (switching) supplies electrical current to galvanic isolation unit 111, the switch drivers and the IGBTs and the down-converter (logic) supplies electrical current to control unit 97.

Control unit 97 permits arbitrary switching of one or more of the electromagnetic coil independently of the other the coils. Using pulse-width modulation, excitation waveforms can be generated and used to drive the coil. A wide variety of coil drive profiles can be employed for the real-time maximisation of efficiency and power output over a wide range of RPM and operating temperatures. In certain embodiments of the operating method of the electric motor, maximum power may be maintained by simultaneously powering the electromagnetic coils except one, the magnetic polarity of the powered coils being alternating. The un-powered coil is then re-powered with opposite magnetic polarity such that it opposes the magnetic polarity of the preceding the coil (proceeding in the sense of the direction of rotation of the rotors) while the next coil (next in the same rotational sense) is de-powered. The process is continued with each successive coil being de-powered and then re-powered with opposite polarity to complete a movement of the one or more permanent magnets from one the coil to the next. Thus, for a complete rotation of the rotors, the number of the coil de-powerings and re-powerings (with opposite polarity) in the coil array is given by the square of the total number of the coils in the array. Where the number of powered the coils in an array is n, the electric motor is thereby electromechanically geared, in effect, by a ratio of n:1. In certain embodiments of the operating method of the electric motor, minimum power is maintained by powering one or more of the electromagnetic coils only once per rotation of the rotor such that each the coil attracts only one the magnet in the peripheral array of magnets. The electric motor is thereby electromechanically geared, in effect, by a ratio of 1:1. Various sequences or combinations of the coil powerings and de-powerings may be employed to achieve a nominated electromechanical gearing.

In certain embodiments (not shown), to reduce cogging effects and/or to maximise efficiency, the back EMF of an unpowered coil is recorded at a representative range of speeds using the analogue-to-digital converter in the microcontroller. During operation, the electromagnetic coils in an array that are normally un-powered may be powered to a level at which the magnetic flux generated equals, or substantially equals, the back EMF effect of the coil, thereby neutralizing the magnetic interaction between the un-powered coils and the permanent magnets. The mechanism is also used in regenerative braking permitting the wave to be analysed and then switched into the correct power planes. The characteristics of the back EMF of the coils may be further analysed during run time for a specific velocity, power requirement and operating temperature, and an optimal or near optimal wave generated using pulse-width modulation to, as far as is possible, maximise the efficiency of the electric motor. In the certain embodiments, such analysis may be performed automatically, substantially automatically, on a continuous basis, on a discontinuous basis or other suitable intervals. Pre-computed or partially pre-computed waveform patterns may be stored in a look-up table and may be recalled when specific velocity, power requirement, operating temperature and, optionally, back EMF, or combinations of these, is detected. The look-up tables are optionally optimised through the use of meta-heuristic algorithms, evolutionary algorithms, traditional, deterministic algorithms, other suitable optimisation techniques or combinations thereof. In certain embodiments, adaptive control may be implemented by performing optimisation at run time through the use of an incorporated support vector machine, through the use of neural network technology, through the use of fuzzy logic technology, through the use of other suitable application of machine learning technology, through the use of suitable adaptive control techniques or through combinations thereof.

In certain embodiments (not shown), a supply of clean cooling air may be supplied to the interior of the motor casing as required to maintain the stators at a predetermined temperature. The cooling air may be exhausted via a suitable valve which maintains a predetermined minimum pressure within the casing to prevent, or substantially reduce, ingress of contaminants. The supply of cooling air is optionally cooled in a refrigerated heat exchanger before being supplied to the electric motor casing. In another certain embodiments (not shown), a flow of liquefied refrigerant may be supplied to galleries formed in the casing walls and/or stators of the electric motor and may be allowed to boil off as it takes up heat from the casing. Vapour formed by the cooling process may be drawn off, compressed and cooled in suitable heat exchange configuration or means to re-liquefy it. In these embodiments, the liquefied refrigerant is optionally a conventional refrigerant or, where high-temperature superconducting coils are employed, liquid nitrogen. In certain embodiment (not shown), a flow of a suitable liquid coolant may be circulated through galleries formed in the casing walls and/or stators of the electric motor, heat taken up by the coolant subsequently being dissipated via suitable air-cooled heat-exchange configuration or means.

In certain embodiments (not shown), the electric motor may be employed as an electrical generator and one or more of the operating principles may be employed to maximise electric power generation efficiency during rapidly varying generating conditions. Such variable generating conditions may be, for example, those experienced during regenerative braking.

In certain embodiments (not shown), where the electric motor is employed as a propulsion unit for an electric vehicle, it optionally drives a wheel via a rigid or articulated shaft, it optionally drives a wheel via one or more chains or belts, it is optionally fixed centrally to a vehicle and drives wheels to either side via articulated shafts, or it optionally generates a flow of pressurised hydraulic fluid to power a hydraulic motor driving one or more wheels.

Figure 44:
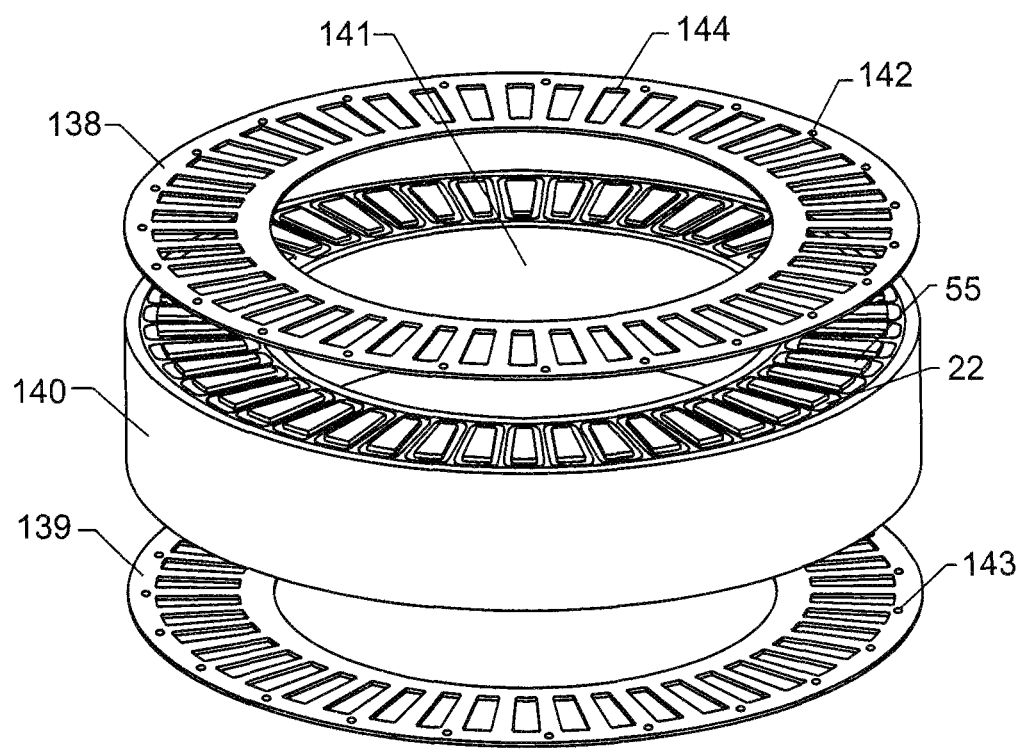
FIG. 44 is an exploded view of the stator illustrated in FIG. 42.

With reference to FIG. 44, the stator comprising of an upper retaining plate 138, an outer ring 140, an inner ring 141 and a lower retaining plate 139. A series of ferromagnetic cores 55 that may be constructed using laminated grain oriented silicon steel and a conductor such as copper wound around the outside 22 are sandwiched between the upper and lower retaining plates. Cut-outs for the cores 144 ensure that the air gap between the rotor and cores are kept to a minimum. Torque is transferred via the upper and lower retaining rings to the outer ring which is used to transfer the torque. The resultant cavities between the cores may then be filled with coolant via inlets 142 around the periphery of the upper retaining plate to the outlets 143 which are offset by one coil on the lower retaining plate. Coolant may circulate around the core on its way through the stator. Constrictions on the wall of the inner and outer ring ensure that coolant circles around the coils. Coolant distribution manifolds (not shown) may be placed above the stator and below the stator to supply and collect coolant from a coolant hose. In certain embodiments, where multiple stators are stacked together, connecting hoses from the outlets of the previous stator to the inlet of the next stator may be used. In certain embodiments, the void between coils may be filled with thermally conductive resin or ceramics to ensure effective cooling to the outer ring. In certain embodiments, fins may be added to the outer ring to maximise the thermal conduction path to a coolant ring in the outer core.

Figure 45:
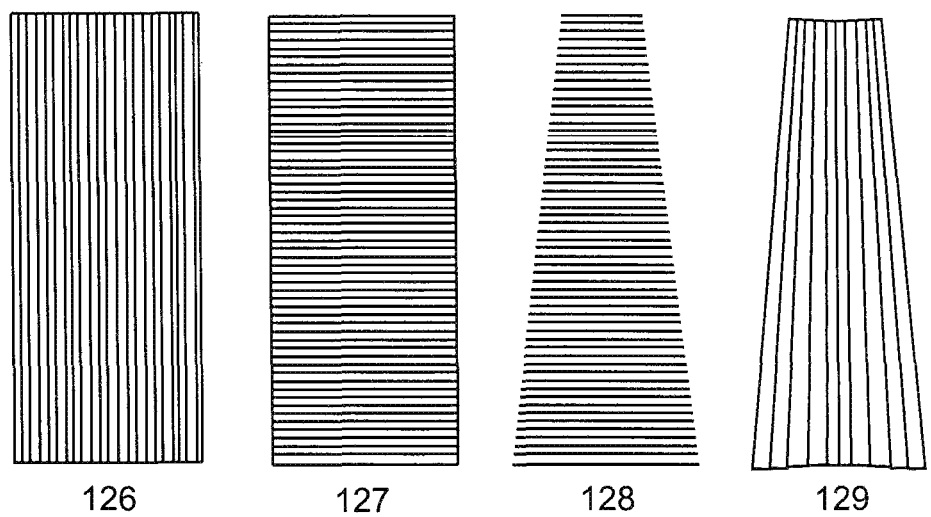
FIG. 45 illustrate four ways of stacking electrical laminates, according to certain embodiments.

FIG. 45 illustrates a top view of four different exemplary core configurations, with the magnetic field heading into the page, certain embodiments may consist of a rectangular core with the laminates along the short edge 126, of a rectangular core with the laminates along the long edge 127, of a trapazoidal core with the laminates along the edge 128, of a square trapezoidal core made up of a series of trapezoidal laminates along the long edge 129. Cores may also be made using a concertina of laminates, for example, U shapes, I shapes, E shapes, T shapes, with laminates along both the long and the edge. Cores may further be made by casting or sintering powdered metals or from solid ferrous material. In certain embodiments, laminated electrical steels do provide an advantage in terms of its very high permeability and low eddy current losses. The cores may have notches cut out or holes or other features cut to assist in the stacking and assembly of the cores and in retaining them within the stator.

Figure 46:
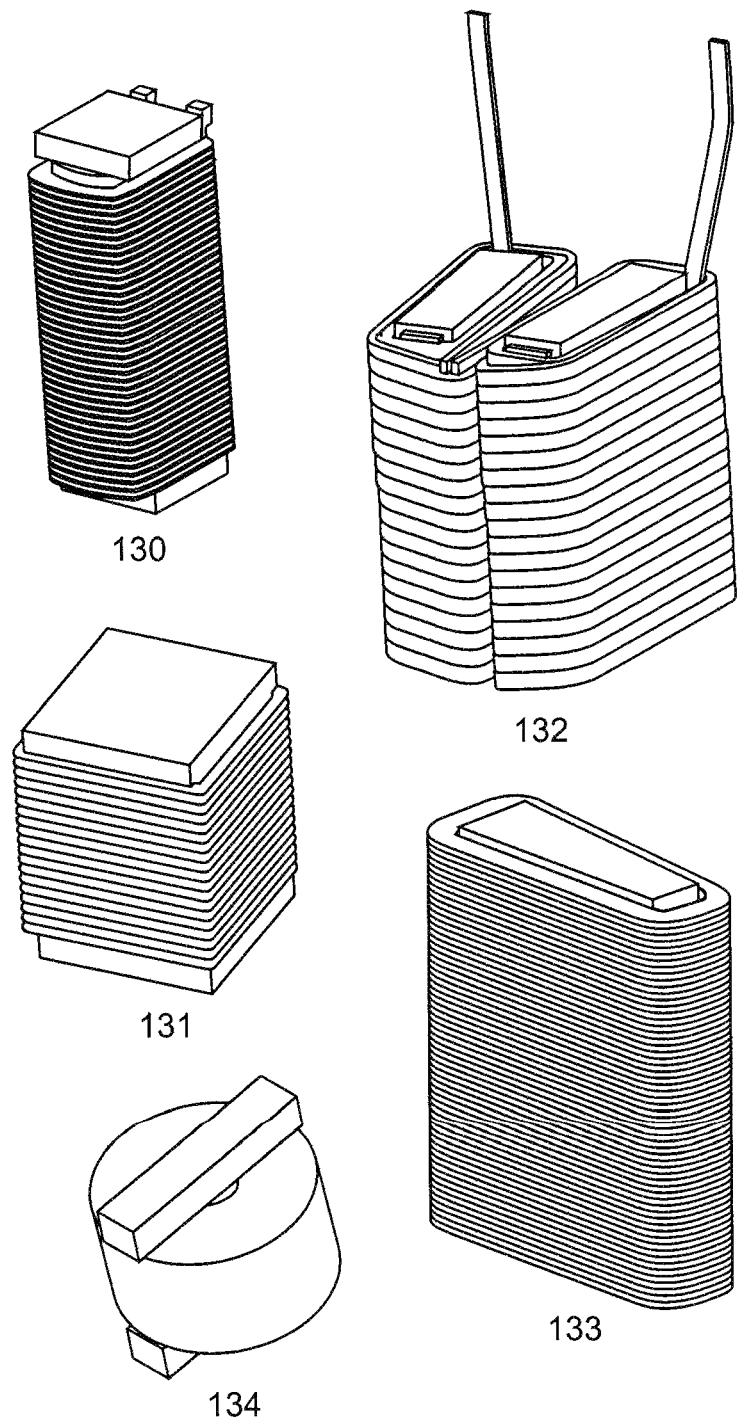
FIG. 46 illustrate various coils using a variety of conductor winding types, according to certain embodiments.
Figure 47:
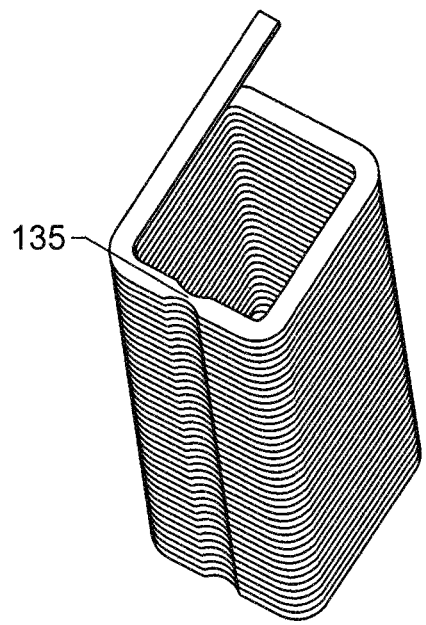
FIG. 47 illustrates a thinner section of the coil that may be included in certain embodiments.

As shown in FIG. 46, certain embodiments may have cores with coils of conductors wrapped around the periphery of the core. The copper may be over a bobbin 130, be standard round wire directly around a core 131, rectangular wire around a core 132, rectangular wire edge wound around a core 133, or foil wrapped around a core 134, or a combination of the above. With reference to FIG. 47, a thinner section of copper 135 may be included in certain embodiments where in the event of a short through the coil the coil may fuse open preventing large eddy currents that introduce unnecessary drag resulting in excessive heat reducing the risk of fire and/or improving overall robustness of the system.

Figure 48:
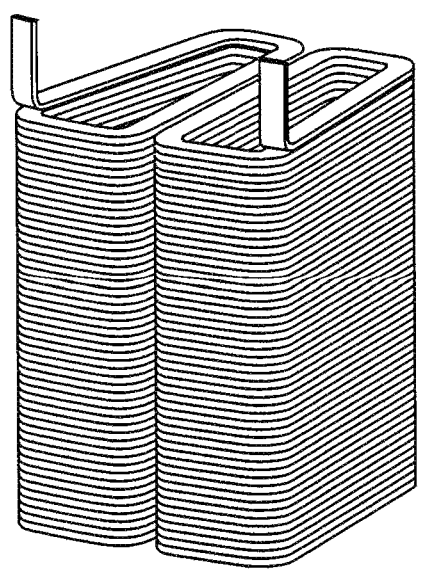
FIG. 48 illustrates a pair of cores connected at the bottom such that the connectors are both at the top, according to certain embodiments.

With reference to FIG. 48 in certain embodiments, to facilitate the routing of the wires, two coils are wired side by side providing opposing magnetic fields providing a return path to a single set of electronics.

In a certain exemplary embodiment, 46 32 mm by 7.5 mm trapezoidal cores are arranged in a 27 mm stator. Each core is constructed out of 0.23 mm electrical steel, with small locking features ensuring that the upper and lower retaining plates fabricated out of carbon fibre hold the cores in place. The carbon fibre is attached to a 290 mm outer ring where the torque is transferred to a set of mounting holes in a similar location of that of a standard differential. Each core is surrounded with a 0.5 mm×3 mm edge wound coil, which is attached to the core using a thermally conductive adhesive. These cores are glued into the lower retaining plate ensuring no leaking between the core and the retaining plate. A 0.5 mm air gap is maintained between the ends of the cores and a platter of 48 trapezoidal magnets of 32 mm by 7 mm, with a thickness of 8 mm. The motor consists of 4 stators interleaved between 5 rotors, with the end rotors having a ferrous end plate to contain the magnetic field. Conductors and ducts for coolant are attached between the stators and arriving at the end where it is connected to drive electronics. The rotors are attached to a differential carrier and the entire device is housed in an enclosure with thrust bearing at either end. Each coil control unit is connected to 8 coils, one output from the H-bridge connected to a coil in the top stator, in series with a coil in the second stator, in series with a coil in the third stator, in series with a coil in the bottom stator. At the bottom the coil is connected to an adjacent coil that heads exits at the top of the bottom stator. This coil is attached to the coil on the third stator, which is attached to the coil in the second stator, which is ultimately connected to the coil in the top stator which is connected to the second connection of the H-bridge.

In the afore mentioned embodiment, each stator magnet pair is able to produce approximately 750 Nm of torque at 75 Amps RMS. The 4 stators therefore provide a maximum torque of around 3000 Nm, enough to propel a full sized family Sudan without the need for gearing. The direct liquid cooling may provide continuous cooling at around 50 Amps per mm squared. In certain applications, this embodiment may be rated to operate continuously at this torque. At 400 volts this embodiment may reach a top speed of approximately 1500 RPM which is roughly equivalent to 150 km/h when driving a standard sedan sized tyre. The total length of this embodiment is 283 mm and diameter is 290 mm of a size that can fit into the differential mounting area of a GM Holden Commodore. The weight is approximately 52 kg including the control electronics and differential.

Method of Design and Manufacture of Certain Exemplary Embodiments

The following examples are included to be illustrative of the variety of devices that may be designed and/or manufactures using certain disclosed embodiments. By using the approaches disclosed herein, it is contemplated that a large number of devices may be designed and constructed using the technology disclosed herein.

A. In this exemplary method of manufacture, one or more design requirements are supplied. For example, these requirements may including: size of the device, weight of the device, the maximum power of the device, the voltage it needs to operate off or generate, the peak current draw or supply (controls the maximum power), the number of connections to the power supply (DC, single phase, three phase), the range of angular velocities which the device will run at, the amount of torque that needs to be delivered, the maximum torque the shaft needs to be absorbed, or combinations thereof. It is to be understood that other features may be used in designing and manufacturing the device.

This information may then be processed in the following way: First a suitable module is selected such that it is capable of handling the voltage required and has enough contacts and switches, (for example, two for single phase and DC, three for three phase delta, four for three phase star). The power rating of each module is then divided into the maximum power required. The maximum size of the motor is then taken into consideration to decide the number of coils that can fit into a circular arrangement; this becomes the size of the platter. The number of platters is the number of coils per platter divided into the total number of coils. This number of coils is then checked against the maximum angular velocity ensuring that the inductance of the coil in the module is not such that it cannot switch at that desired frequency. If it is too high, the diameter can be reduced to result in less number of coils per platter, resulting in lower frequency of operation. This provides the design information that may then be used to construct the device.

B. In this exemplary method of manufacture, one or more specifications are provided. In this example, the device to be built specifies a motor 300 kw as light as possible, preferably under 30 kgs, needs to fit into a diameter less than 400 mm, as much torque as possible, needs to accelerate smoothly from stationary, top angular velocity 3000 RPM, 120 volts DC, peak current 1500 Amps. The device further specifies high torque, and small size, and iron core, high power magnets. The DC source results in two inputs.

The next step is to selected iron core 330 v, 90 A single phase module which runs at 120 volts, max current of 90 A, peak power is 10 kw. This information indicates a minimum of 30 coils. To get maximum torque smoothing, this specification would indicate one more magnet than coil per platter, Therefore, calculating the number of magnets that can be arranged in a circle of diameter of 400 mm, and find that up to 19 can fit. The magnets selected in this example are an even number so that they have alternating fields around the platter, with one less to make it even, i.e., 18 magnets.

Next the number of coils is selected. In certain applications as in this one, the number of coils is often a prime number to minimise harmonics, here 17 works, repetition every 34 rotations, harmonic at maximum angular velocity 1.5 Hz. The maximum frequency of switching coils at maximum angular velocity is 50 rotations per second times 17 coils, divided by two to take into account positive and negative switch equals 425 Hz.

This results in a final configuration of 2 stator platters of 17 coils, total 34 coils total of 320 kw (as one coil per platter is off at any point in time), and 3 platters of 18 magnets. Based on this design a device may be built with a platter stator for coils accommodating 17 coils. The next step is to design and manufacture magnetic platter accommodating 18 coils and to design and manufacture an enclosure and bearing supports to hold the device together. Next assemble the coils into stator platters, magnets into rotor platters and build the device. The next step is to modify software to control 17 coils and to switch to generation mode on breaking.

C. In this exemplary manufacture a specifications is set forth that specifies 3MW, weight is not a consideration, needs to fit into a diameter less than 2000 mm, rotation up to 120 RPM, output voltage should be 3000 volts RMS 650 Amps at 50 Hz to match mains, three phase. The specification further specifies high voltage at low speed, specifies iron core, lots of windings, low current to optimise efficiency. Three phase source therefore specifies three outputs.

This indicates to select iron core 4000 v, 10 A three phase module. Run at 3000 volts, max current of 10 A, peak power is 30 kw. This also indicates a minimum of 100 coils. Furthermore, to maximise angular velocity over the coils to maximise voltage generation, a large diameter platter is well suited for this application. Since torque smoothness is not of as much concern, but harmonics in large blades can be of concern, this example indicates one more magnet than coil per platter.

Based on this information, the next step is to calculate the number of magnets that can be arranged in a circle of diameter of 2000 mm, find that up to 104 can fit. Since the number of coils is typically prime to minimise harmonics, 101 works in this example.

This results in a final configuration of, 1 stator platters of 101 coils, and 2 platters of 102 magnets.

The next step is to design and manufacture platter stator for coils accommodating 101 coils. Design and manufacture magnetic platters accommodating 102 coils. Design and manufacture enclosure and bearing supports to hold the device together. Assemble the coils into stator platters, magnets into rotor platters and put it together. Modify the software to control 101 coils and to synchronise to the grid and ensure voltage is maintained at 3000V RMS.

D. In this exemplary example the specification specifies 1GW, weight not a problem, size not a problem, rotation up to 300 RPM, output voltage should be 3000 volts RMS 333333 Amps at 50 Hz primary driver of mains frequency, three phase. There are not many constraints in this specification so it is possible to vary several parameters. However, this example uses the process outlined in example C. Another factor is to ensure that diameter is big enough for a shaft that is strong enough to not shear when 1GW of rotational power is being put into the shaft. This example may use 512 stacks of 101 coils, total modules 5221.

E. In this exemplary example the specification specifies 2 Kw, max diameter 400 mm, rotation up to 300 RPM, input voltage single phase 230 v AC 50 hz, price constraint Choose small modules, air core, 1 amps max per coil. Total per coil 230 w, require about 10, pick 17 to ensure that the dead points in the single phase do not affect the overall power output. To minimise cost combine switches and processor onto single circuit board and arrange coils around stator.

Applications

Figure 37:
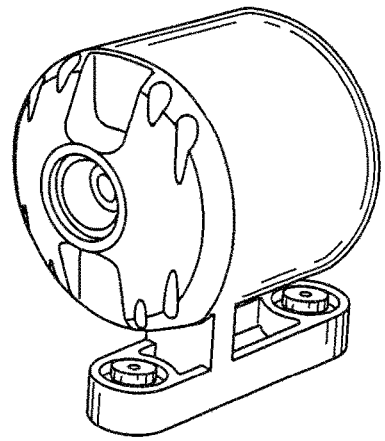
FIG. 37 illustrates the electrical machine detailed in FIG. 33. Suitable applications include traction motors in vehicles attached in place of the differential, according to certain embodiments.

Certain embodiments may be used to convert electrical to mechanical energy. In certain embodiments, where the electric motor is employed as a propulsion unit for an electric vehicle the motor may be mounted directly into a vehicle to the same or somewhat similar mounting point as a standard vehicle differential. FIG. 37 illustrates an exemplary electrical machine that may be used in traction applications.

Figure 38:
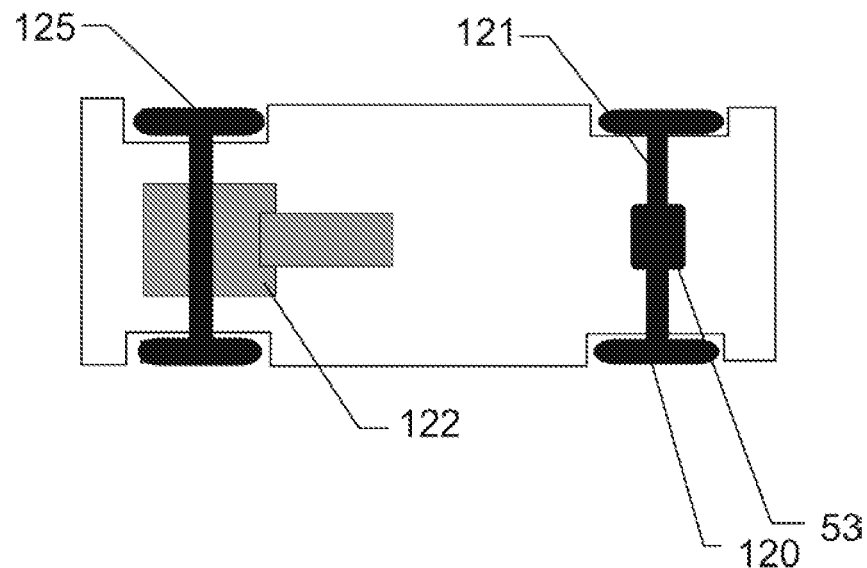
FIG. 38 is a top view of a rear wheel drive vehicle illustrating a location of the electrical machine, according to certain embodiments.

In certain embodiments the electrical machine may be used to drive a rear wheel drive electric vehicle. FIG. 38 is a top down illustration of an example of such an installation. The electric motor 53 is mounted at the rear of the vehicle in the same or similar location as the differential. The standard half shafts 121 are connected from the motor to the rear wheels 120. High voltage, high current conductors and control cables can be run along drive shaft tunnel the same path previously occupied by the drive shaft from the battery 122 that may be located in the location previously occupied by the internal combustion engine and transmission.

Figure 39:
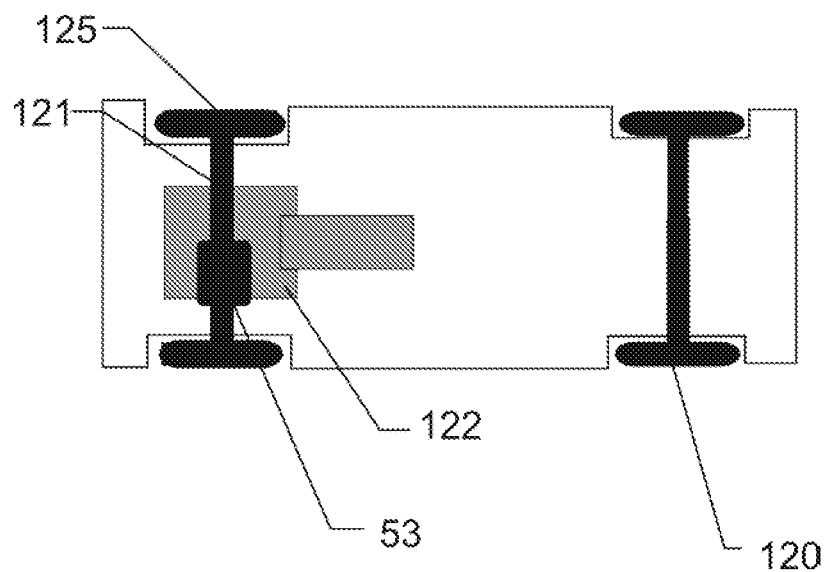
FIG. 39 is a top view of a front wheel drive vehicle illustrating a location of the electrical machine, according to certain embodiments.

In certain embodiments the electrical machine may be used to drive a front wheel drive electric vehicle. FIG. 39 is a top down illustration of an example of such an installation. The electric motor 53 is mounted at the front of the vehicle in the same or similar location as the differential. The standard half shafts 121 are connected from the motor to the front wheels 125. High voltage, high current conductors and control cables connect the battery 122 that may be located in the location previously occupied by the internal combustion engine and transmission.

Figure 40:
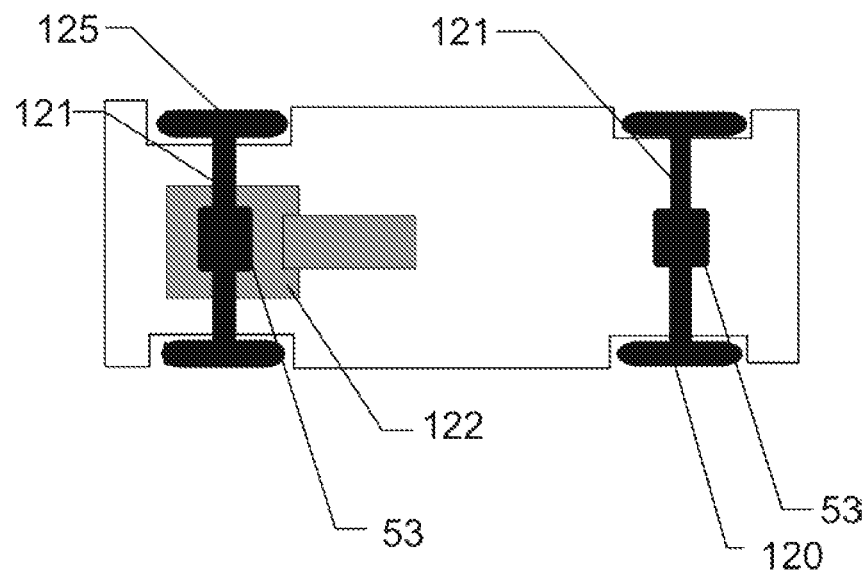
FIG. 40 is a top view of an all wheel drive vehicle illustrating a location of the electrical machine, according to certain embodiments.

In certain embodiments the electrical machine may be used to drive an all-wheel drive electric vehicle. FIG. 40 is a top down illustration of such an installation. Two electric motors 53 are mounted at the front and rear of the vehicle in the same or similar location as the differential. The standard half shafts 121 are connected from the motor to the front and rear wheels 120. High voltage, high current conductors and control cables can be run along drive shaft tunnel the same path previously occupied by the drive shaft from the battery 122 that may be located in the location previously occupied by the internal combustion engine and transmission.

Figure 41:
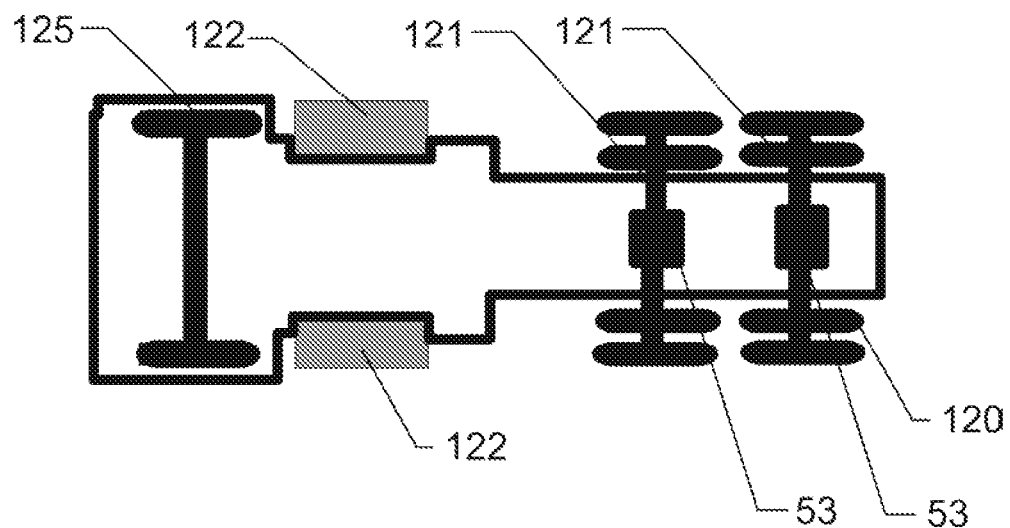
FIG. 41 is a top view of a semi-trailer truck illustrating a location of the electrical machine, according to certain embodiments.

In certain embodiments the electrical machine may be used to drive a semi trailer truck. FIG. 41 is a top down illustration of such an installation. Two electric motors 53 are mounted at the rear of the vehicle in the same or similar location as the differential. The standard half shafts 121 are connected from the motor to the two pairs of rear wheels 120. High voltage, high current cables run along the same path previously occupied by the drive shaft from the battery located in the location previously occupied by the petrol tanks. These batteries can be made detachable and can be lifted on and off the truck using a forklift for rapid recharging of a truck.

In an alternative embodiment (not shown), where the electric motor is employed as a propulsion unit for an electric vehicle, it optionally drives a wheel via a rigid or articulated shaft, it optionally drives a wheel via one or more chains or belts, it is optionally fixed centrally to a vehicle and drives wheels to either side via articulated shafts, or it optionally generates a flow of pressurised hydraulic fluid to power a hydraulic motor driving one or more wheels.

Furthermore in certain applications, vehicles having electronic control of braking and/or acceleration, opportunities exist for computer control of vehicle dynamics, including one or more of the following:

Active cruise control, in which a vehicle maintains a predetermined distance from a vehicle ahead;

Collision avoidance, where a vehicle brakes automatically to avoid a collision;

Emergency brake assistance, in which a vehicle senses an emergency stop and applies maximum effective braking;

Active software differentials, where individual wheel speed is adjusted in response to other inputs;

Active brake bias, where individual wheel brake effort is adjusted in real time to maintain vehicle stability;

Brake steer, where individual wheel brake bias is adjusted to assist steering; and sources of electric current, for traction applications, in sustained or intermittent.

Similarly, in other alternative embodiments, the magnets and the electromagnetic coils may optionally be made in equal numbers, but preferably with locational asymmetry to prevent or reduce magnetic stasis at start-up. In certain applications, the greater centre diameter of the arrays of magnets and the electromagnetic coils, the greater the torque able to be generated. The arrangement of the electric motor permits many combinations to be created from standard components—from a single rotor and stator combination to combinations employing at least 10 rotors. The combinations employing larger numbers of rotors and stators may be used in large machines, such as heavy trucks and earthmoving equipment. Other applications may be regenerative braking and/or power generation.

Adding a capacitor to the module, and configuring the switches and the coil in either a buck, boost or a buck and boost configuration, the device may be driven by software to generate a specific dc voltage to charge batteries.

In certain embodiments, the torque required to turn the electrical machine depends on the number of coils generating. The torque required to turn the machine maybe in substantially real time (or real time) increased and/or decreased.

Example 1A.1

An electrical machine comprising: at least one stator; at least one module, the at least one module comprising at least one electromagnetic coil and at least one switch, the at least one module being attached to the at least one stator, at least one rotor with a plurality of magnets attached to the at least one rotor, wherein the at least one rotor has an integrated differential, the at least one differential permits the rotor to output at least two rotational outputs, wherein the at least two rotational outputs are able to move at different rotational velocities to each other, wherein the at least one module is in spaced relation to the plurality of the magnets; and the at least one rotor being in a rotational relationship with the at least one stator, wherein the quantity and configuration of the at least one module in the electrical machine is determined based in part on one or more operating parameters; wherein the at least one module is capable of being independently controlled; and wherein the at least one module is capable of being reconfigured based at least in part on one or more of the following: at least one operating parameter during operation, at least one performance parameter during operation, or combinations thereof.

Example 1A.4

An electrical machine comprising at least one stator; at least one module, the at least one module comprising at least one electromagnetic coil and at least one switch, the at least one module being attached to the at least one stator, at least one platter or rotor with a plurality of magnets attached to the at least one platter or rotor, wherein the at least one rotor has an integrated differential, the at least one differential permits the rotor to output at least two rotational outputs, wherein the at least two rotational outputs are able to move at different rotational velocities to each other, wherein the at least one module is in spaced relation to the plurality of the magnets; and the at least one platter or rotor being movement relationship with the at least one stator, wherein the quantity and configuration of the at least one module in the electrical machine is determined based in part on one or more operating parameters; wherein the at least one module is capable of being independently controlled; and wherein the at least one module is capable of being reconfigured based at least in part on one or more of the following: at least one operating parameter during operation, at least one performance parameter during operation, or combinations thereof.

Example 1A.5

An electrical machine comprising: at least one stator; at least one module, the at least one module comprising at least one electromagnetic coil and at least one switch, the at least one module being attached to the at least one stator, at least one platter or rotor with a plurality of magnetic induction loops, attached to the at least one platter or rotor, wherein the at least one platter or rotor has an integrated differential, the at least one differential permits the rotor to output at least two rotational outputs, wherein the at least two rotational outputs are able to move at different rotational velocities to each other, wherein the at least one module is in spaced relation to the plurality of the magnetic induction loops; and the at least one platter or rotor being movement relationship with the at least one stator, wherein the quantity and configuration of the at least one module in the electrical machine is determined based in part on one or more operating parameters;
wherein the at least one module is capable of being independently controlled; and
wherein the at least one module is capable of being reconfigured based at least in part on one or more of the following at least one operating parameter during operation, at least one performance parameter during operation, or combinations thereof.

Example 1A.6

An electrical machine comprising: at least one stator; at least one module, the at least one module comprising at least one electromagnetic coil and at least one switch, the at least one module being attached to the at least one stator, at least one platter or rotor with a plurality of magnetic reluctance projections attached to the at least one platter or rotor, an integrated differential coupled to at least one of the at least one platters or rotors, the at least one integrated differential permitting the at least one platter or rotor to output at least two rotational outputs to corresponding shafts, wherein the at least two rotational outputs are able to move the shafts at different rotational velocities to one another, wherein the at least one module is in spaced relation of a plurality of magnetic reluctance projections; and the at least one platter or rotor being movement relationship with the at least one stator, wherein the quantity and configuration of the at least one module in the electrical machine is determined based in part on one or more operating parameters; wherein the at least one module is capable of being independently controlled; and wherein the at least one module is capable of being reconfigured based at least in part on one or more of the following: at least one operating parameter during operation, at least one performance parameter during operation, or combinations thereof.

Example 1A.7

An electrical machine comprising at least one stator; at least one module, the at least one module comprising at least one electromagnetic coil and at least one switch, the at least one module being attached to the at least one stator, at least one rotor with a plurality of magnets attached to the at least one rotor, an integrated differential coupled to at least one of the at least one rotors, the at least one integrated differential permitting the at least one rotor to output at least two rotational outputs to corresponding shafts, wherein the at least two rotational outputs are able to move the shafts at different rotational velocities to one another wherein the at least one module is in spaced relation to the plurality of the magnets; and the at least one rotor being in a rotational relationship with the at least one stator.

Example 1A.9

An electrical machine comprising: at least one stator; at least one module, the at least one module comprising at least one electromagnetic coil and at least one switch, the at least one module being attached to the at least one stator, at least one platter or rotor with a plurality of magnets attached to the at least one platter or rotor, wherein the at least one rotor has an integrated differential, the at least one differential permits the rotor to output at least two rotational outputs, the at least one rotor is attached to at least one crown wheel that is driven by at least one drive shaft, wherein the at least two rotational outputs are able to move at different rotational velocities to each other, wherein the at least one module is in spaced relation to the plurality of the magnets; and the at least one platter or rotor being movement relationship with the at least one stator.

Example 1A.10

An electrical machine comprising: at least one stator; at least one module, the at least one module comprising at least one electromagnetic coil and at least one switch, the at least one module being attached to the at least one stator, at least one platter or rotor with a plurality of magnets attached to the at least one platter or rotor, an integrated differential coupled to at least one of the at least one platters or rotors, the at least one integrated differential permitting the at least platter or rotor to output at least two rotational outputs to corresponding shafts, wherein the at least two rotational outputs are able to move the shafts at different rotational velocities to one another, wherein the at least one module is in spaced relation to the plurality of the magnets; and the at least one platter or rotor being movement relationship with the at least one stator.

Example 1A.11

An electrical machine comprising: at least one stator; at least one module, the at least one module comprising at least one electromagnetic coil and at least one switch, the at least one module being attached to the at least one stator, at least one platter or rotor with a plurality of magnetic reluctance projections attached to the at least one platter or rotor, an integrated differential coupled to at least one of the at least one platters or rotors, the at least one integrated differential permitting the at least platter or rotor to output at least two rotational outputs to corresponding shafts, wherein the at least two rotational outputs are able to move the shafts at different rotational velocities to one another, wherein the at least one module is in spaced relation to the plurality of magnetic reluctance projections; and the at least one platter or rotor being movement relationship with the at least one stator.

Example 1A.12

An electrical machine comprising: at least one stator; at least one module, the at least one module comprising at least one electromagnetic coil and at least one switch, the at least one module being attached to the at least one stator, at least one platter or rotor with a plurality of magnetic induction loops attached to the at least one platter or rotor, an integrated differential coupled to at least one of the at least one platters or rotors, the at least one integrated differential permitting the at least platter or rotor to output at least two rotational outputs to corresponding shafts, wherein the at least two rotational outputs are able to move the shafts at different rotational velocities to one another, wherein the at least one module is in spaced relation to the plurality of magnetic induction loops; and the at least one platter or rotor being movement relationship with the at least one stator.

Example 2A.1

The electrical machine of one or more of the examples 1A.7 to 1A.12, wherein the quantity and configuration of the at least one module in the electrical machine is determined based in part on one or more operating parameters; wherein the at least one module is capable of being independently controlled; and wherein the at least one module is capable of being reconfigured based at least in part on one or more of the following: at least one operating parameter during operation, at least one performance parameter during operation, or combinations thereof.

Example 2A.2

The electrical machine of one or more of the examples 1A.7 to 1A.12, wherein the quantity and configuration of the at least one module in the electrical machine is determined based in part on one or more operating parameters.

Example 2A.3

The electrical machine of one or more of the examples 1A.7 to 1A.12, wherein the at least one module is capable of being independently controlled.

Example 2A.4

The electrical machine of one or more of the examples 1A.7 to 1A.12, wherein the at least one module is capable of being reconfigured based at least in part on one or more of the following: at least one operating parameter during operation, at least one performance parameter during operation, or combinations thereof.

Example 2A.5

The electrical machine of one or more of the examples 1A.7 to 1A.12, wherein the quantity and configuration of the at least one module in the electrical machine is determined based in part on one or more operating parameters; and wherein the at least one module is capable of being independently controlled.

Example 2A.6

The electrical machine of one or more of the examples 1A.7 to 1A.12, wherein the at least one module is capable of being independently controlled; and wherein the at least one module is capable of being reconfigured based at least in part on one or more of the following: at least one operating parameter during operation, at least one performance parameter during operation, or combinations thereof.

Example 2A.7

The electrical machine of one or more of the examples 1A.7 to 1A.12, wherein the quantity and configuration of the at least one module in the electrical machine is determined based in part on one or more operating parameters; and wherein the at least one module is capable of being reconfigured based at least in part on one or more of the following: at least one operating parameter during operation, at least one performance parameter during operation, or combinations thereof.

Example 3

A The electrical machine of one or more of the above A examples, wherein the one or more operating parameters are selected from one or more of the following: maximum angular velocity, average angular velocity, minimum angular velocity, maximum power output, average power output, minimum power output, maximum input voltage, average input voltage, minimum input voltage, maximum generation voltage, average generation voltage, minimum generation voltage, peak input current, average input current, minimum input current, maximum generation current, average generation current, minimum generation current, maximum torque, average torque, activation sequence, minimum torque, torque smoothness, rate of acceleration, accuracy of hold angle, minimising the variation of angular velocity, rate of deceleration during breaking, diameter of the shaft, maximum radius of the electrical machine, maximum length of the electrical machine, maximum depth of the electrical machine, maximum height of the machine, maximum slide distance, minimum slide distance, maximum weight of the machine, minimum weight of the machine, maximum resistive power loss, unit redundancy and overall price.

Example 4A.1

The electrical machine of one or more of the above A examples, wherein the at least one operating parameter during operation may be selected from one or more of the following: maximum angular velocity, average angular velocity, minimum angular velocity, maximum power output, average power output, minimum power output, maximum input voltage, average input voltage, minimum input voltage, maximum generation voltage, average generation voltage, minimum generation voltage, shape and frequency of generated voltage, peak input current, average input current, minimum input current, maximum generation current, average generation current, minimum generation current, maximum torque, average torque, minimum torque, torque smoothness, activation sequence, rate of acceleration, order of accuracy of hold angle, minimising the variation of angular velocity, rate of deceleration during breaking, diameter of the shaft, maximum radius of the electrical machine, maximum length of the electrical machine, maximum depth of the electrical machine, maximum height of the machine, maximum slide distance, minimum slide distance, maximum weight of the machine, minimum weight of the machine, maximum resistive power loss, unit redundancy and overall price.

Example 4A.2

The electrical machine of one or more of the above A examples, wherein the at least one performance parameter during operation may be selected from one or more of the following: maximum angular velocity, maximum power output, deviation from output voltage during generation, maintaining a required generation voltage, torque smoothness, rate of acceleration, accuracy of hold angle, minimising the variation of angular velocity, matching requested rate of deceleration during breaking, minimising resistive power loss, overall efficiency, power factor correction, mechanical harmonic cancelation, electrical harmonic cancelation, accuracy of reproduced output voltage wave, and accuracy of generated frequency.

Example 4A.3

The electrical machine of one or more of the above A examples, wherein one or more performance parameters during operation may be selected from one or more of the following: maximum angular velocity, maximum power output, deviation from output voltage during generation, maintaining a required generation voltage, torque smoothness, rate of acceleration, accuracy of hold angle, minimising the variation of angular velocity, matching requested rate of deceleration during breaking, minimising resistive power loss, overall efficiency, power factor correction, mechanical harmonic cancelation, electrical harmonic cancelation, accuracy of reproduced output voltage wave, and accuracy of generated frequency.

Example 4A.4

The electrical machine of one or more of the above A examples, wherein the at least one module is capable of being reconfigured based at least in part on one or more of the following; at least one operating parameter during operation, wherein the at least one operating parameter during operation may be selected from one or more of the parameters listed in example 4A.3; at least one performance parameter during operation, wherein the at least one performance parameter during operation may be selected from one or more of the parameter listed in example 4A.2; or combinations thereof.

Example 5

A The electrical machine of one or more of the above A examples, wherein the at least one electromagnetic coil comprises a plurality of electromagnetic coils that are in a substantially circular arrangement or an axial flux arrangement.

Example 6

A The electrical machine of one or more of the above A examples, wherein the at least one electromagnetic coil and the plurality of magnets are in an angular or a radially offset arrangement.

Example 7

A The electrical machine of one or more of the above A examples, wherein the number of coils in the at least one electromagnetic coil is not the same number as the number of magnetic in the plurality magnets.

Example 8

A The electrical machine of one or more of the above A examples, wherein the number of coils in the plurality of electromagnetic coils is the same number as the number of magnetic in the plurality of magnets and the spaced relation between the plurality of electromagnetic coils and the plurality of magnets is geometrically offset to prevent concentric alignment.

Example 9

A The electrical machine of one or more of the above A examples, wherein the number of coils in the at least one electromagnetic coil is at least one less than the number of magnets in the plurality of magnets.

Example 10

A The electrical machine of one or more of the above A examples, wherein the plurality of electromagnetic coils are arranged in an axially aligned arrangement with the plurality of magnets.

Example 11

A The electrical machine of one or more of the above A examples, wherein the plurality of electromagnetic coils are arranged in axially misaligned arrangement by at least 5, 10, 15, 20, 25, 30, 35, 40, or 45 degrees with the plurality of magnets.

Example 12

A The electrical machine of one or more of the above A examples, wherein the plurality of electromagnetic coils are axially aligned with the at least one stator and the plurality of magnets are axially aligned with the at least one rotor.

Example 13

A The electrical machine of one or more of the above A examples, wherein the plurality of electromagnetic coils are substantial perpendicular or perpendicular with the at least one stator and the plurality of magnets coils are substantial perpendicular or perpendicular with the at least one rotor.

Example 14

A The electrical machine of one or more of the above A examples, further comprising an enclosure that is mechanically sufficient to suitably resist deformation from mechanical forces when in operation.

Example 15

A The electrical machine of one or more of the above A examples, further comprising an enclosure that is thermally conductive.

Example 16

A The electrical machine of one or more of the above A examples, further comprising an enclosure that may be used as a conductor for one or more electronic switches.

Example 17A.1

The electrical machine of one or more of the above A examples, wherein the power to weight ratio of the electrical machine is at least 0.01, 0.1, 0.25, 0.5, 1, 2, 3, 3.4 4, 4.5 5, 6, 7, 8, 8.4 9, 10 11, 12, 13, 14 or 15 kilowatts per kilogram.

Example 17A.2

The electrical machine of one or more of the above A examples, wherein the power to weight ratio of the electrical machine is at between 10 to 1, 15 to 3, 10 to 0.5, 9 to 4, 5 to 0.01, 3.4 to 6 or 8.4 to 3.4 kilowatts per kilogram.

Example 18A.1

The electrical machine of one or more of the above A examples, wherein the power to weight ratio of the electrical machine is 10%, 25%, 50%, 100%, 125%, 150%, 200%, 250%, 300%, 500% or 1000% greater than a brushless permanent magnet three phase electrical machine with a substantially similar size and weight.

Example 18A.2

The electrical machine of one or more of the above A examples, wherein the power to weight ratio of the electrical machine is between 10% to 1000%, 10% to 25/%, 10% to 100%, 25% to 50%, 25% to 150%, 50% to 250%, 50% to 100%, 100% to 125%, 100% to 250%, 125% to 150%, 150% to 300%, 200% to 1000%, 250% to 500%, 250% to 1000% or 500% to 1000% greater than a brushless permanent magnet three phase electrical machine with a substantially similar size and weight.

Example 19A.1

The electrical machine of one or more of the above A examples, further comprising at least one sensor to detect absolute or relative position of the at least one rotor; and at least one control system which, in response to inputs from the one or more of the following: the at least one sensor, at least one power command, at least one mode command comprising one or more of the following at least one drive, generate, braking and hold command and at least one rotational direction command.

Example 19A.2

The electrical machine of example 19A.1, wherein the at least one control system is configured to be in a drive configuration or has the at least one drive mode command, the at least one control system activates at least one switch which energies one or more of the magnetic coils to attract and repel the magnets for the purpose of generating motion.

Example 19A.3

The electrical machine of example 19A.1, wherein the electrical machine is configured to be in a generation configuration or has at least one mode command to generate power, the at least one control system activates at least one switch which connects one or more coils to the external power rails.

Example 19A.4

The electrical machine of example 19A.1, wherein the electrical machine is configured to be in a braking configuration or has the at least one mode command to brake, the at least one control system activates at least one switch which connects one or more of the magnetic coils terminals together to oppose motion.

Example 19A.5

The electrical machine of example 19A.1, wherein the electrical machine is configured to be in a holding configuration or has the at least one mode command to hold, the at least one control system activates at least one switch energises one or more of the magnetic coils to attract and repel magnets for the purpose of stopping motion.

Example 20A.1

The electrical machine of one or more of the above A examples, wherein the at least one control system in operation is determining one or more appropriately efficient modes of operation in relation to the at least one operating parameter on a substantially continuous basis during operating periods.

Example 20A.2

The electrical machine of one or more of the above A examples, wherein the at least one control system in operation is determining one or more appropriately efficient modes of operation in relation to the at least one operating parameters, the at least one performance parameter or combinations thereof on a substantially continuous basis during operating periods.

Example 21A

The electrical machine of one or more of the above A examples, wherein the electrical machine is capable of being operated efficiently over 50%, 60%, 70%, 80%, 90%, 95%, 98% or 100% of the RPM ranges of the electrical machine.

Example 22A.1

The electrical machine of one or more of the above A examples, wherein the electrical machine has a power density of about 100, 500, 1000, 2000, 5000, 10000 or 20000 kw/meter cubed.

Example 22A.2

The electrical machine of one or more of the above examples, wherein the electrical machine has a power density of at least 100, 500, 1000, 2000, 5000, 10000, or 20000 kw/meter cubed.

Example 22A.3

The electrical machine of one or more of the above A examples, wherein the electrical machine has a power density of between 100 to 20,000, 100 to 200, 100 to 500, 250 to 500, 500 to 1000, 500 to 2000, 1000 to 10,000, 1000 to 5000, 2000 to 5000, 5000 to 10,000, 5000 to 15,000, 10,000 to 30,000 or 10,000 to 20,000 kw/meter cubed.

Example 23A.1

The electrical machine of one or more of the above A examples, wherein one or more of the at least one operating parameter of the electrical machine may be reconfigured in substantially real time.

Example 23A.2

The electrical machine of one or more of the above A examples, wherein one or more of the at least one operating parameter, the at least one performance parameter or combinations thereof of the electrical machine may be reconfigured in substantially real time.

Example 24A

The electrical machine of one or more of the above A examples, wherein the at least one control system provides individual control over at least 30%, 40%, 50%, 60%, 70% 80%, 90%, 95% or 100% of the plurality of coils.

Example 25A

The electrical machine of one or more of the above A examples, wherein the at least one operating parameter of the electrical machine may be reconfigured in substantially real time and the optimal settings for performance determined and implemented across 50%, 60%, 70%, 80%, 90%, 95%, 98% or 100% of one or more of the following: operating speeds and loads.

Example 26A.1

The electrical machine of one or more of the above A examples, wherein the timing of the plurality of coils may be reconfigured in substantially real time in order to continuously optimize the timing of the plurality of coils.

Example 26A.2

The electrical machine of one or more of the above A examples, wherein the timing of the at least one coil may be reconfigured in substantially real time in order to continuously optimize the timing of the at least one of coil.

Example 27A.1

The electrical machine of one or more of the above A examples, wherein the total number of permanent magnets may be reduced by a minimum of 10%, 15%, 20%, 25%, 30%, 35%, 40%, 45%, 50%, 55%, 60% or 70%, and still provide comparable power output to a brushless permanent magnet three phase electrical machine.

Example 27A.2

The electrical machine of one or more of the above A examples, wherein the total number of permanent magnets may be reduced by a minimum of between 10% to 70%, 10% to 25%, 20% to 50%, 15% to 35%, 20% to 55%, 25% to 50%, 30%0 to 60%, 35% to 50%, 40% to 60%, 45% to 70% or 50% to 70%, and still provide comparable power output to a brushless permanent magnet three phase electrical machine.

Example 28A.1

The electrical machine of one or more of the above A examples, wherein the plurality of coils has about 1000, 500, 100, 50, 40, 35, 30 25, 20, 15, 10 or 5, times less variation in torque through a rotation than a brushless permanent magnet three phase electrical machine with comparable power output.

Example 28A.2

The electrical machine of one or more of the above A examples, wherein the plurality of coils has between 1000 to 100, 1000 to 100, 500 to 100, 500 to 20, 100 to 5, 100, to 30, 50 to 10, 40 to 15, 35 to 10, 30 to 15, 25 to 10, 20 to 5, 15 to 5 or 10 to 5, times less variation in torque through a rotation than a brushless permanent magnet three phase electrical machine with comparable power output.

Example 29A.1

The electrical machine of one or more of the above A examples, wherein the material savings in the magnets would be at least 10%, 15%, 20%, 30%, 40%, 50% or 60% of a brushless permanent magnet permanent magnet three phase electrical machine with comparable power output.

Example 29A.2

The electrical machine of one or more of the above A examples, wherein the material savings in the magnets would be between 10% to 60%, 10% to 30%, 15% to 30%, 20% to 50%, 30% to 50%, 40% to 60% or 50% to 70% of brushless permanent magnet three phase electrical machine with comparable power output.

Example 30A.1

The electrical machine of one or more of the above A examples, wherein the material savings in the copper would be at least 10%, 15%, 20%, 30%, 40%, 100%, 200% or 1000% more than that of a similar brushless permanent magnet 3 phase electrical machine with similar resistive power loss per power output.

Example 30A.2

The electrical machine of one or more of the above A examples, wherein the material savings in the copper would be between 10% to 100%, 15% to 40%, 20% to 100%, 20% to 200%, 30% 1000%, 40% to 150%, 100% to 200%, 200% to 500%, 200% to 1000% or 500% to 1000% more than that of a similar brushless permanent magnet 3 phase electrical machine with similar resistive power loss per power output.

Example 31A

The electrical machine of one or more of the above A examples, wherein the stator can be manufactured out of aluminium, steel, copper, polyethylene, acrylic, polymer reinforced carbon fibre, polymer reinforced fiberglass, graphene, other metallic, plastic and/or composite materials or combinations thereof, and the stator has suitable rigidity.

Example 32A

The electrical machine of one or more of the above A examples, wherein the rotor can be manufactured out of aluminium, steel, copper, polyethylene, acrylic, polymer reinforced carbon fibre, polymer reinforced fiberglass, graphene, other metallic, plastic and/or composite materials or combinations thereof and the rotor has suitable rigidity.

Example 33A

The electrical machine of one or more of the above A examples, wherein the enclosure can be manufactured out of aluminium, steel, copper, polyethylene, acrylic, polymer reinforced carbon fibre, polymer reinforced fiberglass, graphene, other metallic, plastic and/or composite materials or combinations thereof and the enclosure has suitable rigidity.

Example 34A

The electrical machine of one or more of the above A examples, wherein the magnetic field in the rotor or slider can be produced through the use of rare earth or other conventional forms of permanent magnets.

Example 35A

The electrical machine of one or more of the above A examples, wherein the plurality magnetic field generators are one or more of the following: loops or coils of a metallic material that induce a current in the loops to produce a magnetic field.

Example 36A

The electrical machine of one or more of the above A examples, wherein the plurality magnetic field generators are strips of ferromagnetic material that redirect magnetic fields.

Example 37A.1

The electrical machine of one or more of the above A examples, wherein to save space, cost or both, the at least one switches for the at least one module is fabricated on the same circuit board.

Example 37A.2

The electrical machine of one or more of the above examples, wherein, the at least one switch for the at least one module is fabricated on the same circuit board.

Example 38A.1

The electrical machine of one or more of the above A examples, wherein to save space, cost or both, at least one electromagnetic coil of the at least one module is fabricated as a single unit.

Example 38A.2

The electrical machine of one or more of the above A examples, wherein the at least one electromagnetic coil of the at least one module is fabricated as a single unit.

Example 39A

The electrical machine of one or more of the above A examples, wherein the at least one module has an enclosure that may be attached to one or more other modules in order to construct the at least one stator without having to have a separate stator structure.

Example 40A

The electrical machine of one or more of the above A examples, wherein one or more of the plurality of magnets have an enclosure around them such that one or more of the magnets may be attached to one or more other magnets to create at least one rotor that may be connected to at least one shaft.

Example 41A

The electrical machine of one or more of the above A examples, wherein the physical location of the at least one module in reference to the other modules and the at least one stator is hard coded into the control software.

Example 42A

The electrical machine of one or more of the above A examples, wherein the physical location of the at least one module in reference to one or more of the other modules and the at least one stator is encoded by one or more sequences of electrical connections that may be constructed using switches, solder bridges, jumpers, connectors, cutting printed circuit tracks, other suitable ways of making and breaking electrical connections, or combinations thereof.

Example 43A

The electrical machine of one or more of the above A examples, wherein the physical location of the at least one module in reference to one or more of the other modules and the at least one stator is detected by the location that the at least one module is inserted into in the at least one stator by a series of electrical contacts, optical reflections, magnetic forces or combinations thereof encoding the position of the module.

Example 44A

The electrical machine of one or more of the above A examples, that are one or more combinations of examples 41A, 42A and 43A.

Example 45A

The electrical machine of one or more of the above A examples, wherein the at least one electromagnetic coil is arranged around the periphery of the at least one stator.

Example 46A

The electrical machine of one or more of the above A examples, further comprising at least one shaft.

Example 47A

The electrical machine of one or more of the above A examples, wherein the plurality of magnets are arranged around the periphery of the at least one rotor and have substantially the same centre diameter as that of one or more of the at least one electromagnetic coil, a plurality of the at least one electromagnetic coils, or a substantial portion of the plurality of the at least one electromagnetic coils.

Example 49A

The electrical machine of one or more of the above A examples, wherein the plurality of magnets are arranged around the periphery of the at least one rotor and have substantially the same centre diameter as that of one or more of the at least one electromagnetic coil, a plurality of the at least one electromagnetic coils, or a substantial portion of the plurality of the at least one electromagnetic coils and two or more of the magnets have alternating pole orientation.

Example 50A

The electrical machine of one or more of the above A examples, wherein two or more of the magnets of the plurality of magnets have alternating pole orientation.

Example 51A

The electrical machine of one or more of the above A examples, wherein there is a gap between the at least one stator and the at least one rotor.

Example 52A.1

The electrical machine of one or more of the above A examples, wherein the relative weight of the at least one electromagnetic coil is approximately equal to an inverse of the total number of coils as compared to a single phase electrical machine with a substantially similar resistive loss.

Example 52A.2

The electrical machine of one or more of the above A examples, wherein the electrical machine has (n) coils and a weight of approximately $1/(n-1)$ to $1/(n+1)$ relative to a single phase motor with substantially the similar resistive loss.

Example 53A.1

The electrical machine of one or more of the above A examples, wherein one or more module coil activation sequences are computed during operation of the electrical machine and the order of the at least one module activating being sequentially based on its geometric position in a module array.

Example 53A.2

The electrical machine of one or more of the above A examples, wherein the module coil activation sequence is computed during machine operation the order of modules activating being sequentially based on their geometric position in the module array.

Example 54A.1

The electrical machine of one or more of the above A examples, wherein the one or more module coil activation sequence is computed during electrical machine operation, the order of at least one module activating being based at least in part on sensor feedback.

Example 54A.2

The electrical machine of one or more of the above A examples, wherein the module coil activation sequence is computed during machine operation, the order of modules activating being based upon sensor feedback.

Example 55A.1

The electrical machine of one or more of the above A examples, wherein the module coil activation sequence is computed during machine operation, the order of modules activating being determined by a sequence pattern.

Example 55A.2

The electrical machine of one or more of the above A examples, wherein the module coil activation sequence is computed during machine operation and the order of the at least one modules activating being determined by at least in part one or more sequence patterns.

Example 56A.1

The electrical machine of one or more of the above A examples, wherein the module coil activation sequence is computed during machine operation and the order of modules activating being determined based at least in part on one or more optimal power usage scenarios.

Example 57A.2

The electrical machine of one or more of the above A examples, wherein the module coil activation sequence is predetermined and stored, and the sequence is sourced at least in part from sensor feedback.

Example 58A.1

The electrical machine of one or more of the above A examples, wherein the module coil activation sequence is predetermined and stored, the nature of the sequence being sourced from precomputed data stored within the module.

Example 58A.2

The electrical machine of one or more of the above A examples, wherein the module coil activation sequence is predetermined and stored, and the nature of the sequence being sourced at least in part from precomputed data stored within the module.

Example 59A.1

The electrical machine of one or more of the above A examples, wherein the module coil activation sequence is predetermined and stored, the nature of the sequence being sourced from external modules over a communications bus.

Example 59A.2

The electrical machine of one or more of the above A examples, wherein the module coil activation sequence is predetermined and stored, and the nature of the sequence being sourced from one or more external modules over one or more communications busses.

Example 60A

The electrical machine of one or more of the above examples, wherein the module coil activation sequence is determined based on one or more of the above A examples, sourced based on one or more of the above examples or both.

Example 61A.1

The electrical machine of one or more of the above A examples the total number of powered coils in the active sequence can vary during operation from the total number of coils, to none.

Example 61A.2

The electrical machine of one or more of the above A examples, wherein the total number of the at least one electromagnetic coils powered in the active sequence may vary during operation from the total number of coils, to none.

Example 62A

The electrical machine of one or more of the above A examples, wherein the number of the at least one electromagnetic coils active may or may not be based upon sensor feedback.

Example 63A

The electrical machine of one or more of the above A examples, wherein the control of the electrical machine is centralised on at least one control module.

Example 64A

The electrical machine of one or more of the above A examples, wherein the control of the electrical machine is distributed to one or more of the modules, with one or more modules acting independently.

Example 65A

The electrical machine of one or more of the above A examples, wherein the control of the electrical machine is arbitrated between two or more designated modules.

Example 66A

The electrical machine of one or more of the above A examples, wherein one or more modules may be individually removed, added, or replaced during operation of the machine, without substantially affecting the operational state of the machine.

Example 67A

The electrical machine of example 66A, wherein 1, 2, 3, 4, 5, 6, 7, 8, 9 or 10 modules may be individually removed, added, or replaced during operation of the machine, without substantially affecting the operational state of the machine.

Example 68A

The electrical machine of example 66A, wherein 1, 2, 3, 4, 5, 6, 7, 8, 9 or 10 modules may be individually removed, added, or replaced during operation of the machine, without substantially affecting the operational state of the machine.

Example 69A

The electrical machine of one or more of the above A examples, wherein one or more of the at least one modules may be individually removed, added, or replaced while the machine is powered off.

Example 70A

The electrical machine of one or more of the above A examples, wherein one or more of the at least one operational parameter used by individual modules are tuned dynamically during operation of the electrical machine, based at least in part on sensor feedback.

Example 71A

The electrical machine of one or more of the above A examples, wherein one or more of the at least one operational parameter used by individual modules are tuned dynamically during operation of the electrical machine, and the tuning methods used may or may not involve the use of machine learning algorithms.

Example 72A

The electrical machine of one or more of the above A examples, wherein the machines control system permits the motor to operate in both the clockwise and countclockwise direction with respect to the rotational axis of the primary output or input.

Example 73A

The electrical machine of one or more of the above A examples, wherein one or more of the at least one modules further comprises one or more safety systems implemented in hardware, software, or both to allow automatic power cut-off with respect to the coil, in the event of a feedback based event.

Example 74A

The electrical machine of one or more of the above A examples, wherein one or more of the at least one modules further comprises one or more external power safety cut-off control inputs on one or more of the modules. The inputs taking the form of tactile switches or digital touch panels or communications buses, the cut offs being designed such that they bypass the primary controller in each module.

Example 75A

The electrical machine of one or more of the above A examples, wherein one or more of the at least one modules further comprises one or more external power safety cut-off control inputs on one or more of the modules and the inputs may be one or more of the following: tactile switches, digital touch panels, communications buses, or combinations thereof, wherein the cut offs are designed such that they bypass the primary controller in one or more of the at least one module.

Example 76A

The electrical machine of one or more of the above A examples, wherein the at least one module further comprises at least one sensor for detecting the back EMF from the modules coil in order to reduce cogging effects to improve efficiency, and the back-EMF of an unpowered coil is recorded at a representative range of speeds using the analogue-to-digital converter in at least one coil control unit during operation; the un-powered coil is then powered to a voltage that substantially negates the back-EMF thereby neutralizing the magnetic interaction between the un-powered coil and the magnets; and optional this procedure may be repeat for one or more coils in the array in order to reduce cogging effects.

Example 77A

Any of the above A examples implemented in hardware, software, or combinations thereof.

Example 78A

The electrical machine of one or more of the above A examples, wherein the at least one module further comprises one or more sensors for detecting the voltage across the at least one module's coil.

Example 79A

The electrical machine of one or more of the above A examples, wherein the at least one module further comprises one or more sensors for detecting the current flowing across the at least one module's coil.

Example 80A

The electrical machine of one or more of the above A examples, wherein the at least one module further comprises one or more sensors for detecting the back EMF from the at least one module's coil.

Example 81A

The electrical machine of one or more of the above A examples, wherein the at least one module further comprises one or more sensors for detecting the absolute or relative position of the machine's the at least one rotor in relation to the at least one module's position.

Example 82A

The electrical machine of one or more of the above A examples, wherein the at least one module further comprises one or more sensors for detecting the velocity of the machines the at least one rotor in relation to the at least one module's position.

Example 83A

The electrical machine of one or more of the above A examples, wherein the at least one module further comprises one or more sensors for detecting the thermal temperature around the at least one module or other surfaces within the electrical machine.

Example 84A

The electrical machine of one or more of the above A examples, wherein the at least one module further comprises one or more sensors for detecting one or more of the following: the magnitude, the angle and the direction of at least one magnetic field.

Example 85A

The electrical machine of one or more of the above A examples, wherein the at least one module further comprises one or more sensors for detecting accelerations, for the purpose of vibration detection.

Example 86A

A method of use that uses the electrical machine of one or more of the above A examples or combinations of the features disclosed herein.

Example 87A

A system that uses the electrical machine of one or more of the above A examples or combinations of the features disclosed herein.

Example 88A

A module that incorporates the features of one or more of the above A examples or combinations of the module features disclosed herein.

Example 89A

A control systems for an electrical machine that incorporates the features of one or more of the above A examples or combinations of the control features disclosed herein.

Example 90A

A control systems for a module that incorporates the features of one or more of the above A examples or combinations of the control features disclosed herein.

Example 91A

The electrical machine of one or more of the above A examples, wherein at least one adaptive control is implemented by performing optimisation during machine operation through the use of one or more of the following: at least one support vector machine, neural network algorithm, a fuzzy logic algorithm, of machine learning algorithms and through the use of other suitable adaptive control techniques.

Example 92A

The electrical machine of one or more of the above A examples, wherein the at least one stator is a substantial portion of the stators contained in the electrical machine.

Example 93A

The electrical machine of one or more of the above A examples, wherein the at least one stator is all of the stators contained in the electrical machine.

Example 94A

The electrical machine of one or more of the above A examples, wherein the at least one module is a substantial portion of the modules contained in the electrical machine.

Example 95A

The electrical machine of one or more of the above A examples, wherein the at least one module is all of the modules contained in the electrical machine.

Example 96A

The electrical machine of one or more of the above A examples, wherein the at least one electromagnetic coil is a substantial portion of the electromagnetic coils contained in the electrical machine.

Example 97A

The electrical machine of one or more of the above A examples, wherein the at least one electromagnetic coil is all of the electromagnetic coil contained in the electrical machine.

Example 98A

The electrical machine of one or more of the above A examples, wherein the at least one switch is a substantial portion of the switches contained in the electrical machine.

Example 99A

The electrical machine of one or more of the above A examples, wherein the at least one switch is all of the switches contained in the electrical machine.

Example 100A

The electrical machine of one or more of the above A examples, wherein the at least one rotor is a substantial portion of the rotors contained in the electrical machine.

Example 101A

The electrical machine of one or more of the above A examples, wherein the at least one rotor is all of the rotors contained in the electrical machine.

Example 102A

The electrical machine of one or more of the above A examples, wherein the plurality of magnets is a substantial portion of the magnets contained in the electrical machine.

Example 103A

The electrical machine of one or more of the above A examples, wherein the plurality of magnets is all of the magnets contained in the electrical machine.

Example 104A

The electrical machine of one or more of the above A examples, wherein the plurality of magnetic induction loops is a substantial portion of the magnetic induction loops contained in the electrical machine.

Example 105A

The electrical machine of one or more of the above A examples, wherein the plurality of magnetic induction loops is all of the magnetic induction loops contained in the electrical machine.

Example 106A

The electrical machine of one or more of the above A examples, wherein the plurality of magnetic reluctance projections is a substantial portion of the magnetic reluctance projections contained in the electrical machine.

Example 107A

The electrical machine of one or more of the above A examples, wherein the plurality of magnetic induction loops is all of the magnetic induction loops contained in the electrical machine.

Example 109A

The electrical machine of one or more of the above A examples, wherein the plurality of stators is a substantial portion of the stators contained in the electrical machine.

Example 110A

The electrical machine of one or more of the above A examples, wherein the plurality of stators is all of the stators contained in the electrical machine.

Example 111A

The electrical machine of one or more of the above A examples, wherein the plurality of modules is a substantial portion of the modules contained in the electrical machine.

Example 112A

The electrical machine of one or more of the above A examples, wherein the plurality of modules is all of the modules contained in the electrical machine.

Example 113A

The electrical machine of one or more of the above A examples, wherein the plurality of rotors is a substantial portion of the rotors contained in the electrical machine.

Example 114A

The electrical machine of one or more of the above A examples, wherein the plurality of rotors is all of the rotors contained in the electrical machine.

Example 1B

An electrical machine comprising: at least one stator, at least one module, the at least one module comprising at least one electromagnetic coil and at least one switch, the at least one module being attached to the at least one stator; at least one rotor with a plurality of magnets attached to the at least one rotor, wherein the at least one module is in spaced relation to the plurality of the magnets; an integrated differential coupled to at least one of the at least one rotors, the at least one integrated differential permitting the at least one rotor to output at least two rotational outputs to corresponding shafts, wherein the at least two rotational outputs are able to move the shafts at different rotational velocities relative to one another, and the at least one rotor being in a rotational relationship with the at least one stator, wherein the quantity and configuration of the at least one module in the electrical machine is determined based in part on one or more operating parameters; wherein the at least one module is capable of being independently controlled; wherein the at least one module is capable of being reconfigured based at least in part on one or more of the following: at least one operating parameter during operation, at least one performance parameter during operation, and combinations thereof; and wherein the electrical machine is configured to fit into a housing and that can be retrofitted into a conventional vehicle by replacing the differential.

Example 2B

An electrical machine comprising: at least one stator; at least one module, the at least one module comprising at least one electromagnetic coil and at least one switch, the at least one module being attached to the at least one stator; at least one rotor with a plurality of magnets attached to the at least one rotor, wherein the at least one module is in spaced relation to the plurality of the magnets; an integrated differential coupled to at least one of the at least one rotors, the at least one integrated differential permitting the at least one rotor to output at least two rotational outputs to corresponding shafts, wherein the at least two rotational outputs are able to move the shafts at different rotational velocities relative to one another, and the at least one rotor being in a rotational relationship with the at least one stator; wherein the quantity and configuration of the at least one module in the electrical machine is determined based in part on one or more operating parameters; wherein the at least one module is capable of being independently controlled; wherein the at least one module is capable of being reconfigured based at least in part on one or more of the following: at least one operating parameter during operation, at least one performance parameter during operation, and combinations thereof, and wherein the electrical machine is configured to fit into a housing and that can be located in substantially that same position where a differential would otherwise be located in a vehicle or other machine.

Example 3B

An electrical machine comprising: a plurality of stators; a plurality of modules comprising at least one electromagnetic coil and at least one switch and being attached to at least one of the plurality of stators; a plurality of rotors with a plurality of magnets attached to at least one of the plurality of rotors, the plurality of rotors are able to move independently to one another to produce a differential output that permits the electric machine to output at least two rotational outputs to corresponding shafts, wherein the at least two rotational outputs are able to move the shafts at different rotational velocity's relative to one another, and the plurality of modules are in spaced relation to the plurality of the magnets; and the plurality of rotors being in a rotational relationship with the plurality of stators; wherein the quantity and configuration of the plurality of modules in the electrical machine is determined based in part on one or more operating parameters; wherein the plurality of modules are capable of being independently controlled, and wherein the plurality of modules are capable of being reconfigured based at least in part on one or more of the following: at least one operating parameter during operation, and at least one performance parameter during operation; and wherein the electrical machine is configured to fit into a housing and that can be located in substantially that same position where a differential would otherwise be located in a vehicle or other machine.

Example 4B

An electrical machine comprising: a plurality of stators; a plurality of modules comprising at least one electromagnetic coil and at least one switch and being attached to at least one of the plurality of stators; a plurality of rotors with a plurality of magnets attached to at least one of the plurality of rotors, the plurality of rotors are able to move independently to one another to produce a differential output that permits the electric machine to output at least two rotational outputs to corresponding shafts, wherein the at least two rotational outputs are able to move the shafts at different rotational velocity's relative to one another, and the plurality of modules are in spaced relation to the plurality of the magnets; and the plurality of rotors being in a rotational relationship with the plurality of stators; wherein the quantity and configuration of the plurality of modules in the electrical machine is determined based in part on one or more operating parameters; wherein the plurality of modules are capable of being independently controlled, and wherein the plurality of modules are capable of being reconfigured based at least in part on one or more of the following: at least one operating parameter during operation, and at least one performance parameter during operation; and wherein the electrical machine is configured to fit into a housing and that can be retrofitted into a conventional vehicle by replacing the differential.

Example 5B

An electrical machine comprising: a plurality of stators; a plurality of modules comprising at least one electromagnetic coil and at least one switch and being attached to at least one of the plurality of stators; a plurality of rotors with a plurality of magnets attached to at least one of the plurality of rotors, the plurality of rotors are able to move independently to one another to produce a differential output that permits the electric machine to output at least two rotational outputs to corresponding shafts, wherein the at least two rotational outputs are able to move the shafts at different rotational velocity's relative to one another, and the plurality of modules are in spaced relation to the plurality of the magnets; and the plurality of rotors being in a rotational relationship with the plurality of stators; wherein the quantity and configuration of the plurality of modules in the electrical machine is determined based in part on one or more operating parameters; wherein the plurality of modules are capable of being independently controlled, and wherein the plurality of modules are capable of being reconfigured based at least in part on one or more of the following: at least one operating parameter during operation, and at least one performance parameter during operation; and wherein the electrical machine is configured to fit into a housing and that can be located in substantially that same position where a differential would otherwise be located in a vehicle or other machine.

Example 6B

An electrical machine comprising: at least one stator; at least one module, the at least one module comprising at least one electromagnetic coil and at least one switch, the at least one module being attached to the at least one stator; at least one platter or rotor with a plurality of magnets attached to the at least one platter or rotor, wherein the at least one module is in spaced relation to the plurality of the magnets; an integrated differential coupled to at least one of the at least one platters or rotors, the at least one integrated differential permitting the at least one platter or rotor to output at least two rotational outputs to corresponding shafts, wherein the at least two rotational outputs are able to move the shafts at different rotational velocities relative to one another, and the at least one platter or rotor being movement relationship with the at least one stator, wherein the quantity and configuration of the at least one module in the electrical machine is determined based in part on one or more operating parameters; wherein the at least one module is capable of being independently controlled; and wherein the at least one module is capable of being reconfigured based at least in part on one or more of the following: at least one operating parameter during operation, at least one performance parameter during operation, or combinations thereof.

Example 7B

The electrical machine of one or more of the above B examples, wherein the at least one operating parameter during operation may be selected from one or more of the following: maximum angular velocity, average angular velocity, minimum angular velocity, maximum power output, average power output, minimum power output, maximum input voltage, average input voltage, minimum input voltage, maximum generation voltage, average generation voltage, minimum generation voltage, shape and frequency of generated voltage, peak input current, average input current, minimum input current, maximum generation current, average generation current, minimum generation current, maximum torque, average torque, minimum torque, torque smoothness, activation sequence, rate of acceleration, order of accuracy of hold angle, minimising the variation of angular velocity, rate of deceleration during breaking, diameter of the shaft, maximum radius of the electrical machine, maximum length of the electrical machine, maximum depth of the electrical machine, maximum height of the machine, maximum slide distance, minimum slide distance, maximum weight of the machine, minimum weight of the machine, maximum resistive power loss and unit redundancy and overall price.

Example 8B

The electrical machine of one or more of the above B examples, wherein the at least one performance parameter during operation may be selected from one or more of the following: maximum angular velocity, maximum power output, deviation from output voltage during generation, maintaining a required generation voltage, torque smoothness, rate of acceleration, accuracy of hold angle, minimising the variation of angular velocity, matching requested rate of deceleration during breaking, minimising resistive power loss, overall efficiency, power factor correction, mechanical harmonic cancelation, electrical harmonic cancelation, accuracy of reproduced output voltage wave and accuracy of generated frequency.

Example 9B

The electrical machine of one or more of the above B examples, wherein the power to weight ratio of the electrical machine is at between 10 to 1, 15 to 3, 10 to 0.5, 9 to 4, 5 to 0.01, 3.4 to 6 or 8.4 to 3.4 kilowatts per kilogram.

Example 10B

The electrical machine of one or more of the above B examples, further comprising at least one sensor to detect absolute or relative position of the at least one rotor; and at least one control system which, in response to inputs from the one or more of the following: the at least one sensor, at least one power command, at least one mode command comprising one or more of the following at least one drive, generate, braking and hold command and at least one rotational direction command.

Example 11B

The electrical machine of example 10B, wherein the at least one control system is configured to be in a drive configuration or has the at least one drive mode command, the at least one control system activates at least one switch which energies one or more of the magnetic coils to attract and repel the magnets for the purpose of generating motion.

Example 12B

The electrical machine of example 10B, wherein the electrical machine is configured to be in a generation configuration or has at least one mode command to generate power, the at least one control system activates at least one switch which connects one or more coils to the external power rails.

Example 13B

The electrical machine of example 10B, wherein the electrical machine is configured to be in a braking configuration or has the at least one mode command to brake, the at least one control system activates at least one switch which connects one or more of the magnetic coils terminals together to oppose motion.

Example 14B

The electrical machine of example 10B, wherein the electrical machine is configured to be in a holding configuration or has the at least one mode command to hold, the at least one control system activates at least one switch energises one or more of the magnetic coils to attract and repel magnets for the purpose of stopping motion.

Example 15B

The electrical machine of one or more of the above B examples, wherein the at least one control system in operation is determining one or more appropriately efficient modes of operation in relation to the at least one operating parameters, the at least one performance parameter or combinations thereof on a substantially continuous basis during operating periods.

Example 16B

The electrical machine of one or more of the above B examples, wherein the electrical machine has a power density of between 100 to 20,000, 100 to 200, 100 to 500, 250 to 500, 500 to 1000, 500 to 2000, 1000 to 10,000, 1000 to 5000, 2000 to 5000, 5000 to 10,000, 5000 to 15,000, 10,000 to 20,000 or 10,000 to 30,000 kw/meter cubed.

Example 17B

The electrical machine of one or more of the above B examples, wherein one or more of the at least one operating parameter, the at least one performance parameter or combinations thereof of the electrical machine may be reconfigured in substantially real time.

Example 18B

The electrical machine of one or more of the above B examples, wherein the at least one control system provides individual control over at least 30%, 40%, 50%, 60%, 70% 80%, 90%, 95% or 100% of the plurality of coils.

Example 19B

The electrical machine of one or more of the above B examples, wherein the module coil activation sequence is computed during machine operation the order of modules activating being sequentially based on their geometric position in the module array.

Example 20B

The electrical machine of one or more of the above B examples, wherein the module coil activation sequence is computed during machine operation, the order of modules activating being based upon sensor feedback.

Example 21B

The electrical machine of one or more of the above B examples, wherein the module coil activation sequence is computed during machine operation and the order of the at least one modules activating being determined by at least in part one or more sequence patterns.

Example 22B

The electrical machine of one or more of the above examples, wherein the total number of the at least one electromagnetic coils powered in the active sequence may vary during operation from the total number of coils, to none.

Example 23B

The electrical machine of one or more of the above B examples, wherein the control of the electrical machine is centralised on at least one control module.

Example 24B

The electrical machine of one or more of the above examples, wherein one or more modules may be individually removed, added, or replaced during operation of the machine, without substantially affecting the operational state of the machine.

Example 25B

The electrical machine of one or more of the above B examples, wherein the at least one module is capable of being reconfigured based at least in part on one or more of the following: at least one operating parameter during operation, wherein the at least one operating parameter during operation may be selected from one or more of the parameters listed in example 7B; at least one performance parameter during operation, wherein the at least one performance parameter during operation may be selected from one or more of the parameter listed in example 8B; or combinations thereof.

Example 26B

The electrical machine of one or more of the above B examples, wherein the electrical machine is a compact direct drive electric motor that generates sufficient or improved propulsion in a wheeled vehicle and the electric motor and the differential can fit the size of envelope of existing differentials in a conventional combustion engine driven vehicle.

Example 27B

The electrical machine of one or more of the above B examples, wherein the electrical machine is a compact direct drive electric motor that generate sufficient or improved propulsion of a wheeled vehicle and the electric motor and the differential can be installed in line with a drive axial while providing adequate clearance from a road without substantial modification to an existing suspension of the wheeled vehicle.

Example 28B

The electrical machine of one or more of the above B examples, wherein the electrical machine is a compact direct drive electric motor that generate sufficient propulsion of a wheeled vehicle and the electric motor and the differential can be installed in line with one or more drive axels while providing adequate clearance from a road without substantial modification to an existing suspension of the wheeled vehicle.

Example 29B

The electrical machine of one or more of the above B examples, wherein the electrical machine is a compact direct drive electric motor that generate sufficient propulsion of a wheeled vehicle and the electric motor and the differential can be installed in line with one or more drive axels without lower, or substantially lowering, the clearance from a road and without substantial modification to an existing suspension of the wheeled vehicle.

Example 1C

An electrical machine comprising: at least one stator; at least one module, wherein a substantial portion of the modules comprise at least one electromagnetic coil and at least one switch, the at least one module being attached to the at least one stator; at least one rotor with a plurality of magnets attached to the at least one rotor, wherein the at least one module is in spaced relation to the plurality of the magnets; an integrated differential coupled to at least one of the at least one rotors, the at least one integrated differential permitting the at least one rotor to output at least two rotational outputs to corresponding shafts, wherein the at least two rotational outputs are able to move the shafts at different rotational velocities relative to one another, and the at least one rotor being in a rotational relationship with the at least one stator; wherein the quantity and configuration of the substantial portion of the modules in the electrical machine is determined based in part on one or more operating parameters; wherein the substantial portion of modules are capable of being independently controlled; wherein the substantial portion of modules are capable of being reconfigured based at least in part on one or more of the following; at least one operating parameter during operation, at least one performance parameter during operation, and combinations thereof; and wherein the electrical machine is configured to fit into a housing and that can be retrofitted into a conventional vehicle by replacing the differential.

Example 2C

An electrical machine comprising: at least one stator; at least one module, wherein a substantial portion of the modules comprise at least one electromagnetic coil and at least one switch, the at least one module being attached to the at least one stator; at least one rotor with a plurality of magnets attached to the at least one rotor, wherein the at least one module is in spaced relation to the plurality of the magnets; an integrated differential coupled to at least one of the at least one rotors, the at least one integrated differential permitting the at least one rotor to output at least two rotational outputs to corresponding shafts, wherein the at least two rotational outputs are able to move the shafts at different rotational velocities relative to one another, and the at least one rotor being in a rotational relationship with the at least one stator; wherein the quantity and configuration of the substantial portion of modules in the electrical machine are determined based in part on one or more operating parameters; wherein the substantial portion of the modules are capable of being independently controlled; wherein the substantial portion of modules are capable of being reconfigured based at least in part on one or more of the following: at least one operating parameter during operation, at least one performance parameter during operation, and combinations thereof; and wherein the electrical machine is configured to fit into a housing and that can be located in substantially that same position where a differential would otherwise be located in a vehicle or other machine.

Example 3C

An electrical machine comprising: a plurality of stators; a plurality of modules, wherein a substantial portion of the modules comprise at least one electromagnetic coil and at least one switch and being attached to at least one of the plurality of stators; a plurality of rotors with a plurality of magnets attached to at least one of the plurality of rotors, the plurality of rotors are able to move independently to one another to produce a differential output that permits the electric machine to output at least two rotational outputs to corresponding shafts, wherein the at least two rotational outputs are able to move the shafts at different rotational velocity's relative to one another, and the plurality of modules are in spaced relation to the plurality of the magnets; and the plurality of rotors being in a rotational relationship with the plurality of stators; wherein the quantity and configuration of the substantial portion of the modules in the electrical machine is determined based in part on one or more operating parameters; wherein the substantial portion of the modules are capable of being independently controlled, and wherein the substantial portion of the modules are capable of being reconfigured based at least in part on one or more of the following: at least one operating parameter during operation, and at least one performance parameter during operation; and wherein the electrical machine is configured to fit into a housing and that can be located in substantially that same position where a differential would otherwise be located in a vehicle or other machine.

Example 4C

An electrical machine comprising: a plurality of stators; a plurality of modules, wherein a substantial portion of the modules comprise at least one electromagnetic coil and at least one switch and being attached to at least one of the plurality of stators; a plurality of rotors with a plurality of magnets attached to at least one of the plurality of rotors, the plurality of rotors are able to move independently to one another to produce a differential output that permits the electric machine to output at least two rotational outputs to corresponding shafts, wherein the at least two rotational outputs are able to move the shafts at different rotational velocity's relative to one another, and the plurality of modules are in spaced relation to the plurality of the magnets; and the plurality of rotors being in a rotational relationship with the plurality of stators; wherein the quantity and configuration of the substantial portion of the modules in the electrical machine are determined based in part on one or more operating parameters; wherein the substantial portion of the modules are capable of being independently controlled, and wherein the substantial portion of the modules are capable of being reconfigured based at least in part on one or more of the following: at least one operating parameter during operation, and at least one performance parameter during operation; and wherein the electrical machine is configured to fit into a housing and that can be retrofitted into a conventional vehicle by replacing the differential.

Example 5C

An electrical machine comprising: a plurality of stators; a plurality of modules, wherein a substantial portion of the modules comprise at least one electromagnetic coil and at least one switch and being attached to at least one of the plurality of stators; a plurality of rotors with a plurality of magnets attached to at least one of the plurality of rotors, the plurality of rotors are able to move independently to one another to produce a differential output that permits the electric machine to output at least two rotational outputs to corresponding shafts, wherein the at least two rotational outputs are able to move the shafts at different rotational velocity's relative to one another, and the plurality of modules are in spaced relation to the plurality of the magnets; and the plurality of rotors being in a rotational relationship with the plurality of stators; wherein the quantity and configuration of the substantial portion of the modules in the electrical machine is determined based in part on one or more operating parameters; wherein the substantial portion of the modules are capable of being independently controlled, and wherein the substantial portion of the modules are capable of being reconfigured based at least in part on one or more of the following: at least one operating parameter during operation, and at least one performance parameter during operation; and wherein the electrical machine is configured to fit into a housing and that can be located in substantially that same position where a differential would otherwise be located in a vehicle or other machine.

Example 6C

An electrical machine comprising: at least one stator; at least one module, wherein a substantial portion of the modules comprise at least one electromagnetic coil and at least one switch, the at least one module being attached to the at least one stator; at least one platter or rotor with a plurality of magnets attached to the at least one platter or rotor, wherein the at least one module is in spaced relation to the plurality of the magnets; an integrated differential coupled to at least one of the at least one platters or rotors, the at least one integrated differential permitting the at least one platter or rotor to output at least two rotational outputs to corresponding shafts, wherein the at least two rotational outputs are able to move the shafts at different rotational velocities relative to one another, and the at least one platter or rotor being movement relationship with the at least one stator,
wherein the quantity and configuration of the substantial portion of the modules in the electrical machine are determined based in part on one or more operating parameters; wherein the substantial portion of the modules are capable of being independently controlled; and wherein the substantial portion of the modules are capable of being reconfigured based at least in part on one or more of the following: at least one operating parameter during operation, at least one performance parameter during operation, or combinations thereof.

Example 7C

The electrical machine of one or more of the above C examples, wherein the at least one operating parameter during operation may be selected from one or more of the following: maximum angular velocity, average angular velocity, minimum angular velocity, maximum power output, average power output, minimum power output, maximum input voltage, average input voltage, minimum input voltage, maximum generation voltage, average generation voltage, minimum generation voltage, shape and frequency of generated voltage, peak input current, average input current, minimum input current, maximum generation current, average generation current, minimum generation current, maximum torque, average torque, minimum torque, torque smoothness, activation sequence, rate of acceleration, order of accuracy of hold angle, minimising the variation of angular velocity, rate of deceleration during breaking, diameter of the shaft, maximum radius of the electrical machine, maximum length of the electrical machine, maximum depth of the electrical machine, maximum height of the machine, maximum slide distance, minimum slide distance, maximum weight of the machine, minimum weight of the machine, maximum resistive power loss, and unit redundancy and overall price.

Example 8C

The electrical machine of one or more of the above C examples, wherein the at least one performance parameter during operation may be selected from one or more of the following: maximum angular velocity, maximum power output, deviation from output voltage during generation, maintaining a required generation voltage, torque smoothness, rate of acceleration, accuracy of hold angle, minimising the variation of angular velocity, matching requested rate of deceleration during breaking, minimising resistive power loss, overall efficiency, power factor correction, mechanical harmonic cancelation, electrical harmonic cancelation, accuracy of reproduced output voltage wave, and accuracy of generated frequency.

Example 9C

The electrical machine of one or more of the above C examples, wherein the power to weight ratio of the electrical machine is at between 10 to 1, 15 to 3, 10 to 0.5, 9 to 4, 5 to 0.01, 3.4 to 6 or 8.4 to 3.4 kilowatts per kilogram.

Example 10C

The electrical machine of one or more of the above C examples, further comprising at least one sensor to detect absolute or relative position of the at least one rotor; and at least one control system which, in response to inputs from the one or more of the following: the at least one sensor, at least one power command, at least one mode command comprising one or more of the following: at least one drive, generate, braking and hold command and at least one rotational direction command.

Example 11C

The electrical machine of example 10C, wherein the at least one control system is configured to be in a drive configuration or has the at least one drive mode command, the at least one control system activates at least one switch which energies one or more of the magnetic coils to attract and repel the magnets for the purpose of generating motion.

Example 12C

The electrical machine of example 10C, wherein the electrical machine is configured to be in a generation configuration or has at least one mode command to generate power, the at least one control system activates at least one switch which connects one or more coils to the external power rails.

Example 13C

The electrical machine of example 10C, wherein the electrical machine is configured to be in a braking configuration or has the at least one mode command to brake, the at least one control system activates at least one switch which connects one or more of the magnetic coils terminals together to oppose motion.

Example 14C

The electrical machine of example 10C, wherein the electrical machine is configured to be in a holding configuration or has the at least one mode command to hold, the at least one control system activates at least one switch energises one or more of the magnetic coils to attract and repel magnets for the purpose of stopping motion.

Example 15C

The electrical machine of one or more of the above C examples, wherein the at least one control system in operation is determining one or more appropriately efficient modes of operation in relation to the at least one operating parameters, the at least one performance parameter or combinations thereof on a substantially continuous basis during operating periods.

Example 16C

The electrical machine of one or more of the above C examples, wherein the electrical machine has a power density of between 100 to 20,000, 100 to 200, 100 to 500, 250 to 500, 500 to 1000, 500 to 2000, 1000 to 10,000, 1000 to 5000, 2000 to 5000, 5000 to 10,000, 5000 to 15,000, 10,000 to 30,000 or 10,000 to 20,000 kw/meter cubed.

Example 17C

The electrical machine of one or more of the above C examples, wherein one or more of the at least one operating parameter, the at least one performance parameter or combinations thereof of the electrical machine may be reconfigured in substantially real time.

Example 18C

The electrical machine of one or more of the above C examples, wherein the at least one control system provides individual control over at least 30%, 40%, 50%, 60%, 70% 80%, 90%, 95% or 100% of the plurality of coils.

Example 19C

The electrical machine of one or more of the above C examples, wherein the module coil activation sequence is computed during machine operation the order of modules activating being sequentially based on their geometric position in the module array.

Example 20C

The electrical machine of one or more of the above C examples, wherein the module coil activation sequence is computed during machine operation, the order of modules activating being based upon sensor feedback.

Example 21C

The electrical machine of one or more of the above C examples, wherein the module coil activation sequence is computed during machine operation and the order of the at least one modules activating being determined by at least in part one or more sequence patterns.

Example 22C

The electrical machine of one or more of the above C examples, wherein the total number of the at least one electromagnetic coils powered in the active sequence may vary during operation from the total number of coils, to none.

Example 23C

The electrical machine of one or more of the above C examples, wherein the control of the electrical machine is centralised on at least one control module.

Example 24C

The electrical machine of one or more of the above C examples, wherein one or more modules may be individually removed, added, or replaced during operation of the machine, without substantially affecting the operational state of the machine.

Example 25C

The electrical machine of one or more of the above C examples, wherein the substantial portion of the modules are capable of being reconfigured based at least in part on one or more of the following: at least one operating parameter during operation, wherein the at least one operating parameter during operation may be selected from one or more of the parameters listed in example 2C; at least one performance parameter during operation, wherein the at least one performance parameter during operation may be selected from one or more of the parameter listed in example 3C; or combinations thereof.

Example 26C

The electrical machine of one or more of the above C examples, wherein the electrical machine is a compact direct drive electric motor that generates sufficient or improved propulsion in a wheeled vehicle and the electric motor and the differential can fit the size of envelope of existing differentials in a conventional combustion engine driven vehicle.

Example 27C

The electrical machine of one or more of the above C examples, wherein the electrical machine is a compact direct drive electric motor that generate sufficient or improved propulsion of a wheeled vehicle and the electric motor and the differential can be installed in line with a drive axial while providing adequate clearance from a road without substantial modification to an existing suspension of the wheeled vehicle.

Example 28C

The electrical machine of one or more of the above C examples, wherein the electrical machine is a compact direct drive electric motor that generate sufficient propulsion of a wheeled vehicle and the electric motor and the differential can be installed in line with one or more drive axels while providing adequate clearance from a road without substantial modification to an existing suspension of the wheeled vehicle.

Example 29C

The electrical machine of one or more of the above C examples, wherein the electrical machine is a compact direct drive electric motor that generate sufficient propulsion of a wheeled vehicle and the electric motor and the differential can be installed in line with one or more drive axels without lower, or substantially lowering, the clearance from a road and without substantial modification to an existing suspension of the wheeled vehicle.

Example 1D

An electrical machine comprising: at least one stator, at least one module, each module comprising at least one electromagnetic coil and at least one switch, the at least one module being attached to the at least one stator, at least one rotor with a plurality of magnets attached to the at least one rotor, wherein the at least one module is in spaced relation to the plurality of the magnets; an integrated differential coupled to at least one of the at least one rotors, the at least one integrated differential permitting the at least one rotor to output at least two rotational outputs to corresponding shafts, wherein the at least two rotational outputs are able to move the shafts at different rotational velocities relative to one another, and the at least one rotor being in a rotational relationship with the at least one stator, wherein the quantity and configuration of each module in the electrical machine is determined based in part on one or more operating parameters; wherein each module is capable of being independently controlled;

wherein each module is capable of being reconfigured based at least in part on one or more of the following; at least one operating parameter during operation, at least one performance parameter during operation, and combinations thereof; and wherein the electrical machine is configured to fit into a housing and that can be retrofitted into a conventional vehicle by replacing the differential.

Example 2D

An electrical machine comprising: at least one stator, at least one module, each module comprising at least one electromagnetic coil and at least one switch, the at least one module being attached to the at least one stator, at least one rotor with a plurality of magnets attached to the at least one rotor, wherein the at least one module is in spaced relation to the plurality of the magnets; an integrated differential coupled to at least one of the at least one rotors, the at least one integrated differential permitting the at least one rotor to output at least two rotational outputs to corresponding shafts, wherein the at least two rotational outputs are able to move the shafts at different rotational velocities relative to one another, and the at least one rotor being in a rotational relationship with the at least one stator, wherein the quantity and configuration of each one module in the electrical machine is determined based in part on one or more operating parameters; wherein each module is capable of being independently controlled; wherein each module is capable of being reconfigured based at least in part on one or more of the following: at least one operating parameter during operation, at least one performance parameter during operation, and combinations thereof; and wherein the electrical machine is configured to fit into a housing and that can be located in substantially that same position where a differential would otherwise be located in a vehicle or other machine.

Example 3D

An electrical machine comprising: a plurality of stators; a plurality of modules, each module comprising at least one electromagnetic coil and at least one switch and being attached to at least one of the plurality of stators; a plurality of rotors with a plurality of magnets attached to at least one of the plurality of rotors, the plurality of rotors are able to move independently to one another to produce a differential output that permits the electric machine to output at least two rotational outputs to corresponding shafts, wherein the at least two rotational outputs are able to move the shafts at different rotational velocity's relative to one another, and the plurality of modules are in spaced relation to the plurality of the magnets; and the plurality of rotors being in a rotational relationship with the plurality of stators; wherein the quantity and configuration of each module in the electrical machine is determined based in part on one or more operating parameters; wherein each module is capable of being independently controlled, and wherein each module is capable of being reconfigured based at least in part on one or more of the following: at least one operating parameter during operation, and at least one performance parameter during operation; and wherein the electrical machine is configured to fit into a housing and that can be located in substantially that same position where a differential would otherwise be located in a vehicle or other machine.

Example 4D

An electrical machine comprising: a plurality of stators; a plurality of modules, each module comprising at least one electromagnetic coil and at least one switch and being attached to at least one of the plurality of stators; a plurality of rotors with a plurality of magnets attached to at least one of the plurality of rotors, the plurality of rotors are able to move independently to one another to produce a differential output that permits the electric machine to output at least two rotational outputs to corresponding shafts, wherein the at least two rotational outputs are able to move the shafts at different rotational velocity's relative to one another, and the plurality of modules are in spaced relation to the plurality of the magnets; and the plurality of rotors being in a rotational relationship with the plurality of stators; wherein the quantity and configuration of each module in the electrical machine is determined based in part on one or more operating parameters; wherein each module is capable of being independently controlled, and wherein each module is capable of being reconfigured based at least in part on one or more of the following: at least one operating parameter during operation, and at least one performance parameter during operation; and wherein the electrical machine is configured to fit into a housing and that can be retrofitted into a conventional vehicle by replacing the differential.

Example 5D

An electrical machine comprising: a plurality of stators; a plurality of modules, each module comprising at least one electromagnetic coil and at least one switch and being attached to at least one of the plurality of stators; a plurality of rotors with a plurality of magnets attached to at least one of the plurality of rotors, the plurality of rotors are able to move independently to one another to produce a differential output that permits the electric machine to output at least two rotational outputs to corresponding shafts, wherein the at least two rotational outputs are able to move the shafts at different rotational velocity's relative to one another, and the plurality of modules are in spaced relation to the plurality of the magnets; and the plurality of rotors being in a rotational relationship with the plurality of stators; wherein the quantity and configuration of each module in the electrical machine is determined based in part on one or more operating parameters; wherein each module is capable of being independently controlled, and wherein each module is capable of being reconfigured based at least in part on one or more of the following: at least one operating parameter during operation, and at least one performance parameter during operation; and wherein the electrical machine is configured to fit into a housing and that can be located in substantially that same position where a differential would otherwise be located in a vehicle or other machine.

Example 6D

An electrical machine comprising: at least one stator, at least one module, each module comprising at least one electromagnetic coil and at least one switch, the at least one module being attached to the at least one stator, at least one platter or rotor with a plurality of magnets attached to the at least one platter or rotor, wherein the at least one module is in spaced relation to the plurality of the magnets; an integrated differential coupled to at least one of the at least one platters or rotors, the at least one integrated differential permitting the at least one platter or rotor to output at least two rotational outputs to corresponding shafts, wherein the at least two rotational outputs are able to move the shafts at different rotational velocities relative to one another, and the at least one platter or rotor being movement relationship with the at least one stator, wherein the quantity and configuration of each module in the electrical machine is determined based in part on one or more operating parameters; wherein each module is capable of being independently controlled; and wherein each module is capable of being reconfigured based at least in part on one or more of the following: at least one operating parameter during operation, at least one performance parameter during operation, or combinations thereof.

Example 7D

The electrical machine of one or more of the above D examples, wherein the at least one operating parameter during operation may be selected from one or more of the following: maximum angular velocity, average angular velocity, minimum angular velocity, maximum power output, average power output, minimum power output, maximum input voltage, average input voltage, minimum input voltage, maximum generation voltage, average generation voltage, minimum generation voltage, shape and frequency of generated voltage, peak input current, average input current, minimum input current, maximum generation current, average generation current, minimum generation current, maximum torque, average torque, minimum torque, torque smoothness, activation sequence, rate of acceleration, order of accuracy of hold angle, minimising the variation of angular velocity, rate of deceleration during breaking, diameter of the shaft, maximum radius of the electrical machine, maximum length of the electrical machine, maximum depth of the electrical machine, maximum height of the machine, maximum slide distance, minimum slide distance, maximum weight of the machine, minimum weight of the machine, maximum resistive power loss, and unit redundancy and overall price.

Example 8D

The electrical machine of one or more of the above D examples, wherein the at least one performance parameter during operation may be selected from one or more of the following: maximum angular velocity, maximum power output, deviation from output voltage during generation, maintaining a required generation voltage, torque smoothness, rate of acceleration, accuracy of hold angle, minimising the variation of angular velocity, matching requested rate of deceleration during breaking, minimising resistive power loss, overall efficiency, power factor correction, mechanical harmonic cancelation, electrical harmonic cancelation, accuracy of reproduced output voltage wave, and accuracy of generated frequency.

Example 9D

The electrical machine of one or more of the above examples, wherein the power to weight ratio of the electrical machine is at between 10 to 1, 15 to 3, 10 to 0.5, 9 to 4, 5 to 0.01, 3.4 to 6 or 8.4 to 3.4 kilowatts per kilogram.

Example 10D

The electrical machine of one or more of the above D examples, further comprising at least one sensor to detect absolute or relative position of the at least one rotor; and at least one control system which, in response to inputs from the one or more of the following: the at least one sensor, at least one power command, at least one mode command comprising one or more of the following at least one drive, generate, braking and hold command, and at least one rotational direction command.

Example 11D

The electrical machine of example 10D, wherein the at least one control system is configured to be in a drive configuration or has the at least one drive mode command, the at least one control system activates at least one switch which energies one or more of the magnetic coils to attract and repel the magnets for the purpose of generating motion.

Example 12D

The electrical machine of example 10D, wherein the electrical machine is configured to be in a generation configuration or has at least one mode command to generate power, the at least one control system activates at least one switch which connects one or more coils to the external power rails.

Example 13D

The electrical machine of example 10D, wherein the electrical machine is configured to be in a braking configuration or has the at least one mode command to brake, the at least one control system activates at least one switch which connects one or more of the magnetic coils terminals together to oppose motion.

Example 14D

The electrical machine of example 10D, wherein the electrical machine is configured to be in a holding configuration or has the at least one mode command to hold, the at least one control system activates at least one switch energises one or more of the magnetic coils to attract and repel magnets for the purpose of stopping motion.

Example 15D

The electrical machine of one or more of the above D examples, wherein the at least one control system in operation is determining one or more appropriately efficient modes of operation in relation to the at least one operating parameters, the at least one performance parameter or combinations thereof on a substantially continuous basis during operating periods.

Example 16D

The electrical machine of one or more of the above D examples, wherein the electrical machine has a power density of between 100 to 20,000, 100 to 200, 100 to 500, 250 to 500, 500 to 1000, 500 to 2000, 1000 to 10,000, 1000 to 5000, 2000 to 5000, 5000 to 10,000, 5000 to 15,000, 10,000 to 30,000 or 10,000 to 20,000 kw/meter cubed.

Example 17D

The electrical machine of one or more of the above D examples, wherein one or more of the at least one operating parameter, the at least one performance parameter or combinations thereof of the electrical machine may be reconfigured in substantially real time.

Example 18D

The electrical machine of one or more of the above D examples, wherein the at least one control system provides individual control over at least 30%, 40%, 50%, 60%, 70% 80%, 90%, 95% or 100% of the plurality of coils.

Example 19D

The electrical machine of one or more of the above D examples, wherein the module coil activation sequence is computed during machine operation the order of modules activating being sequentially based on their geometric position in the module array.

Example 20D

The electrical machine of one or more of the above D examples, wherein the module coil activation sequence is computed during machine operation, the order of modules activating being based upon sensor feedback.

Example 21D

The electrical machine of one or more of the above D examples, wherein the module coil activation sequence is computed during machine operation and the order of the at least one modules activating being determined by at least in part one or more sequence patterns.

Example 22D

The electrical machine of one or more of the above D examples, wherein the total number of the at least one electromagnetic coils powered in the active sequence may vary during operation from the total number of coils, to none.

Example 23D

The electrical machine of one or more of the above D examples, wherein the control of the electrical machine is centralised on at least one control module.

Example 24D

The electrical machine of one or more of the above D examples, wherein one or more modules may be individually removed, added, or replaced during operation of the machine, without substantially affecting the operational state of the machine.

Example 25D

The electrical machine of one or more of the above D examples, wherein each module is capable of being reconfigured based at least in part on one or more of the following: at least one operating parameter during operation, wherein the at least one operating parameter during operation may be selected from one or more of the parameters listed in example 7D, at least one performance parameter during operation, wherein the at least one performance parameter during operation may be selected from one or more of the parameter listed in example 8D; or combinations thereof.

Example 26D

The electrical machine of one or more of the above D examples, wherein the electrical machine is a compact direct drive electric motor that generates sufficient or improved propulsion in a wheeled vehicle and the electric motor and the differential can fit the size of envelope of existing differentials in a conventional combustion engine driven vehicle.

Example 27D

The electrical machine of one or more of the above D examples, wherein the electrical machine is a compact direct drive electric motor that generate sufficient or improved propulsion of a wheeled vehicle and the electric motor and the differential can be installed in line with a drive axial while providing adequate clearance from a road without substantial modification to an existing suspension of the wheeled vehicle.

Example 28D

The electrical machine of one or more of the above D examples, wherein the electrical machine is a compact direct drive electric motor that generate sufficient propulsion of a wheeled vehicle and the electric motor and the differential can be installed in line with one or more drive axels while providing adequate clearance from a road without substantial modification to an existing suspension of the wheeled vehicle.

Example 29D

The electrical machine of one or more of the above D examples, wherein the electrical machine is a compact direct drive electric motor that generate sufficient propulsion of a wheeled vehicle and the electric motor and the differential can be installed in line with one or more drive axels without lower, or substantially lowering, the clearance from a road and without substantial modification to an existing suspension of the wheeled vehicle.

Example 1E

An electrical machine comprising: at least one stator; at least one module comprising at least one electromagnetic coil and at least one switch, the at least one module being attached to the at least one stator; at least one rotor with a plurality of magnets attached to the at least one rotor, wherein the at least one module is in spaced relation to the plurality of the magnets; an integrated differential coupled to at least one of the at least one rotors, the at least one integrated differential permitting the at least one rotor to output at least two rotational outputs to corresponding shafts, wherein the at least two rotational outputs are able to move the shafts at different rotational velocities relative to one another, and the at least one rotor being in a rotational relationship with the at least one stator, wherein the quantity and configuration of a substantial portion of the modules in the electrical machine are determined based in part on one or more operating parameters; wherein a substantial portion of the modules are capable of being independently controlled;

wherein a substantial portion of the modules is capable of being reconfigured based at least in part on one or more of the following: at least one operating parameter during operation, at least one performance parameter during operation, and combinations thereof; and wherein the electrical machine is configured to fit into a housing and that can be retrofitted into a conventional vehicle by replacing the differential.

Example 2E

An electrical machine comprising: at least one stator; at least one module, each module comprising at least one electromagnetic coil and at least one switch, the at least one module being attached to the at least one stator, at least one rotor with a plurality of magnets attached to the at least one rotor, wherein the at least one module is in spaced relation to the plurality of the magnets; an integrated differential coupled to at least one of the at least one rotors, the at least one integrated differential permitting the at least one rotor to output at least two rotational outputs to corresponding shafts, wherein the at least two rotational outputs are able to move the shafts at different rotational velocities relative to one another, and the at least one rotor being in a rotational relationship with the at least one stator;

wherein the quantity and configuration of each one module in the electrical machine is determined based in part on one or more operating parameters; wherein each module is capable of being independently controlled;

wherein each module is capable of being reconfigured based at least in part on one or more of the following at least one operating parameter during operation, at least one performance parameter during operation, and combinations thereof; and wherein the electrical machine is configured to fit into a housing and that can be located in substantially that same position where a differential would otherwise be located in a vehicle or other machine.

Example 3E

An electrical machine comprising: a plurality of stators; a plurality of modules, wherein a substantial portion of the modules comprise at least one electromagnetic coil and at least one switch and are attached to at least one of the plurality of stators; a plurality of rotors with a plurality of magnets attached to at least one of the plurality of rotors, the plurality of rotors are able to move independently to one another to produce a differential output that permits the electric machine to output at least two rotational outputs to corresponding shafts, wherein the at least two rotational outputs are able to move the shafts at different rotational velocity's relative to one another, and the plurality of modules are in spaced relation to the plurality of the magnets; and the plurality of rotors being in a rotational relationship with the plurality of stators;

wherein the quantity and configuration of the substantial portion of the modules in the electrical machine are determined based in part on one or more operating parameters;

wherein the substantial portion of the modules are capable of being independently controlled, and wherein the substantial portion of the modules are capable of being reconfigured based at least in part on one or more of the following: at least one operating parameter during operation, and at least one performance parameter during operation; and wherein the electrical machine is configured to fit into a housing and that can be located in substantially that same position where a differential would otherwise be located in a vehicle or other machine.

Example 4E

An electrical machine comprising: a plurality of stators; a plurality of modules, each module comprising at least one electromagnetic coil and at least one switch and being attached to at least one of the plurality of stators; a plurality of rotors with a plurality of magnets attached to at least one of the plurality of rotors, the plurality of rotors are able to move independently to one another to produce a differential output that permits the electric machine to output at least two rotational outputs to corresponding shafts, wherein the at least two rotational outputs are able to move the shafts at different rotational velocity's relative to one another, and the plurality of modules are in spaced relation to the plurality of the magnets; and the plurality of rotors being in a rotational relationship with the plurality of stators;

wherein the quantity and configuration of each module in the electrical machine is determined based in part on one or more operating parameters;

wherein each module is capable of being independently controlled, and wherein each module is capable of being reconfigured based at least in part on one or more of the following; at least one operating parameter during operation, and at least one performance parameter during operation; and wherein the electrical machine is configured to fit into a housing and that can be retrofitted into a conventional vehicle by replacing the differential.

Example 5E

An electrical machine comprising: a plurality of stators; a plurality of modules, each module comprising at least one electromagnetic coil and at least one switch and being attached to at least one of the plurality of stators; a plurality of rotors with a plurality of magnets attached to at least one of the plurality of rotors, the plurality of rotors are able to move independently to one another to produce a differential output that permits the electric machine to output at least two rotational outputs to corresponding shafts, wherein the at least two rotational outputs are able to move the shafts at different rotational velocity's relative to one another, and the plurality of modules are in spaced relation to the plurality of the magnets; and the plurality of rotors being in a rotational relationship with the plurality of stators;

wherein the quantity and configuration of each module in the electrical machine is determined based in part on one or more operating parameters;

wherein each module is capable of being independently controlled, and wherein each module is capable of being reconfigured based at least in part on one or more of the following at least one operating parameter during operation, and at least one performance parameter during operation; and wherein the electrical machine is configured to fit into a housing and that can be located in substantially that same position where a differential would otherwise be located in a vehicle or other machine.

Example 6E

An electrical machine comprising: at least one stator, at least one module, each module comprising at least one electromagnetic coil and at least one switch, the at least one module being attached to the at least one stator, at least one platter or rotor with a plurality of magnets attached to the at least one platter or rotor, wherein the at least one module is in spaced relation to the plurality of the magnets; an integrated differential coupled to at least one of the at least one platters or rotors, the at least one integrated differential permitting the at least one platter or rotor to output at least two rotational outputs to corresponding shafts, wherein the at least two rotational outputs are able to move the shafts at different rotational velocities relative to one another, and the at least one platter or rotor being movement relationship with the at least one stator, wherein the quantity and configuration of each module in the electrical machine is determined based in part on one or more operating parameters; wherein each module is capable of being independently controlled; and wherein each module is capable of being reconfigured based at least in part on one or more of the following at least one operating parameter during operation, at least one performance parameter during operation, or combinations thereof.

Example 7E

The electrical machine of one or more of the above E examples, wherein the at least one operating parameter during operation may be selected from one or more of the following: maximum angular velocity, average angular velocity, minimum angular velocity, maximum power output, average power output, minimum power output, maximum input voltage, average input voltage, minimum input voltage, maximum generation voltage, average generation voltage, minimum generation voltage, shape and frequency of generated voltage, peak input current, average input current, minimum input current, maximum generation current, average generation current, minimum generation current, maximum torque, average torque, minimum torque, torque smoothness, activation sequence, rate of acceleration, order of accuracy of hold angle, minimising the variation of angular velocity, rate of deceleration during breaking, diameter of the shaft, maximum radius of the electrical machine, maximum length of the electrical machine, maximum depth of the electrical machine, maximum height of the machine, maximum slide distance, minimum slide distance, maximum weight of the machine, minimum weight of the machine, maximum resistive power loss, and unit redundancy and overall price.

Example 8E

The electrical machine of one or more of the above E examples, wherein the at least one performance parameter during operation may be selected from one or more of the following: maximum angular velocity, maximum power output, deviation from output voltage during generation, maintaining a required generation voltage, torque smoothness, rate of acceleration, accuracy of hold angle, minimising the variation of angular velocity, matching requested rate of deceleration during breaking, minimising resistive power loss, overall efficiency, power factor correction, mechanical harmonic cancelation, electrical harmonic cancelation, accuracy of reproduced output voltage wave and accuracy of generated frequency.

Example 9E

The electrical machine of one or more of the above E examples, wherein the power to weight ratio of the electrical machine is at between 10 to 1, 15 to 3, 10 to 0.5, 9 to 4, 5 to 0.01, 3.4 to 6 or 8.4 to 3.4 kilowatts per kilogram.

Example 10E

The electrical machine of one or more of the above E examples, further comprising at least one sensor to detect absolute or relative position of the at least one rotor; and at least one control system which, in response to inputs from the one or more of the following: the at least one sensor, at least one power command, at least one mode command comprising one or more of the following at least one drive, generate, braking and hold command and at least one rotational direction command.

Example 11E

The electrical machine of example 10E, wherein the at least one control system is configured to be in a drive configuration or has the at least one drive mode command, the at least one control system activates at least one switch which energies one or more of the magnetic coils to attract and repel the magnets for the purpose of generating motion.

Example 12E

The electrical machine of example 10E, wherein the electrical machine is configured to be in a generation configuration or has at least one mode command to generate power, the at least one control system activates at least one switch which connects one or more coils to the external power rails.

Example 13E

The electrical machine of example 10E, wherein the electrical machine is configured to be in a braking configuration or has the at least one mode command to brake, the at least one control system activates at least one switch which connects one or more of the magnetic coils terminals together to oppose motion.

Example 14E

The electrical machine of example 10E, wherein the electrical machine is configured to be in a holding configuration or has the at least one mode command to hold, the at least one control system activates at least one switch energises one or more of the magnetic coils to attract and repel magnets for the purpose of stopping motion.

Example 15E

The electrical machine of one or more of the above E examples, wherein the at least one control system in operation is determining one or more appropriately efficient modes of operation in relation to the at least one operating parameters, the at least one performance parameter or combinations thereof on a substantially continuous basis during operating periods.

Example 16E

The electrical machine of one or more of the above E examples, wherein the electrical machine has a power density of between 100 to 20,000, 100 to 200, 100 to 500, 250 to 500, 500 to 1000, 500 to 2000, 1000 to 10,000, 1000 to 5000, 2000 to 5000, 5000 to 10,000, 5000 to 15,000, 10,000 to 30,000 or 10,000 to 20,000 kw/meter cubed.

Example 17E

The electrical machine of one or more of the above E examples, wherein one or more of the at least one operating parameter, the at least one performance parameter or combinations thereof of the electrical machine may be reconfigured in substantially real time.

Example 18E

The electrical machine of one or more of the above E examples, wherein the at least one control system provides individual control over at least 30%, 40%, 50%, 60%, 70% 80%, 90%, 95% or 100% of the plurality of coils.

Example 19E

The electrical machine of one or more of the above E examples, wherein the module coil activation sequence is computed during machine operation the order of modules activating being sequentially based on their geometric position in the module array.

Example 20E

The electrical machine of one or more of the above E examples, wherein the module coil activation sequence is computed during machine operation, the order of modules activating being based upon sensor feedback.

Example 21E

The electrical machine of one or more of the above E examples, wherein the module coil activation sequence is computed during machine operation and the order of the at least one modules activating being determined by at least in part one or more sequence patterns.

Example 22E

The electrical machine of one or more of the above E examples, wherein the total number of the at least one electromagnetic coils powered in the active sequence may vary during operation from the total number of coils, to none.

Example 23E

The electrical machine of one or more of the above E examples, wherein the control of the electrical machine is centralised on at least one control module.

Example 24E

The electrical machine of one or more of the above E examples, wherein one or more modules may be individually removed, added, or replaced during operation of the machine, without substantially affecting the operational state of the machine.

Example 25E

The electrical machine of one or more of the above E examples, wherein the substantial portion of the modules is all of the modules contained in the electrical machine.

Example 26E

The electrical machine of one or more of the above E examples, wherein the electrical machine is a compact direct drive electric motor that generates sufficient or improved propulsion in a wheeled vehicle and the electric motor and the differential can fit the size of envelope of existing differentials in a conventional combustion engine driven vehicle.

Example 27E

The electrical machine of one or more of the above E examples, wherein the electrical machine is a compact direct drive electric motor that generate sufficient or improved propulsion of a wheeled vehicle and the electric motor and the differential can be installed in line with a drive axial while providing adequate clearance from a road without substantial modification to an existing suspension of the wheeled vehicle.

Example 28E

The electrical machine of one or more of the above E examples, wherein the electrical machine is a compact direct drive electric motor that generate sufficient propulsion of a wheeled vehicle and the electric motor and the differential can be installed in line with one or more drive axels while providing adequate clearance from a road without substantial modification to an existing suspension of the wheeled vehicle.

Example 29E

The electrical machine of one or more of the above E examples, wherein the electrical machine is a direct drive electric motor that generate sufficient propulsion of a wheeled vehicle and the electric motor and the differential are be installed in line with one or more drive axels without lower, or substantially lowering, the clearance from a road and without substantial modification to an existing suspension of the wheeled vehicle.

Example 30E.1

The electrical machine of one or more of the above E examples, wherein the at least one electromagnetic coil is made by wrapping one or more conductor materials around a temporary fixture which is then removed.

Example 30E.2

The electrical machine of one or more of the above E examples, wherein the at least one electromagnetic coil comprises the one or more conductor materials wrapped around a bobbin.

Example 30E.3

The electrical machine of one or more of the above E examples, wherein the at least one electromagnetic coil comprises the one or more conductor materials wrapped around a core.

Example 31E.1

The electrical machine of of examples 30E.1, 30E.2 and 30E.3, wherein the one or more conductor materials of the at least one electromagnetic coil have a circular or a partially circular cross section.

Example 31 E.2

The electrical machine of of examples 30E.1, 30E.2 and 30E.3, wherein the one or more conductor materials of the at least one electromagnetic coil have a rectangular or a partially rectangular cross section.

Example 31E.3

The electrical machine of examples 30E.1, 30E.2 and 30E.3, wherein the one or more conductor materials of the at least one electromagnetic coil have a rectangular or a partially rectangular cross section bent along the long axis, This creates what is commonly known as an edge wound coil.

Example 31 E.4

The electrical machine of examples 30E.1, 30E.2 and 30E.3, wherein the one or more conductor materials of the at least one electromagnetic coil have an arbitrarily shaped cross section.

Example 31E.5

The electrical machine of examples 30E.1, 30E.2 and 30E.3, wherein the one or more conductor materials of the at least one electromagnetic coil have a combination of one or more of the cross sections described in examples 31E.1, 31E.2, 31E.3 and 31 E.4.

Example 31 E.6

The electrical machine of examples 30E.1, 30E.2 and 30E.3, wherein the one or more conductor materials of the at least one electromagnetic coil is foil.

Example 32E.1

The electrical machine of one or more of the above E examples, wherein the at least one electromagnetic coil is of a cylindrical or a substantially cylindrical shape.

Example 32E.2

The electrical machine of one or more of the above E examples, wherein the at least one electromagnetic coil is of a rectangular or a substantially rectangular prism shape.

Example 32E.3

The electrical machine of one or more of the above E examples, wherein the at least one electromagnetic coil is of a trapezoidal or a substantially trapezoidal prism shape.

Example 32E.4

The electrical machine of one or more of the above E examples, wherein the at least one electromagnetic coil is of a oval or a substantially oval prism shape.

Example 33E.1

The electrical machine of one or more of the above E examples, wherein the at least one electromagnetic coil surrounds or partially surrounds a cylindrical or a substantially cylindrical core.

Example 33E.2

The electrical machine of one or more of the above E examples, wherein the at least one electromagnetic coil surrounds or partially surrounds a rectangular or a substantially rectangular prism core.

Example 33E.3

The electrical machine of one or more of the above E examples, wherein the at least one electromagnetic coil surrounds or partially surrounds a trapezoidal or a substantially trapezoidal prism core.

Example 34E.1

The electrical machine of one or more of the above E example, wherein along the at least one electromagnetic coil there is a area of reduced cross section that is capable of fusing in an open circuit or a partially open circuit state in the event of an amount of current that is beyond a predetermined amount of current.

Example 34E.2

The electrical machine of one or more of the above E example, wherein along the at least one electromagnetic coil there are at least two, three or four areas of reduced cross section that are capable of fusing in an open circuit or a partially open circuit state in the event of an amount of current that is beyond a predetermined amount of current.

Example 34E.3

The electrical machine of one or more of the above E example, wherein along the at least one electromagnetic coil there are at least one, two or three areas of reduced cross section per coil winding that are capable of fusing in an open circuit or a partially open circuit state in the event of an amount of current that is beyond a predetermined amount of current.

Example 35E.1

The electrical machine of one or more of the above E examples, wherein the one or more conductor materials is composed of copper or a copper alloy.

Example 35E.2

The electrical machine of one or more of the above E examples, wherein the one or more conductor materials is composed of aluminium or an aluminium alloy.

Example 35E.3

The electrical machine of one or more of the above E examples, wherein the one or more conductor materials is composed of graphine, a graphine hybrid or another carbon based conductor.

Example 35E.4

The electrical machine of one or more of the above E examples, wherein the one or more conductor materials is composed of a suitably conductive material.

Example 36E.1

The electrical machine of one or more of the above E examples, wherein the one or more conductor materials is directly cooled by the flow of a suitable coolant directly over or over a layer of electrically insulating material.

Example 36E.2

The electrical machine of one or more of the above E examples, wherein the one or more conductor materials is within close proximity of a thermally conductive material that is capable of dissipating heat to a nearby coolant channel.

Example 36E.3

The electrical machine of one or more of the above E examples, wherein the one or more conductor materials is within close proximity of the thermally conductive material is capable of conducting heat to a surface where the heat is at least in part removed by convection and thermal radiation.

Example 37E

The electrical machine of one or more of the above E examples, wherein the at least one electromagnetic coil is placed around a core.

Example 38E.1

The electrical machine of example 37E, wherein the core is made of laminated electrical steel.

Example 38E.2

The electrical machine of example 37E, wherein the core is made of layers of amorphous metal.

Example 38E.3

The electrical machine of example 37E, wherein the core is made of powdered metals.

Example 38E.4

The electrical machine of example 37E, wherein the core is made of a material with suitable magnetic permeability.

Example 38E.5

The electrical machine of example 37E, wherein the core is made of a magnetic permeable material.

Example 39E

The electrical machine of one or more of the above E examples, wherein the at least one stator is a substantial portion of the stators contained in the electrical machine.

Example 40E

The electrical machine of one or more of the above E examples, wherein the at least one stator is all of the stators contained in the electrical machine.

Example 41E

The electrical machine of one or more of the above E examples, wherein the at least one module is a substantial portion of the modules contained in the electrical machine.

Example 42E

The electrical machine of one or more of the above E examples, wherein the at least one module is all of the modules contained in the electrical machine.

Example 43E

The electrical machine of one or more of the above E examples, wherein the at least one electromagnetic coil is a substantial portion of the electromagnetic coils contained in the electrical machine.

Example 44E

The electrical machine of one or more of the above E examples, wherein the at least one electromagnetic coil is all of the electromagnetic coil contained in the electrical machine.

Example 45E

The electrical machine of one or more of the above E examples, wherein the at least one switch is a substantial portion of the switches contained in the electrical machine.

Example 46E

The electrical machine of one or more of the above E examples, wherein the at least one switch is all of the switches contained in the electrical machine.

Example 47E

The electrical machine of one or more of the above E examples, wherein the at least one rotor is a substantial portion of the rotors contained in the electrical machine.

Example 48E

The electrical machine of one or more of the above E examples, wherein the at least one rotor is all of the rotors contained in the electrical machine.

Example 49E

The electrical machine of one or more of the above E examples, wherein the plurality of magnets is a substantial portion of the magnets contained in the electrical machine.

Example 50E

The electrical machine of one or more of the above E examples, wherein the plurality of magnets is all of the magnets contained in the electrical machine.

The present disclosure should be taken to include feasible combinations of features described herein.

The combination of features described is such as to allow the electric motor to operate efficiently over a wide power and RPM range and, where required, with high power and torque density. Additionally, it permits combinations of standard components to be assembled together to provide a range of electric motor configurations.

The exemplary approaches described may be carried out using suitable combinations of software, firmware and hardware and are not limited to particular combinations of such. Computer program instructions for implementing the exemplary approaches described herein may be embodied on a tangible, non-transitory, computer-readable storage medium, such as a magnetic disk or other magnetic memory, an optical disk (e.g., DVD) or other optical memory, RAM, ROM, or any other suitable memory such as Flash memory, memory cards, etc.

Additionally, the disclosure has been described with reference to particular embodiments. However, it will be readily apparent to those skilled in the art that it is possible to embody the disclosure in specific forms other than those of the embodiments described above. The embodiments are merely illustrative and should not be considered restrictive. The scope of the disclosure is given by the appended claims, rather than the preceding description, and variations and equivalents that fall within the range of the claims are intended to be embraced therein.

The invention claimed is:

1. An electrical machine configured to fit into a housing and that can be retrofitted into a conventional vehicle by replacing the differential, the electrical machine comprising:
    at least one module, the at least one module comprising at least one electromagnetic coil and at least one switch, the at least one module being attached to at least one stator;
    at least one rotor with a plurality of magnets attached to the at least one rotor, wherein the at least one module is in spaced relation to the plurality of the magnets;
    an differential coupled to at least one of the at least one rotors, the at least one differential permitting the at least one rotor to output at least two rotational outputs to corresponding shafts, wherein the at least two rotational outputs are able to move the shafts at different rotational velocities relative to one another, and
    wherein the quantity and configuration of the at least one module in the electrical machine is determined based in part on one or more operating parameters;
    wherein the at least one module is capable of being independently controlled;
    wherein the at least one module is capable of being reconfigured based at least in part on one or more of the following: at least one operating parameter during operation, at least one performance parameter during operation, and combinations thereof.

2. The electrical machine of claim 1, wherein the at least one operating parameter during operation may be selected from one or more of the following: maximum angular velocity, average angular velocity, minimum angular velocity, maximum power output, average power output, minimum power output, maximum input voltage, average input voltage, minimum input voltage, maximum generation voltage, average generation voltage, minimum generation voltage, shape and frequency of generated voltage, peak input current, average input current, minimum input current, maximum generation current, average generation current, minimum generation current, maximum torque, average torque, minimum torque, torque smoothness, activation sequence, rate of acceleration, order of accuracy of hold angle, minimising the variation of angular velocity, rate of deceleration during breaking, diameter of the shaft, maximum radius of the electrical machine, maximum length of the electrical machine, maximum depth of the electrical machine, maximum height of the machine, maximum slide distance, minimum slide distance, maximum weight of the machine, minimum weight of the machine, maximum resistive power loss, and unit redundancy and overall price.

3. The electrical machine of claim 1, wherein the at least one performance parameter during operation may be selected from one or more of the following: maximum angular velocity, maximum power output, deviation from output voltage during generation, maintaining a required generation voltage, torque smoothness, rate of acceleration, accuracy of hold angle, minimising the variation of angular velocity, matching requested rate of deceleration during breaking, minimising resistive power loss, overall efficiency, power factor correction, mechanical harmonic cancelation, electrical harmonic cancelation, accuracy of reproduced output voltage wave and accuracy of generated frequency.

4. The electrical machine of claim 1, further comprising at least one sensor to detect absolute or relative position of the at least one rotor; and at least one control system which, in response to inputs from the one or more of the following: the at least one sensor, at least one power command, at least one mode command comprising one or more of the following: at least one drive, generate, braking and hold command, and at least one rotational direction command.

5. The electrical machine of claim 4, wherein the at least one control system is configured to be in a drive configuration or has the at least one drive mode command, the at least one control system activates the at least one switch which energies one or more of the at least one electromagnetic coils to attract and repel one or more of the plurality of magnets for the purpose of generating motion.

6. The electrical machine of claim 4, wherein the electrical machine is configured to be in a generation configuration or has at least one mode command to generate power, the at least one control system activates the at least one switch which connects one or more of the at least one electromagnetic coils to the external power rails.

7. The electrical machine of claim 4, wherein the electrical machine is configured to be in a braking configuration or has the at least one mode command to brake, the at least one control system activates at least one switch which connects one or more of the magnetic coils terminals together to oppose motion.

8. The electrical machine of claim 4, wherein the electrical machine is configured to be in a holding configuration or has the at least one mode command to hold, the at least one control system activates at least one switch which energises one or more of the electromagnetic coils attract and repel one or more of the plurality of magnets for the purpose of stopping motion.

9. The electrical machine of claim 1, wherein the at least one control system in operation is determining one or more appropriately efficient modes of operation in relation to the at least one operating parameters, the at least one performance parameter or combinations thereof on a substantially continuous basis during operating periods.

10. The electrical machine of claim 1, wherein one or more of the at least one operating parameter, the at least one performance parameter or combinations thereof of the electrical machine may be reconfigured in substantially real time.

11. The electrical machine of claim 1, wherein the module coil activation sequence is computed during machine operation the order of modules activating being sequentially based on their geometric position in the module array.

12. The electrical machine of claim 1, wherein the module coil activation sequence is computed during machine operation, the order of modules activating being based upon sensor feedback.

13. The electrical machine of claim 1, wherein the module coil activation sequence is computed during machine operation and the order of the at least one modules activating being determined by at least in part one or more sequence patterns.

14. The electrical machine of claim 1, wherein the total number of the at least one electromagnetic coils powered in the active sequence may vary during operation from the total number of coils, to none.

15. The electrical machine of claim 1, wherein the control of the electrical machine is centralised on at least one control module.

16. The electrical machine of claim 1, wherein one or more modules of the at least one module may be individually removed, added, or replaced during operation of the machine, without substantially affecting the operational state of the machine.

17. The electrical machine of claim 1,
wherein the at least one module is capable of being reconfigured based at least in part on one or more of the following:
at least one operating parameter during operation, wherein the at least one operating parameter during operation may be selected from one or more of the parameters listed in claim 2, at least one performance parameter during operation, wherein the at least one performance parameter during operation may be selected from one or more of the parameter listed in claim 3;
or combinations thereof.

18. The electrical machine of claim 1, wherein the electrical machine is a compact direct drive electric motor that generates sufficient or improved propulsion in a wheeled vehicle and the electric motor and the differential can fit the size of envelope of existing differentials in a conventional combustion engine driven vehicle.

19. An electrical machine configured to fit into a housing and that can be located in substantially that same position where a differential would otherwise be located in a vehicle or other machine, the electrical machine comprising:
at least one module, the at least one module comprising at least one electromagnetic coil and at least one switch, the at least one module being attached to at least one stator;
at least one rotor with a plurality of magnets attached to the at least one rotor, wherein the at least one module is in spaced relation to the plurality of the magnets;
an differential coupled to at least one of the at least one rotors, the at least one differential permitting the at least one rotor to output at least two rotational outputs to corresponding shafts, wherein the at least two rotational outputs are able to move the shafts at different rotational velocities relative to one another, and
wherein the quantity and configuration of the at least one module in the electrical machine is determined based in part on one or more operating parameters;
wherein the at least one module is capable of being independently controlled;
wherein the at least one module is capable of being reconfigured based at least in part on one or more of the following: at least one operating parameter during operation, at least one performance parameter during operation, and combinations thereof.

20. An electrical machine comprising:
at least one module, the at least one module comprising at least one electromagnetic coil and at least one switch, the at least one module being attached to at least one stator;
at least one platter or rotor with a plurality of magnets attached to the at least one platter or rotor, wherein the at least one module is in spaced relation to the plurality of the magnets;
an differential coupled to at least one of the at least one platters or rotors, the at least one differential permitting the at least one platter or rotor to output at least two rotational outputs to corresponding shafts, wherein the at least two rotational outputs are able to move the shafts at different rotational velocities relative to one another, and
wherein the quantity and configuration of the at least one module in the electrical machine is determined based in part on one or more operating parameters;
wherein the at least one module is capable of being independently controlled; and
wherein the at least one module is capable of being reconfigured based at least in part on one or more of the following: at least one operating parameter during operation, at least one performance parameter during operation, or combinations thereof.

* * * * *